(12) United States Patent
Abraham et al.

(10) Patent No.: US 11,057,830 B2
(45) Date of Patent: Jul. 6, 2021

(54) MEDIA ACCESS CONTROL FOR WAKEUP RADIOS

(71) Applicant: QUALCOMM Incorporated, San Diego, CA (US)

(72) Inventors: Santosh Paul Abraham, San Diego, CA (US); Stephen Jay Shellhammer, Ramona, CA (US); Linhai He, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/808,639

(22) Filed: Nov. 9, 2017

(65) Prior Publication Data
US 2018/0132176 A1 May 10, 2018

Related U.S. Application Data

(60) Provisional application No. 62/420,467, filed on Nov. 10, 2016.

(51) Int. Cl.
*H04W 72/04* (2009.01)
*H04W 52/02* (2009.01)
(Continued)

(52) U.S. Cl.
CPC ....... *H04W 52/0212* (2013.01); *H04L 43/087* (2013.01); *H04W 52/0235* (2013.01);
(Continued)

(58) Field of Classification Search
CPC ........... H04W 52/0212; H04W 52/235; H04W 52/0293; H04W 84/12; H04W 88/08;
(Continued)

(56) References Cited

U.S. PATENT DOCUMENTS 9,749,958 B1 * 8/2017 Segev ............... H04W 52/0235
9,826,482 B2 * 11/2017 Park .................. H04W 52/0229
(Continued)

FOREIGN PATENT DOCUMENTS

EP 3190737 A1 7/2017
EP 3493603 A1 6/2019
(Continued)

OTHER PUBLICATIONS

International Search Report and Written Opinion—PCT/US2017/061084—ISA/EPO—dated Feb. 5, 2018 (170285WO).

*Primary Examiner* — Hassan Kizou
*Assistant Examiner* — Mahbubul Bar Chowdhury
(74) *Attorney, Agent, or Firm* — Holland & Hart LLP; Kevin M. Donnelly

(57) ABSTRACT

Methods, systems, and devices for wireless communication are described. An access point (AP) may identify a jitter pattern for a wakeup message. A station may listen using a wakeup radio for a wakeup message during wakeup listening periods according to the identified jitter pattern. A station may receive a preamble having a first bandwidth and a wakeup message having a second bandwidth. An AP may transmit an identifier key to a station, and the station may determine a rotating identifier associated with the AP based on the received identifier key. The station may receive a wakeup message from the AP, compare a sender identifier with the rotating identifier, and power on a second radio. A station may also receive a wakeup message that includes an indication of which station are to be activated.

27 Claims, 29 Drawing Sheets

(51) Int. Cl.
  *H04L 12/26* (2006.01)
  *H04W 84/12* (2009.01)
  *H04W 88/02* (2009.01)
  *H04W 88/08* (2009.01)
(52) U.S. Cl.
  CPC ........ *H04W 52/0293* (2013.01); *H04W 84/12* (2013.01); *H04W 88/02* (2013.01); *H04W 88/08* (2013.01); *Y02D 30/70* (2020.08)
(58) Field of Classification Search
  CPC ... H04W 88/02; H04L 43/087; Y02D 70/146; Y02D 70/00; Y02D 70/14; Y02D 70/142; Y02D 70/10; Y02D 70/22
  See application file for complete search history.

(56) References Cited

U.S. PATENT DOCUMENTS

| | | | | |
|---|---|---|---|---|
| 10,098,067 | B2* | 10/2018 | Qi | H04W 76/14 |
| 2013/0128788 | A1* | 5/2013 | Guey | H04W 52/0206 |
| | | | | 370/311 |
| 2014/0050133 | A1* | 2/2014 | Jafarian | H04W 74/085 |
| | | | | 370/311 |
| 2014/0112225 | A1* | 4/2014 | Jafarian | H04W 52/0235 |
| | | | | 370/311 |
| 2014/0112229 | A1* | 4/2014 | Merlin | H04W 52/0209 |
| | | | | 370/311 |
| 2014/0211678 | A1* | 7/2014 | Jafarian | H04W 52/0216 |
| | | | | 370/311 |
| 2014/0266625 | A1* | 9/2014 | Merlin | G06K 7/10366 |
| | | | | 340/10.1 |
| 2015/0282068 | A1 | 10/2015 | Rajagopal et al. | |
| 2015/0288555 | A1* | 10/2015 | Kanno | H04L 27/2613 |
| | | | | 370/350 |
| 2016/0366644 | A1* | 12/2016 | Ghosh | H04W 52/0229 |
| 2016/0374020 | A1* | 12/2016 | Azizi | H04W 52/0229 |
| 2017/0134943 | A1* | 5/2017 | Min | H04W 12/06 |

FOREIGN PATENT DOCUMENTS

| | | |
|---|---|---|
| EP | 3528546 A1 | 8/2019 |
| WO | WO-2016045124 A1 | 3/2016 |

* cited by examiner

MEDIA ACCESS CONTROL FOR WAKEUP RADIOS

CROSS REFERENCES

The present application for patent claims priority to U.S. Provisional Patent Application No. 62/420,467 by Abraham, et al., entitled "Media Access Control For Wakeup Radios," filed Nov. 10, 2016, assigned to the assignee hereof, and which is hereby expressly incorporated by reference herein in its entirety.

BACKGROUND

The following relates generally to wireless communication, and more specifically to media access control for wakeup radio.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., zInstitute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

A wireless device may have a limited amount of battery power. In some systems, a primary radio may engage in bursty transmissions, or may only need to receive transmissions for an associated AP on rare occasions. In some cases, a primary radio may expend more power than necessary by waking up to regularly receive transmissions, such as beacons from the associated AP. It may be beneficial for one or more of the primary radios to remain in a sleep mode or low power mode for extended periods of time. During a sleep mode, a wireless device may periodically activate a radio, such as a wakeup radio, to listen for and decode a wakeup message from an AP. The wakeup message may indicate whether communications are waiting at the AP to be transmitted to the wireless device. The wireless device may then power on the primary radio based on receiving the wakeup message.

SUMMARY

The described techniques relate to improved methods, systems, devices, or apparatuses that support media access control for wakeup radios. A described technique provides for an access point (AP) that may identify a jitter pattern for a wakeup message, then transmit one or more wakeup messages to a wakeup radio of a station according to the jitter pattern. A station may listen using a wakeup radio for a wakeup message during wakeup listening periods according to the identified jitter pattern. The jitter pattern may be communicated between the AP and the station during an associated procedure.

Other described techniques include a station that may receive a preamble having a first bandwidth and a wakeup message having a second bandwidth from an AP. The preamble may be a legacy preamble, decodable by other wireless devices (such as Wi-Fi devices) that understand a transmission duration indicated by the preamble, and may avoid transmitting during that period while the AP transmits a wakeup message following the preamble. The first bandwidth may be the bandwidth of a legacy channel, and may be wider than the second bandwidth, which may be a narrow bandwidth used for wakeup message transmission. The AP may insert a gap, or one or more dummy symbols, between the legacy preamble and the wakeup message.

According to other described techniques, an AP transmits an identifier key to a station, and the station may determine a rotating identifier associated with the AP based on the received identifier key. The station may receive a wakeup message from the AP, compare a sender identifier with the rotating identifier, and power on a second radio, such as a primary radio, at the station. The AP can transmit the identifier key to the station, determine a rotating identifier from the identifier key, and transmit a wakeup message to a wakeup radio of the station including a sender identifier based on the rotating identifier.

In still other described techniques, an AP indicates in a wakeup message multiple stations to be activated (e.g., powered on). The indication may be an explicit indication, such as a list of station identifiers, or a bitmap indicating various stations, or based on a bloom filter. The station may receive the wakeup message at its wakeup radio, identify whether the wakeup message is for the station and, if so, activate the station's primary radio in response to the wakeup message. The station may identify the presence of one or more other fields of the wakeup message based on the contents of a frame control field of the wakeup message. The station may also monitor (e.g., using passive scanning) for a service set identifier (SSID) for the station in a SSID hash field of the wakeup message.

A method of wireless communication is described. The method may include receiving a preamble of a wakeup signal from an access point AP, the preamble having a first bandwidth, identifying a wakeup message indicator in the received preamble, and receiving, from the AP at a wakeup radio of the method, a wakeup message of the wakeup signal based at least in part on the identified wakeup message indicator, the wakeup message having a second bandwidth that is less than the first bandwidth of the preamble.

An apparatus for wireless communication is described. The apparatus may include means for receiving a preamble of a wakeup signal from an access point AP, the preamble having a first bandwidth, means for identifying a wakeup message indicator in the received preamble, and means for receiving, from the AP at a wakeup radio of the method, a wakeup message of the wakeup signal based at least in part on the identified wakeup message indicator, the wakeup message having a second bandwidth that is less than the first bandwidth of the preamble.

Another apparatus for wireless communication is described. The apparatus may include a processor, memory in electronic communication with the processor, and instructions stored in the memory. The instructions may be operable to cause the processor to receive a preamble of a wakeup signal from an access point AP, the preamble having a first bandwidth, identify a wakeup message indicator in the received preamble, and receive, from the AP at a wakeup radio of the method, a wakeup message of the wakeup signal based at least in part on the identified wakeup message indicator, the wakeup message having a second bandwidth that is less than the first bandwidth of the preamble.

A non-transitory computer-readable medium for wireless communication is described. The non-transitory computer-readable medium may include instructions operable to cause a processor to receive a preamble of a wakeup signal from an access point AP, the preamble having a first bandwidth, identify a wakeup message indicator in the received preamble, and receive, from the AP at a wakeup radio of the method, a wakeup message of the wakeup signal based at least in part on the identified wakeup message indicator, the wakeup message having a second bandwidth that is less than the first bandwidth of the preamble.

Some examples of the method, apparatus, and non-transitory computer-readable medium described above may further include processes, features, means, or instructions for receiving the wakeup message further comprises listening for the wakeup message after a predetermined interval following the received preamble.

In some examples of the method, apparatus, and non-transitory computer-readable medium described above, the predetermined interval comprises a gap, or a dummy block, or a combination thereof.

In some examples of the method, apparatus, and non-transitory computer-readable medium described above, the second bandwidth of the wakeup signal may be less than or equal to 5 MHz.

Some examples of the method, apparatus, and non-transitory computer-readable medium described above may further include processes, features, means, or instructions for powering on the wakeup radio in response to the received preamble.

Some examples of the method, apparatus, and non-transitory computer-readable medium described above may further include processes, features, means, or instructions for identifying, in the received wakeup message, an indication of a plurality of stations to be activated, the plurality of stations including the station. Some examples of the method, apparatus, and non-transitory computer-readable medium described above may further include processes, features, means, or instructions for powering on a second radio of the station based at least in part on the received indication of the plurality of stations.

In some examples of the method, apparatus, and non-transitory computer-readable medium described above, the wakeup message comprises a list of identifiers, or an identifier bitmap, or a bloom filter indication, or a combination thereof, for the plurality of stations to be activated.

In some examples of the method, apparatus, and non-transitory computer-readable medium described above, the wakeup message comprises a frame control field, or a sender address field, or a timing synchronization function (TSF) field, or a paged device identifier field, or a service set identifier SSID hash field, or a control message field, or a combination thereof.

Some examples of the method, apparatus, and non-transitory computer-readable medium described above may further include processes, features, means, or instructions for receiving a frame control field in the wakeup message. Some examples of the method, apparatus, and non-transitory computer-readable medium described above may further include processes, features, means, or instructions for identifying a presence of one or more fields of the wakeup message based at least in part on the received frame control field.

In some examples of the method, apparatus, and non-transitory computer-readable medium described above, the one or more fields of the frame control field comprise a version field, or a length field, or a paging field, or a control field, or a SSID field, or a broadcast field, or a combination thereof.

Some examples of the method, apparatus, and non-transitory computer-readable medium described above may further include processes, features, means, or instructions for monitoring for a SSID hash field in the wakeup message for an identifier of the station.

Some examples of the method, apparatus, and non-transitory computer-readable medium described above may further include processes, features, means, or instructions for identifying a jitter pattern to be used by the AP to transmit the wakeup message. Some examples of the method, apparatus, and non-transitory computer-readable medium described above may further include processes, features, means, or instructions for listening, using the wakeup radio, for the wakeup message during a plurality of wakeup listening periods based at least in part on the identified jitter pattern. Some examples of the method, apparatus, and non-transitory computer-readable medium described above may further include processes, features, means, or instructions for receiving the wakeup message during at least one of the plurality of wakeup listening periods.

Some examples of the method, apparatus, and non-transitory computer-readable medium described above may further include processes, features, means, or instructions for identifying the jitter pattern by being executable by the processor to cause the method to receive an indication of the jitter pattern from the AP during association.

In some examples of the method, apparatus, and non-transitory computer-readable medium described above, the jitter pattern modifies time intervals between the plurality of listening periods.

Some examples of the method, apparatus, and non-transitory computer-readable medium described above may further include processes, features, means, or instructions for determining a rotating identifier associated with the AP based at least in part on a received identifier key. Some examples of the method, apparatus, and non-transitory computer-readable medium described above may further include processes, features, means, or instructions for receiving a sender identifier in the received wakeup message. Some examples of the method, apparatus, and non-transitory computer-readable medium described above may further include processes, features, means, or instructions for comparing the sender identifier with the determined rotating identifier. Some examples of the method, apparatus, and non-transitory computer-readable medium described above may further include processes, features, means, or instructions for powering on a second radio of the method based at least in part on the comparison.

Some examples of the method, apparatus, and non-transitory computer-readable medium described above may further include processes, features, means, or instructions for determining the rotating identifier further comprises calculating the rotating identifier using: an inner hash function, or an outer hash function, or a combination thereof. In some examples of the method, apparatus, and non-transitory computer-readable medium described above, a time value, or a sequence number value, or a combination thereof.

Some examples of the method, apparatus, and non-transitory computer-readable medium described above may further include processes, features, means, or instructions for associating with the AP, wherein the identifier key may be received from the AP during association.

In some examples of the method, apparatus, and non-transitory computer-readable medium described above, the preamble comprises a legacy short training (L-STF) field, a legacy long training (L-LTF) field, and a legacy signal (L-SIG) field.

A method of wireless communication is described. The method may include transmitting, to a station, a preamble of a wakeup signal, the preamble having a first bandwidth and including a wakeup message indicator indicating a transmission of a wakeup message of the wakeup signal and transmitting the wakeup message of the wakeup signal to a wakeup radio of the station, the wakeup message having a second bandwidth narrower than the first bandwidth.

An apparatus for wireless communication is described. The apparatus may include means for transmitting, to a station, a preamble of a wakeup signal, the preamble having a first bandwidth and including a wakeup message indicator indicating a transmission of a wakeup message of the wakeup signal and means for transmitting the wakeup message of the wakeup signal to a wakeup radio of the station, the wakeup message having a second bandwidth narrower than the first bandwidth.

Another apparatus for wireless communication is described. The apparatus may include a processor, memory in electronic communication with the processor, and instructions stored in the memory. The instructions may be operable to cause the processor to transmit, to a station, a preamble of a wakeup signal, the preamble having a first bandwidth and including a wakeup message indicator indicating a transmission of a wakeup message of the wakeup signal and transmit the wakeup message of the wakeup signal to a wakeup radio of the station, the wakeup message having a second bandwidth narrower than the first bandwidth.

A non-transitory computer-readable medium for wireless communication is described. The non-transitory computer-readable medium may include instructions operable to cause a processor to transmit, to a station, a preamble of a wakeup signal, the preamble having a first bandwidth and including a wakeup message indicator indicating a transmission of a wakeup message of the wakeup signal and transmit the wakeup message of the wakeup signal to a wakeup radio of the station, the wakeup message having a second bandwidth narrower than the first bandwidth.

Some examples of the method, apparatus, and non-transitory computer-readable medium described above may further include processes, features, means, or instructions for waiting a predetermined interval after transmitting the preamble to transmit the wakeup message.

Some examples of the method, apparatus, and non-transitory computer-readable medium described above may further include processes, features, means, or instructions for transmitting one or more dummy symbols between the preamble and the wakeup radio frame.

In some examples of the method, apparatus, and non-transitory computer-readable medium described above, the predetermined interval comprises a gap, or a dummy block, or a combination thereof. In some examples of the method, apparatus, and non-transitory computer-readable medium described above, the second bandwidth of the wakeup signal may be less than or equal to 5 MHz.

Some examples of the method, apparatus, and non-transitory computer-readable medium described above may further include processes, features, means, or instructions for identifying a plurality of stations to be activated by the AP.

Some examples of the method, apparatus, and non-transitory computer-readable medium described above may further include processes, features, means, or instructions for transmitting an indication of the identified plurality of stations in the wakeup message.

Some examples of the method, apparatus, and non-transitory computer-readable medium described above may further include processes, features, means, or instructions for transmitting a frame control field in the wakeup message to indicate a presence of one or more fields of the wakeup message.

Some examples of the method, apparatus, and non-transitory computer-readable medium described above may further include processes, features, means, or instructions for identifying a jitter pattern for a plurality of wakeup transmission periods. Some examples of the method, apparatus, and non-transitory computer-readable medium described above may further include processes, features, means, or instructions for transmitting, during at least one of a plurality of wakeup transmission periods, the wakeup message to the wakeup radio of the station based at least in part on the jitter pattern.

Some examples of the method, apparatus, and non-transitory computer-readable medium described above may further include processes, features, means, or instructions for transmitting an indication of the jitter pattern to the station during association.

Some examples of the method, apparatus, and non-transitory computer-readable medium described above may further include processes, features, means, or instructions for transmitting an identifier key to the station. Some examples of the method, apparatus, and non-transitory computer-readable medium described above may further include processes, features, means, or instructions for determining a rotating identifier based at least in part on the identifier key. Some examples of the method, apparatus, and non-transitory computer-readable medium described above may further include processes, features, means, or instructions for transmitting a sender identifier in the wakeup message, the sender identifier corresponding to the determined rotating identifier.

Some examples of the method, apparatus, and non-transitory computer-readable medium described above may further include processes, features, means, or instructions for associating with the station, wherein the identifier key may be transmitted to the station during association.

A method of wireless communication is described. The method may include a memory that stores instructions, a processor coupled with the memory, wherein the processor and the memory are configured to identify a jitter pattern to be used by an AP to transmit a wakeup message, listening, using a wakeup radio, for the wakeup message during a plurality of wakeup listening periods based at least in part on the identified jitter pattern, and receiving the wakeup message during at least one of the plurality of wakeup listening periods.

An apparatus for wireless communication is described. The apparatus may include a memory that stores instructions, a processor coupled with the memory, wherein the processor and the memory are configured to identify a jitter pattern to be used by an AP to transmit a wakeup message, means for listening, using a wakeup radio, for the wakeup message during a plurality of wakeup listening periods based at least in part on the identified jitter pattern, and means for receiving the wakeup message during at least one of the plurality of wakeup listening periods.

Another apparatus for wireless communication is described. The apparatus may include a processor, memory in electronic communication with the processor, and instructions stored in the memory. The instructions may be operable to cause the processor to a memory that stores instructions, a processor coupled with the memory, wherein the processor and the memory are configured to identify a jitter pattern to be used by an AP to transmit a wakeup message, listen, using a wakeup radio, for the wakeup message during a plurality of wakeup listening periods based at least in part on the identified jitter pattern, and receive the wakeup message during at least one of the plurality of wakeup listening periods.

A non-transitory computer readable medium for wireless communication is described. The non-transitory computer-readable medium may include instructions operable to cause a processor to a memory that stores instructions, a processor coupled with the memory, wherein the processor and the memory are configured to identify a jitter pattern to be used by an AP to transmit a wakeup message, listen, using a wakeup radio, for the wakeup message during a plurality of wakeup listening periods based at least in part on the identified jitter pattern, and receive the wakeup message during at least one of the plurality of wakeup listening periods.

In some examples of the method, apparatus, and non-transitory computer-readable medium described above, the processor and the memory may be configured to identify the jitter pattern by being configured to receive an indication of the jitter pattern from the AP during association.

In some examples of the method, apparatus, and non-transitory computer-readable medium described above, the jitter pattern modifies time intervals between the plurality of listening periods.

A method of wireless communication is described. The method may include a memory that stores instructions, a processor coupled with the memory, wherein the processor and the memory are configured to identify a jitter pattern for a plurality of wakeup transmission periods, and transmitting, during at least one of a plurality of wakeup transmission periods, a wakeup message to a wakeup radio of the station based at least in part on the jitter pattern.

An apparatus for wireless communication is described. The apparatus may include a memory that stores instructions, a processor coupled with the memory, wherein the processor and the memory are configured to identify a jitter pattern for a plurality of wakeup transmission periods, and means for transmitting, during at least one of a plurality of wakeup transmission periods, a wakeup message to a wakeup radio of the station based at least in part on the jitter pattern.

Another apparatus for wireless communication is described. The apparatus may include a processor, memory in electronic communication with the processor, and instructions stored in the memory. The instructions may be operable to cause the processor to a memory that stores instructions, a processor coupled with the memory, wherein the processor and the memory are configured to identify a jitter pattern for a plurality of wakeup transmission periods, and transmit, during at least one of a plurality of wakeup transmission periods, a wakeup message to a wakeup radio of the station based at least in part on the jitter pattern.

A non-transitory computer readable medium for wireless communication is described. The non-transitory computer-readable medium may include instructions operable to cause a processor to a memory that stores instructions, a processor coupled with the memory, wherein the processor and the memory are configured to identify a jitter pattern for a plurality of wakeup transmission periods, and transmit, during at least one of a plurality of wakeup transmission periods, a wakeup message to a wakeup radio of the station based at least in part on the jitter pattern.

In some examples of the method, apparatus, and non-transitory computer-readable medium described above, the processor and the memory may be configured to identify the jitter pattern by being configured to transmit an indication of the jitter pattern to the station during association.

In some examples of the method, apparatus, and non-transitory computer-readable medium described above, the jitter pattern modifies one or more time intervals between the plurality of wakeup transmission periods.

A method of wireless communication is described. The method may include a memory that stores instructions, a processor coupled with the memory, wherein the processor and the memory are configured to receive, from an AP, a preamble having a first bandwidth, identifying a wakeup message indicator in the received preamble, and receiving, from the AP, a wakeup message at a wakeup radio of the station based at least in part on the identified wakeup message indicator, the wakeup message having a second bandwidth that is less than the first bandwidth.

An apparatus for wireless communication is described. The apparatus may include a memory that stores instructions, a processor coupled with the memory, wherein the processor and the memory are configured to receive, from an AP, a preamble having a first bandwidth, means for identifying a wakeup message indicator in the received preamble, and means for receiving, from the AP, a wakeup message at a wakeup radio of the station based at least in part on the identified wakeup message indicator, the wakeup message having a second bandwidth that is less than the first bandwidth.

Another apparatus for wireless communication is described. The apparatus may include a processor, memory in electronic communication with the processor, and instructions stored in the memory. The instructions may be operable to cause the processor to a memory that stores instructions, a processor coupled with the memory, wherein the processor and the memory are configured to receive, from an AP, a preamble having a first bandwidth, identify a wakeup message indicator in the received preamble, and receive, from the AP, a wakeup message at a wakeup radio of the station based at least in part on the identified wakeup message indicator, the wakeup message having a second bandwidth that is less than the first bandwidth.

A non-transitory computer readable medium for wireless communication is described. The non-transitory computer-readable medium may include instructions operable to cause a processor to a memory that stores instructions, a processor coupled with the memory, wherein the processor and the memory are configured to receive, from an AP, a preamble having a first bandwidth, identify a wakeup message indicator in the received preamble, and receive, from the AP, a wakeup message at a wakeup radio of the station based at least in part on the identified wakeup message indicator, the wakeup message having a second bandwidth that is less than the first bandwidth.

In some examples of the method, apparatus, and non-transitory computer-readable medium described above, the processor and the memory may be configured to receive the wakeup message by being configured to listen for the wakeup message after a predetermined interval following the received preamble.

In some examples of the method, apparatus, and non-transitory computer-readable medium described above, the instructions may be further executable by the processor to power on a wakeup radio of the station in response to the received preamble.

A method of wireless communication is described. The method may include a memory that stores instructions, a processor coupled with the memory, wherein the processor and the memory are configured to transmit, to a station, a preamble of a wakeup message for the station in a first bandwidth, the preamble including a wakeup message indicator indicating a transmission of the wakeup message, and transmitting the wakeup message to a wakeup radio of the station in a second bandwidth, the second bandwidth narrower than the first bandwidth.

An apparatus for wireless communication is described. The apparatus may include a memory that stores instructions, a processor coupled with the memory, wherein the processor and the memory are configured to transmit, to a station, a preamble of a wakeup message for the station in a first bandwidth, the preamble including a wakeup message indicator indicating a transmission of the wakeup message, and means for transmitting the wakeup message to a wakeup radio of the station in a second bandwidth, the second bandwidth narrower than the first bandwidth.

Another apparatus for wireless communication is described. The apparatus may include a processor, memory in electronic communication with the processor, and instructions stored in the memory. The instructions may be operable to cause the processor to a memory that stores instructions, a processor coupled with the memory, wherein the processor and the memory are configured to transmit, to a station, a preamble of a wakeup message for the station in a first bandwidth, the preamble including a wakeup message indicator indicating a transmission of the wakeup message, and transmit the wakeup message to a wakeup radio of the station in a second bandwidth, the second bandwidth narrower than the first bandwidth.

A non-transitory computer readable medium for wireless communication is described. The non-transitory computer-readable medium may include instructions operable to cause a processor to a memory that stores instructions, a processor coupled with the memory, wherein the processor and the memory are configured to transmit, to a station, a preamble of a wakeup message for the station in a first bandwidth, the preamble including a wakeup message indicator indicating a transmission of the wakeup message, and transmit the wakeup message to a wakeup radio of the station in a second bandwidth, the second bandwidth narrower than the first bandwidth.

In some examples of the method, apparatus, and non-transitory computer-readable medium described above, the instructions may be further executable by the processor to wait a predetermined interval after transmitting the preamble to transmit the wakeup message.

In some examples of the method, apparatus, and non-transitory computer-readable medium described above, the instructions may be further executable by the processor to transmit one or more dummy symbols between the preamble and the wakeup radio frame.

A method of wireless communication is described. The method may include a memory that stores instructions, a processor coupled with the memory, wherein the processor and the memory are configured to receive an identifier key from an AP, determining a rotating identifier associated with the AP based at least in part on the received identifier key, receiving, at a wakeup radio of the station, a wakeup message from the AP, the wakeup message comprising a sender identifier, comparing the sender identifier with the determined rotating identifier, and powering on a second radio of the station based at least in part on the comparison.

An apparatus for wireless communication is described. The apparatus may include a memory that stores instructions, a processor coupled with the memory, wherein the processor and the memory are configured to receive an identifier key from an AP, means for determining a rotating identifier associated with the AP based at least in part on the received identifier key, means for receiving, at a wakeup radio of the station, a wakeup message from the AP, the wakeup message comprising a sender identifier, means for comparing the sender identifier with the determined rotating identifier, and means for powering on a second radio of the station based at least in part on the comparison.

Another apparatus for wireless communication is described. The apparatus may include a processor, memory in electronic communication with the processor, and instructions stored in the memory. The instructions may be operable to cause the processor to a memory that stores instructions, a processor coupled with the memory, wherein the processor and the memory are configured to receive an identifier key from an AP, determine a rotating identifier associated with the AP based at least in part on the received identifier key, receive, at a wakeup radio of the station, a wakeup message from the AP, the wakeup message comprising a sender identifier, compare the sender identifier with the determined rotating identifier, and power on a second radio of the station based at least in part on the comparison.

A non-transitory computer readable medium for wireless communication is described. The non-transitory computer-readable medium may include instructions operable to cause a processor to a memory that stores instructions, a processor coupled with the memory, wherein the processor and the memory are configured to receive an identifier key from an AP, determine a rotating identifier associated with the AP based at least in part on the received identifier key, receive, at a wakeup radio of the station, a wakeup message from the AP, the wakeup message comprising a sender identifier, compare the sender identifier with the determined rotating identifier, and power on a second radio of the station based at least in part on the comparison.

In some examples of the method, apparatus, and non-transitory computer-readable medium described above, the processor and the memory may be configured to determine the rotating identifier by being configured to calculate the rotating identifier using an inner hash function, or an outer hash function, or a combination thereof. In some examples of the method, apparatus, and non-transitory computer-readable medium described above, a time value, or a sequence number value, or a combination thereof.

In some examples of the method, apparatus, and non-transitory computer-readable medium described above, the instructions may be further executable by the processor to associate with the AP, wherein the identifier key may be received from the AP during association.

A method of wireless communication is described. The method may include a memory that stores instructions, a processor coupled with the memory, wherein the processor and the memory are configured to transmit an identifier key to a station, determining a rotating identifier based at least in part on the identifier key, and transmitting, to a wakeup radio of the station, a wakeup message comprising a sender identifier, the sender identifier corresponding to the determined rotating identifier.

An apparatus for wireless communication is described. The apparatus may include a memory that stores instructions, a processor coupled with the memory, wherein the processor and the memory are configured to transmit an identifier key to a station, means for determining a rotating identifier based at least in part on the identifier key, and means for transmitting, to a wakeup radio of the station, a wakeup message comprising a sender identifier, the sender identifier corresponding to the determined rotating identifier.

Another apparatus for wireless communication is described. The apparatus may include a processor, memory in electronic communication with the processor, and instructions stored in the memory. The instructions may be operable to cause the processor to a memory that stores instructions, a processor coupled with the memory, wherein the processor and the memory are configured to transmit an identifier key to a station, determine a rotating identifier based at least in part on the identifier key, and transmit, to a wakeup radio of the station, a wakeup message comprising a sender identifier, the sender identifier corresponding to the determined rotating identifier.

A non-transitory computer readable medium for wireless communication is described. The non-transitory computer-readable medium may include instructions operable to cause a processor to a memory that stores instructions, a processor coupled with the memory, wherein the processor and the memory are configured to transmit an identifier key to a station, determine a rotating identifier based at least in part on the identifier key, and transmit, to a wakeup radio of the station, a wakeup message comprising a sender identifier, the sender identifier corresponding to the determined rotating identifier.

In some examples of the method, apparatus, and non-transitory computer-readable medium described above, the processor and the memory may be configured to determine the rotating identifier by being configured to compute the rotating identifier using an inner hash function, an outer hash function, or a combination thereof. In some examples of the method, apparatus, and non-transitory computer-readable medium described above, a time value, or a sequence number value, or a combination thereof.

In some examples of the method, apparatus, and non-transitory computer-readable medium described above, the instructions may be further executable by the processor to associate with the station, wherein the identifier key may be transmitted to the station during association.

A method of wireless communication is described. The method may include a memory that stores instructions, a processor coupled with the memory, wherein the processor and the memory are configured to receive, at a wakeup radio of the station, a wakeup message from an AP, the wakeup message comprising an indication of a plurality of stations to be activated, and powering on a second radio of the station based at least in part on the received indication.

An apparatus for wireless communication is described. The apparatus may include a memory that stores instructions, a processor coupled with the memory, wherein the processor and the memory are configured to receive, at a wakeup radio of the station, a wakeup message from an AP, the wakeup message comprising an indication of a plurality of stations to be activated, and means for powering on a second radio of the station based at least in part on the received indication.

Another apparatus for wireless communication is described. The apparatus may include a processor, memory in electronic communication with the processor, and instructions stored in the memory. The instructions may be operable to cause the processor to a memory that stores instructions, a processor coupled with the memory, wherein the processor and the memory are configured to receive, at a wakeup radio of the station, a wakeup message from an AP, the wakeup message comprising an indication of a plurality of stations to be activated, and power on a second radio of the station based at least in part on the received indication.

A non-transitory computer readable medium for wireless communication is described. The non-transitory computer-readable medium may include instructions operable to cause a processor to a memory that stores instructions, a processor coupled with the memory, wherein the processor and the memory are configured to receive, at a wakeup radio of the station, a wakeup message from an AP, the wakeup message comprising an indication of a plurality of stations to be activated, and power on a second radio of the station based at least in part on the received indication.

In some examples of the method, apparatus, and non-transitory computer-readable medium described above, the wakeup message comprises a frame control field, or a sender address field, or a TSF field, or a paged device identifier field, or a SSID hash field, or a control message field, or a combination thereof.

In some examples of the method, apparatus, and non-transitory computer-readable medium described above, the processor and the memory may be further configured to receive a frame control field in the wakeup message. Some examples of the method, apparatus, and non-transitory computer-readable medium described above may further include processes, features, means, or instructions for identifying a presence of one or more fields of the wakeup message based at least in part on a the received frame control field.

In some examples of the method, apparatus, and non-transitory computer-readable medium described above, the one or more fields of the frame control field comprise a version field, or a length field, or a paging field, or a control field, or a SSID field, or a broadcast field, or a combination thereof.

In some examples of the method, apparatus, and non-transitory computer-readable medium described above, the processor and the memory may be further configured to monitor for a SSID hash field in the wakeup message for an identifier of the station.

In some examples of the method, apparatus, and non-transitory computer-readable medium described above, the wakeup message comprises a list of identifiers, an identifier bitmap, or a bloom filter indication associated with the plurality of stations to be activated.

A method of wireless communication is described. The method may include a memory that stores instructions, a processor coupled with the memory, wherein the processor and the memory are configured to identify a plurality of stations to be activated by the AP, and transmitting an indication of the identified plurality of stations in a wakeup radio message to the plurality of stations to be activated.

An apparatus for wireless communication is described. The apparatus may include a memory that stores instructions, a processor coupled with the memory, wherein the processor and the memory are configured to identify a plurality of stations to be activated by the AP, and means for transmitting an indication of the identified plurality of stations in a wakeup radio message to the plurality of stations to be activated.

Another apparatus for wireless communication is described. The apparatus may include a processor, memory in electronic communication with the processor, and instructions stored in the memory. The instructions may be operable to cause the processor to a memory that stores instructions, a processor coupled with the memory, wherein the processor and the memory are configured to identify a plurality of stations to be activated by the AP, and transmit an indication of the identified plurality of stations in a wakeup radio message to the plurality of stations to be activated.

A non-transitory computer readable medium for wireless communication is described. The non-transitory computer-readable medium may include instructions operable to cause a processor to a memory that stores instructions, a processor coupled with the memory, wherein the processor and the memory are configured to identify a plurality of stations to be activated by the AP, and transmit an indication of the identified plurality of stations in a wakeup radio message to the plurality of stations to be activated.

In some examples of the method, apparatus, and non-transitory computer-readable medium described above, the wakeup message comprises a frame control field, or a sender address field, or a TSF field, or a paged device identifier field, or a SSID hash field, or a control message field, or a combination thereof.

In some examples of the method, apparatus, and non-transitory computer-readable medium described above, the processor and the memory may be further configured to transmit a frame control field in the wakeup message to indicate a presence of one or more fields of the wakeup message.

In some examples of the method, apparatus, and non-transitory computer-readable medium described above, the one or more fields of the frame control field comprise a version field, or a length field, or a paging field, or a control field, or a SSID field, or a broadcast field, or a combination thereof.

In some examples of the method, apparatus, and non-transitory computer-readable medium described above, the wakeup radio message comprises a list of identifiers, an identifier bitmap, or a bloom filter indication for the plurality of stations to be activated.

DETAILED DESCRIPTION

Figure 1:
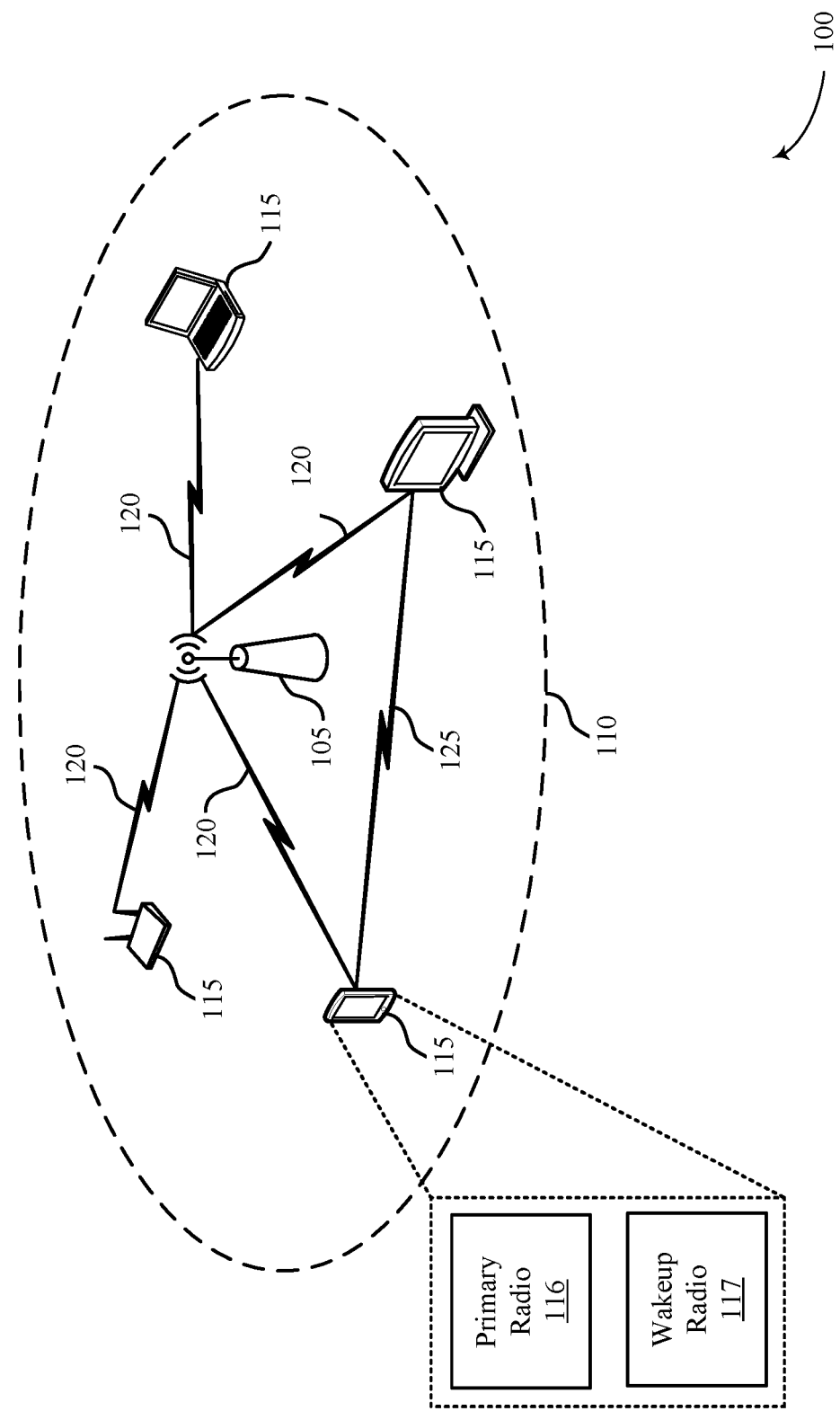
FIG. 1 illustrates an example of a system for wireless communication that supports media access control for wakeup radios in accordance with aspects of the present disclosure.

In some cases, a primary radio may be configured to communicate with a wakeup radio. An access point (AP) may send a wakeup signal to a wakeup radio, indicating that the primary radio has some data to receive. A wakeup radio may receive the wakeup signal and may provide the primary radio with an indication to wake up to receive the pending data.

However, in some cases, wakeup transmissions from an AP may overlap with other synchronous signals, such as a beacon interval from a neighboring AP. Such overlap may cause interference, which could result in the wakeup radio missing or incorrectly decoding a wakeup signal. In such examples, wakeup radio transmission times may configured to be transmitted periodically, but including a random jitter to the transmission time. The jitter used by the AP to transmit the may be known by the station (STA), and the intervals between wakeup signals may be jittered by a time offset to avoid synchronization with other synchronous signals.

In some cases, it may be desirable for other devices to receive and be able to decode a preamble of the wakeup signal, for example so that the AP transmitting the wakeup signal can reserve the medium for the wakeup radio wakeup signal and prevent neighboring wireless devices, such as other APs or STAs, from transmitting during transmission of the wakeup signal. However, for a wakeup radio to receive and decode a wakeup signal that spans an entire wide band may require more power than a wakeup radio should expend. Thus, a wakeup radio PPDU preamble may be transmitted on a wider band to be receivable by the neighboring wireless devices, while the wakeup signal may be transmitted on a narrower band, which may require less power to receive at the wakeup radio.

In some cases, it may be necessary for the wakeup signal to be authenticatable, in order to differentiate the signal from spoofed signals sent by other devices. However, a wakeup radio may need to be configured to receive a wakeup signal without expending unnecessary power. Thus, the AP may generate a sender identifier using a hash key according to techniques that use less frequent computation.

In some cases, an AP may page specific wireless devices among a set of wireless devices. However, determining whether a device has been paged may require a large amount of power at a wakeup radio. Furthermore, wakeup radios may remain awake for extended periods of time to determine whether they have been paged. Therefore, an AP may identify paged devices by, for example, compiling a list, generating a bitmap, or generating a bloom filter indication that reduce the burden on a wireless device to determine whether the device has been paged. Aspects of the disclosure are initially described in the context of a wireless communications system. Aspects of the disclosure are also described in the context of a duty cycle operation diagram, a wakeup signal PPDU diagram, a frame structure diagram, and a control field diagram. Aspects of the disclosure are further illustrated by and described with reference to apparatus diagrams, system diagrams, and flowcharts that relate to media access control for wakeup radios.

FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as wireless communication terminals, including mobile stations, phones personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station associated with the WLAN 100 may be connected to a wired or wireless distribution system that may allow multiple APs 105 to be connected in an ESS. WLAN 100 may support media access control for wakeup radio.

A STA 115 may include a primary radio 116 and a low-power wakeup radio 117 for communication. The primary radio 116 may be used during active modes or for high-data throughput applications. The primary radio 116 may also be referred to as a primary connectivity radio or main radio. The low-power wakeup radio 117 may be used during low-power modes or for low-throughput applications. In some examples, the low-power wakeup radio 117 may be a wakeup radio. In some examples, the wakeup radio 117 may include a wakeup receiver and/or a wakeup transmitter. For example, when STA 115 or AP 105 may transmit a wakeup message, STA 115 may use a wakeup transmitter of its wakeup radio 117. When STA 115 may receive a wakeup message, STA 115 may use a wakeup receiver of its wakeup radio 117. The wakeup radio 117 may also be referred to as a companion radio, low-power companion radio, low power wakeup radio, etc.

A STA 115 may listen using a wakeup radio, such as wakeup radio 117, for a wakeup message during wakeup listening periods according to the identified jitter pattern. STA 115 may receive a preamble having a first bandwidth and a wakeup message having a second bandwidth. An AP 105 may transmit an identifier key to STA 115, and STA 115 may determine a rotating identifier (RI) associated with the AP 105 based on the received identifier key. The STA 115 may receive a wakeup message from AP 105, compare a sender identifier with the rotating identifier, and power on a second radio, such as primary radio 116. STA 115 may also receive a wakeup message that includes an indication of one or more other STAs 115 for whom a primary radio is to be activated or powered on.

A STA 115 may be located in the intersection of more than one coverage area 110 and may associate with more than one AP 105. A single AP 105 and an associated set of STAs 115 may be referred to as a BSS. An ESS is a set of connected BSSs. A distribution system may be used to connect APs 105 in an ESS. In some cases, the coverage area 110 of an AP 105 may be divided into sectors. The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and medium access control (MAC) layers from IEEE 802.11 and versions including, but not limited to, 802.11b, 802.11g, 802.11a, 802.11n, 802.11ac, 802.11ad, 802.11ah, 802.11ax, 802.11ay, 802.11ba, etc. In other implementations, peer-to-peer connections or ad hoc networks may be implemented within WLAN 100. Devices in WLAN 100 may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., carrier sense multiple access with collision avoidance CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of a request to send (RTS) packet transmitted by a sending STA 115 (or AP 105) and a clear to send (CTS) packet transmitted by the receiving STA 115 (or AP 105). This may alert other devices within range of the sender and receiver not to transmit for the duration of the primary transmission. Thus, RTS/CTS may help mitigate a hidden node problem.

Figure 2:
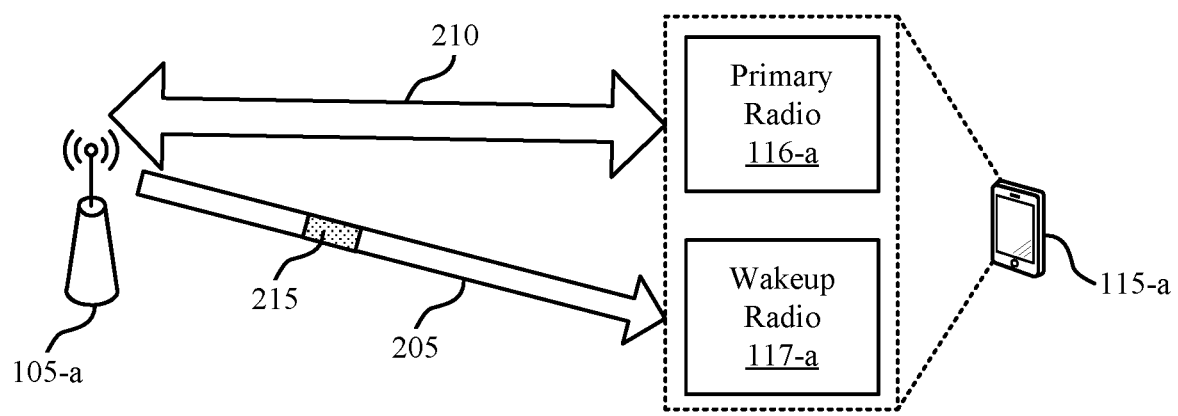
FIG. 2 illustrates an example of a wireless communications system that supports media access control for wakeup radios in accordance with aspects of the present disclosure.

FIG. 2 illustrates an example of a wireless communications system 200 that supports media access control for wakeup radios in accordance with various aspects of the present disclosure. Wireless communications system 200 may include an AP 105-*a* and a STA 115-*a*, which may be examples of the corresponding devices described with reference to FIG. 1. STA 115-*a* may include a primary radio 116-*a* (which may be similar in some aspects to primary radio 116 of FIG. 1) and a wakeup radio 117-*a* (which may be similar in some aspects to wakeup radio 117 of FIG. 1). A STA 115 may include a primary radio 116-*a* and a low-power wakeup radio 117-*a* for communication. The primary radio 116-*a* may be used during active modes or for high-data throughput applications. The low-power wakeup radio 117-*a* may be used during low-power modes or for low-throughput applications. In some examples, the low-power wakeup radio 117-*a* may be a wakeup radio.

A first communication link 210 may be established between AP 105-*a* and the primary radio 116-*a* of the STA 115-*a*, which may be a wireless device. The first communication link 210 may be configured to have a high-throughput of data. A second communication link 205 may be established between the AP 105-*a* and the low-power wakeup radio 117-*a* of the STA 115-*a*. The second communication link may be configured to conserve power during communications. The communication links 205, 210 may be examples of wireless links 120 described with reference to FIG. 1.

The STAs 115-*a* may be designed to allow a user to send and receive data to and from various networks and entities. In some circumstances, the STA 115-*a* may be instructed to download a large amount of data. The primary radio 116-*a* may be configured to provide a relatively high throughput of data to meet the needs of a user of the STA 115-*a*. In other circumstances, the STA 115-*a* may be inactive. STA 115-*a* may have a limited amount of battery power. Radios configured to provide high-data-throughput may require more power than other types of radios. Even during inactive times, data may be sent to the STA 115-*a* (e.g., a text message or an email) and the user may desire to receive that data immediately. During such periods, maintaining power to the primary radio 116-*a* (e.g., the high-throughput radio) may needlessly drain power. The primary radio 116-*a* may be powered down during inactive periods, periodically waking up during certain intervals to check for transmissions from AP 105-*a*.

In some cases, however, primary radio 116-*a* may expend more power than necessary by waking up to regularly to communicate via bidirectional communication link 210. In order to communicate via bidirectional communication link 210, it may be necessary for primary radio 116-*a* to wakeup periodically to receive transmissions, such as beacons from associated AP 105-*a*. In some cases, to avoid unnecessarily expending power, primary radio 116-*a* may remain in a sleep mode or low power mode for an extended period of time. During a sleep mode, STA 115-*a* may periodically activate wakeup radio 117-*a*, which may be a wakeup radio, to listen for and decode a wakeup signal 215 from AP 105-*b*. Wakeup signal 215 may indicate to wakeup radio 117-*a* whether communications are waiting at AP 105-*a* to be transmitted to STA 115-*a*. STA 115-*a* may then power on primary radio 116-*a* in response to wakeup signal 215 received at wakeup radio 117-*a*.

However, in some cases, wakeup signal 215 from AP 105-*a* may overlap with wakeup signals sent from neighboring APs 105 or other periodic signals (e.g., with a regular duty cycle), such as beacons. Such overlap might cause interference, causing wakeup radio 117-*a* to miss or incorrectly decode wakeup signal 215. At least in part to address this problem, wakeup radio transmissions may be configured to include a jitter, which may be pseudorandom in some examples. The intervals between wakeup signals 215 may be jittered by a certain time offset (e.g. a few milliseconds) to prevent a wakeup signal 215 from synchronizing with other synchronous or periodic transmissions (e.g., other wakeup radio transmissions or beacons from neighboring APs). The jitter may be applied relative to a fixed interval period. In some examples, the jitter to be used by the AP 105-*a* and/or the wakeup radio transmission interval to be jittered, may be communicated to STA 115-*a* during association.

In some examples, it may be desirable for other devices to be aware of a wakeup signal, so that the medium for the transmission of wakeup signal 215 may be reserved and interference prevented. A wakeup signal may be a physical layer conversion protocol (PLCP) protocol data unit (PPDU). A wakeup signal may be transmitted along with all or a portion of a legacy preamble for neighboring devices able to receive and decode the preamble to understand that the medium will be busy during a subsequent transmission (e.g., the wakeup signal transmission period). A preamble may be transmitted over a certain bandwidth (e.g., a channel, such as a 20 MHz channel), to be understandable by neighboring devices. However, a wakeup signal may use a narrower bandwidth. If wakeup signal 215 spans the entire, wider bandwidth of the preamble, wakeup radio 117-*a* may require more power than necessary for a wakeup radio 117-*a* to receive and decode wakeup signal 215. Thus, a wakeup signal preamble may be a legacy preamble transmitted on a wide band, while, the portion of wakeup signal 215 that contains the wakeup message may be transmitted on a narrow band, which may require less power to receive at wakeup radio 117-*a*. Thus, transmission power may be saved, and interference reduced.

Wakeup signal 215 may include a legacy preamble portion, and a wakeup message portion. The legacy preamble portion may include a legacy short training field (L-STF) field, a legacy long training field (L-LTF) field, and a legacy signal (LSIG) field. The wakeup message portion may include a wakeup radio synchronization/preamble field (which may be referred to as a WUR preamble) and wakeup message bits (which may be referred to as a WUR payload). Upon receiving and decoding these fields, a neighboring AP 105 may understand that AP 105-*a* is to occupy the medium for a particular period of time, as specified by the preamble, and AP 105 may thus refrain from transmitting during the wakeup signal transmission. In particular, the neighboring AP 105 may calculate a length for the wakeup signal transmission using data rate and length information encoded in the LSIG field by AP 105-*a* that indicates the duration of the transmissions, and thus the duration of the wakeup signal transmission following the preamble. Other configurations of fields for the preamble may be used in other examples, for example to maintain compatibility with other protocols, including future Wi-Fi protocols.

In some cases, other devices such as additional APs may require some time to decode the legacy preamble before actually engaging in legacy deferral. Thus, it may be beneficial to leave a gap between the legacy preamble and the wakeup message. In some examples, the gap may be filled with one or more dummy symbols. The dummy symbols may be appropriately sized to allow for the receiving STA 115-*a* to switch from listening using one radio to another, for example from listening using primary radio 116 to listening using wakeup radio 117-*a*.

In some examples, wakeup signal 215 may include a frame control field, a sender address field, a timing synchronization function (TSF) field (e.g., for clock synchronization between devices), a paged device identifiers (IDs) field, an service set identifier (SSID) hash field, a control message field, and a cyclic redundancy check (CRC) field. The control field may include information indicating certain information is present in the rest of the wakeup message. For example, the control field structure may include a version subfield, a length subfield, a paging subfield, a control subfield, a SSID subfield, a broadcast subfield, and a reserved (RSVD) subfield (or bit).

In some examples, AP 105-*a* may vary a sender identifier at least in part to ensure that a wakeup signal is not spoofed by a malicious device. Thus, AP 105-*a* may vary the sender identifier used in wakeup signal 215 over time. In some examples, AP 105-*a* may generate pseudo random identifiers. Such pseudo random sender identifier may appear as a random sequence to a malicious observer. Thus, malicious devices may be prevented from identifying, and then spoofing a wakeup signal 215.

Furthermore, it may be beneficial to provide an authenticatable wakeup signal 215. However, it may also be beneficial to ensure that the authenticating wakeup signal 215 does not require so much computational power as to limit the ability of a low-power wakeup radio 117-*a* to decode the authenticatable wakeup signal 215. Therefore, in some examples, AP 105-*a* may associate with STA 115-*a*, and during association AP 105-*a* may generate a rotating identifier hash key (RIHK).

In some examples, AP 105-*a* may generate a rotating identifier (RI) by truncating a TSF field, for example, by truncating an eight octet TSF field to six octets by removing two LSB octets. In some examples, it may be beneficial for AP 105-*a* to generate a sender identifier by using a hash key. However, frequent generation and decoding of new hash keys may result in unnecessary expenditure of power. Therefore, AP 105-*a* may generate an inner hash and an outer hash. The inner hash may be a low computing power hash and may be run frequently by wakeup radio 117-*a*. The inner hash may be repeated (as opposed to avoiding repetition entirely and generating a new hash with each identifier) to save computing power at the wakeup radio 117-*a*. The outer hash may be used to change a temporal key that is used by the inner hash. This changing of a temporal key may maintain the security and authenticatable identifier of the inner hash. Furthermore, the outer hash may be computed less frequently by wakeup radio 117-*a*. Thus, authenticatable identifiers may be generated without requiring too much power expenditure at the wakeup radio 117-*a*.

In some cases, AP 105-*a* may want to page specific devices, such as STA 115-*a*, without paging other neighboring devices. AP 105-*a* may include information in the wakeup signal indicating which devices the AP is paging. However, to determine whether a STA 115-*a* is being paged, a wakeup radio may decode a large amount of data over a longer interval of time. Long periods of decoding in an awake state may result in unnecessary power consumption at wakeup radio 117. Therefore, AP 105-*a* may identify paged devices by compiling a list of paged IDs. A list of paged IDs may be small, which may limit the amount of time a wakeup radio 117 remains in an awake mode. For example, AP 105-*a* may limit transmission size to one octet or less per ID. In order to maintain a small message size when more than 16 identifiers need to be sent, an AP may send back to back wakeup messages. The paging IDs may be listed in ascending order. In some examples, paging IDs may be allocated such that the devices that are frequently woken up are allocated a value that is numerically higher than the values allocated to devices that wake up infrequently. Thus, devices that are infrequently paged may quickly sleep upon reviewing the initial entries on the list.

In some examples, AP 105-*a* may indicate which devices are to be paged by use of a bitmap. In some examples, a bitmap may be used for scenarios where the paged ID space in the frame is small. In other examples, AP 105-*a* may indicate which devices are to be paged by use of a bloom filter. In some examples, a bloom filter may be used for scenarios where a large paged ID space is available.

A wakeup signal 215 may be used for various additional functions. For example, other control functions may be executed via use of a wakeup signal 215. Control fields located within wakeup signal 215 may provide sufficient flexibility to introduce indications pertaining to other functions. For example, type bits in a control field may be used to indicate different types of transmission.

Figure 3:
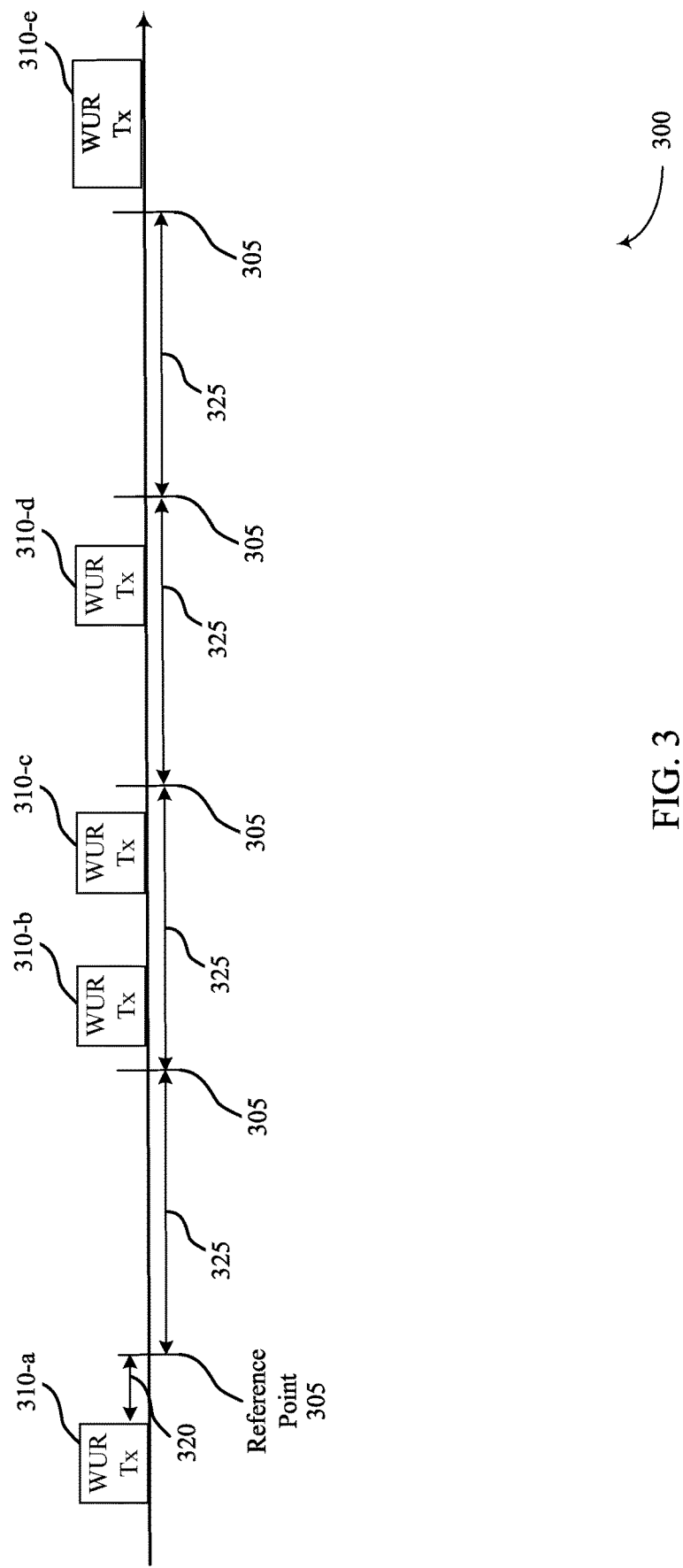
FIG. 3 illustrates an example of a duty cycle operation that supports media access control for wakeup radios in accordance with aspects of the present disclosure.

FIG. 3 illustrates an example of duty cycle operations 300 in accordance with one or more aspects of the present disclosure. In some cases, duty cycle operations 300 may represent aspects of techniques performed by a STA 115 or AP 105 as described with reference to FIGS. 1-2. In some examples, an AP 105 may transmit wakeup signals 310-*a* through 310-*e*. Transmission times may be periodic, and may align with wakeup signal reference points 305. wakeup signal reference points 305 may be period, and may be offset from each other by some fixed time interval 325.

However, in some cases, wakeup signal reference points 305 may align with other synchronous transmissions, which may also be offset by the same fixed time interval 325. For example, wakeup transmissions from an AP might overlap with a beacon interval from a neighboring AP. To avoid this problem, wakeup signal transmission times may be periodic with pseudorandom jitter. For example, wakeup signal 310-*a* may be jittered by some time interval 320. Time interval 320 may be, for example, a few milliseconds or fractions milliseconds. In some instances, wakeup signal 310-*a* may be offset prior to wakeup signal reference point 305. In other instances, wakeup signal 310-*b* may be jittered to occur after a wakeup signal reference point 305. In still other instances, a wakeup signal 310-*d* may not be offset at all, and may occur concurrent to a wakeup signal reference point 305. The jitter used by an AP 105 may be known to a STA 115, for example by AP 105 transmitting an indication of the jitter to STA 115, such as during association or other messaging. The indication of the jitter may be associated with a pseudorandom number generator, and the indication may represent an input to the pseudorandom number generator used by both AP 105 and STA 115 to determine the jitter. A wakeup radio may be associated with an AP 105, and may power on a wakeup radio at known transmission times according to the jitter.

Figures 4A, 4B, 4C:
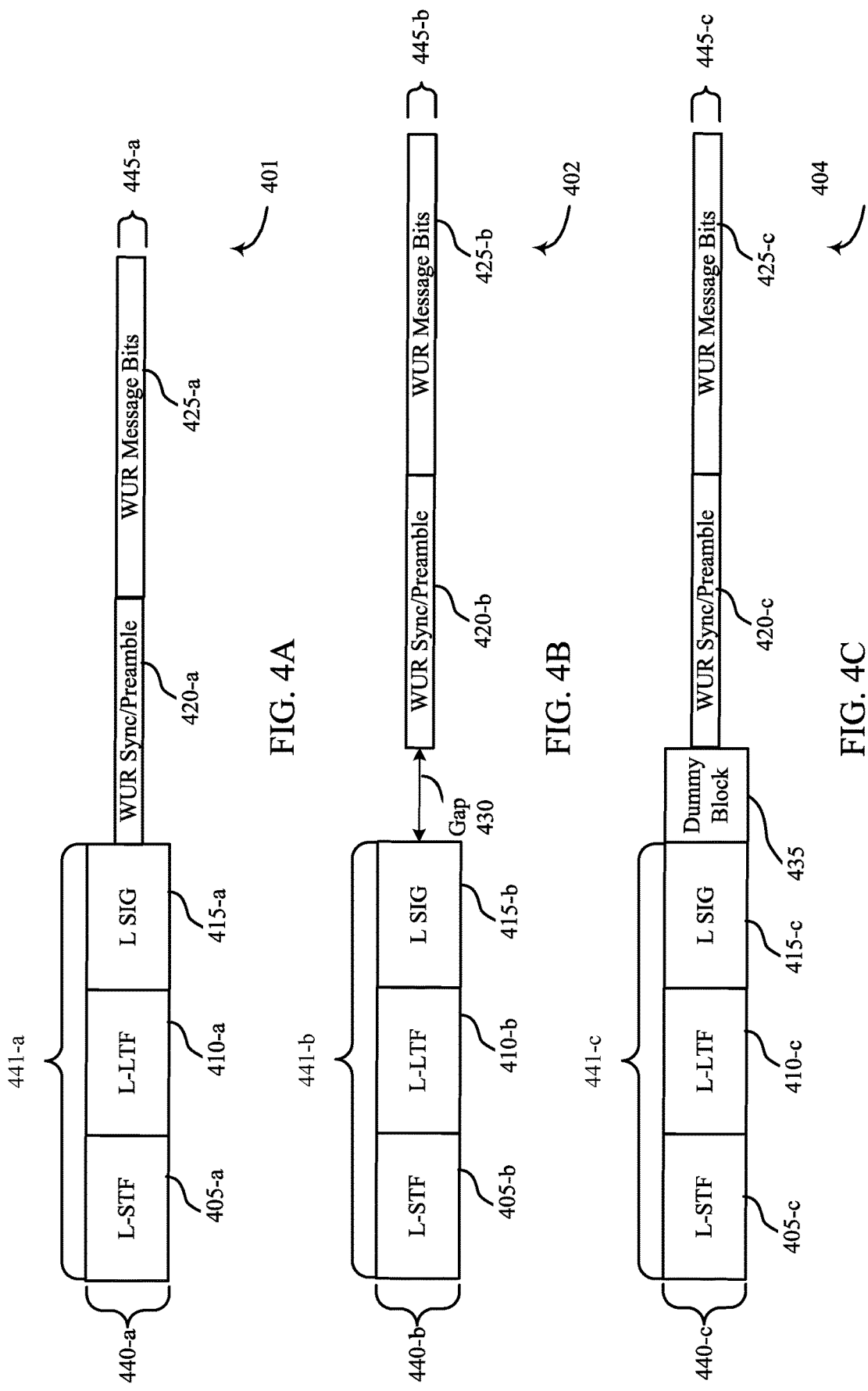
FIGS. 4A through 4C illustrate examples of wakeup signal PPDUs that support media access control for wakeup radios in accordance with aspects of the present disclosure.

FIG. 4A illustrates an example of a wakeup signal PPDU 401 in accordance with one or more aspects of the present disclosure. In some cases, wakeup signal PPDU 401 may represent aspects of techniques performed by a STA 115 or AP 105 as described with reference to FIGS. 1-3. In some examples, wakeup signal PPDU 401 may be referred to as a wakeup signal or wakeup radio frame (or WUR frame). In some examples, a wakeup signal PPDU 401 may include a preamble portion and a wakeup message portion.

A wakeup signal PPDU preamble may be or include a legacy preamble 441-*a* (which may also be referred to as a preamble). Other legacy devices may defer the medium for transmission of a wakeup signal upon receiving and decoding a legacy preamble. For example, the legacy preamble 441-*a* may include an L-STF field 405-*a*, an L-LTF field 410-*a*, and an LSIG field 415-*a*. The legacy preamble may also be transmitted on a wider bandwidth 440 than the wakeup message. The wider bandwidth may be a Wi-Fi channel width, for example 20 MHz, 40 MHz, etc. The wakeup signal may include a wakeup radio sync/preamble 420. Wakeup radio sync/preamble 420-*a* may be referred to as a wakeup radio preamble (or WUR preamble). The wakeup signal may include wakeup radio message bits 425 (or WUR message bits). Wakeup radio message bits 425 may also be referred to as a wakeup radio payload (or WUR payload). In some examples, the wakeup message may be transmitted on a narrow bandwidth 445, which may require less power to receive at the wakeup radio. In some examples the narrow bandwidth may be a bandwidth less than the wider bandwidth associated with a legacy device, such as 5 MHz or less, or may have the same bandwidth as a legacy channel, for example 20 MHz.

FIG. 4B illustrates an example of a wakeup signal PPDU 402 in accordance with one or more aspects of the present disclosure. In some examples, wakeup signal PPDU 402 may be referred to as a wakeup radio frame (or WUR frame). Wakeup signal PPDU 402 may include a legacy preamble 441-*b*. For example, the legacy preamble 441-*b* may include an L-STF field 405-*b*, an L-LTF field 410-*b*, and an LSIG field 415-*b*. Wakeup signal PPDU 402 may also include a wakeup radio Sync/Preamble 420-*b*, which may also be referred to as a WUR preamble. Wakeup signal PPDU 302 may also include wakeup radio message bits 425-*b*, which may also be referred to as a WUR payload. In some cases, wakeup signal PPDU 402 may represent aspects of techniques performed by a STA 115 or AP 105 as described with reference to FIGS. 1-3 and 4A. In some examples, other devices such as additional APs may use a certain amount of time to receive and decode the legacy preamble before actually engaging in legacy deferral on a channel. Thus, it may be beneficial to leave a gap 430 between the legacy preamble and the wakeup message.

FIG. 4C illustrates an example of a wakeup signal PPDU 403 in accordance with one or more aspects of the present disclosure. In some cases, wakeup signal PPDU 403 may represent aspects of techniques performed by a STA 115 or AP 105 as described with reference to FIGS. 1-3, 4A, and 4B. In some examples, wakeup signal PPDU 403 (or wakeup signal) may be referred to as a wakeup radio frame or WUR frame. Wakeup signal PPDU 403 may include a legacy preamble 441-c. For example, the legacy preamble 441-c may include an L-STF field 405-c, an L-LTF field 410-c, and an LSIG field 415-c. Wakeup signal PPDU 402 may also include a wakeup radio Sync/Preamble 420-b, which may also be referred to as a wakeup radio preamble (or WUR preamble). Wakeup signal PPDU 302 may also include wakeup radio message bits 425-b (or WUR message bits), which may also be referred to as a WUR payload. In some examples, the gap 430 may be filled instead with a dummy block 435, which may include one or more dummy symbols intended to allow time for switching from one radio to another at the STA 115 receiving the wakeup signal PPDU 403.

Figure 5:
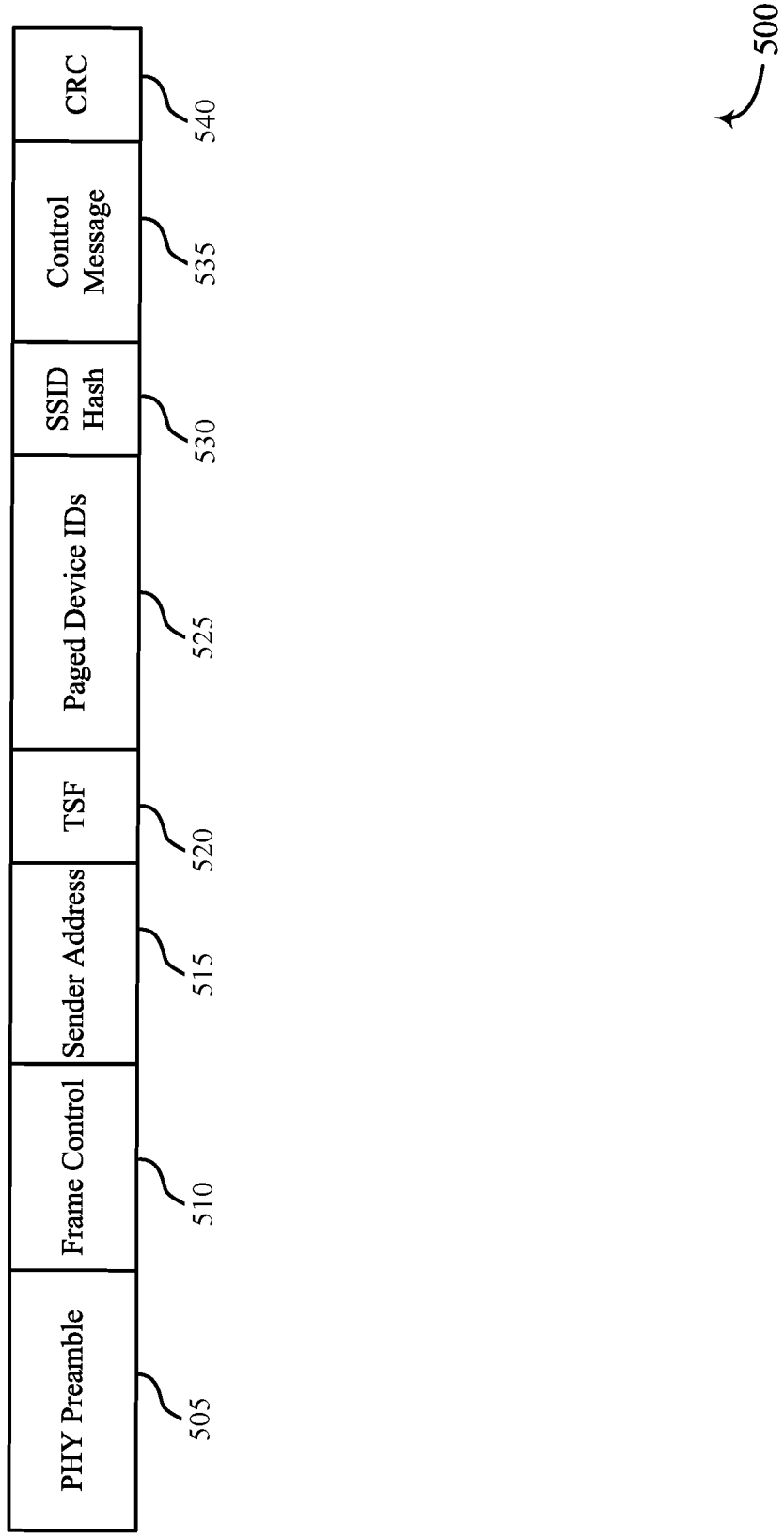
FIG. 5 illustrates an example of a frame structure that supports media access control for wakeup radios in accordance with aspects of the present disclosure.

FIG. 5 illustrates an example of a frame structure 500 in accordance with one or more aspects of the present disclosure. In some cases, frame structure 500 may represent aspects of techniques performed by a STA 115 or AP 105 as described with reference to FIGS. 1-4.

In some examples, a wakeup signal frame format may include various fields. Frame structure 500 may include a physical (PHY) preamble 505. Frame structure 500 may further include a frame control field 510. Frame control field 510 may provide contents of frames as further described below. Frame structure 500 for a wakeup signal may also include a sender address field 515. Sender address field 515 may include a secure time changing identifier of the sending device, which may be an AP 105. Frame structure 500 may also include a TSF field 520. TSF field 520 may carry a certain number (e.g., four) least significant bytes (LSB) (bytes) of the TSF. Frame structure 500 may also include a paged device IDs field 525. Paged device IDs field 525 may identify the devices meant to receive the wakeup signal. Paged device IDs field 525 may identify the devices in a variety of ways, including lists, bloom filters, and bitmaps. Frame structure 500 may also include an SSID hash field 530. SSID hash field 530 may include a hash of the SSID, which may be, for example, one octet. The hash of the SSID may be used for passive scanning, and a STA 115 may monitor a wakeup message for the SSID hash. Frame structure 500 may include a control message 535, which may be one octet. Frame structure 500 may also include a CRC field 540, which may be one octet.

Differents mechanisms may be selected to be used to identify paged devices in the paged device IDs field 525. In identifying paged devices, such as STAs 115, an AP 105 may consider the size of a wakeup message. For example, for purposes of length, a wakeup message may be limited to approximately twenty (20) octets in length (which may corresponds to approximately 5 ms in some examples). An AP 105 may also consider the size of pgID space. An AP 105 may further consider early sleep modes of STAs 115. For example, a STA 115 may be able to determine whether it is being woken up or may continue to sleep after decoding only a part of a transmitted message.

In some examples, an AP 105 may identify paged devices, including STAs 115, in a list of paging IDs. Using a list to identify paged devices may be ideal for certain sized groups of devices. For example, using a list to identify paged devices may be an efficient approach when about five (5) to fifteen (15) devices are to be woken up. A list of paged IDs may be small. For example, a list of paged IDs may not exceed one octet. In order to maintain a small message size when more than sixteen (16) identifiers need to be sent, an AP 105 may send back to back wakeup messages. To further optimize listing of paging IDs, IDs may be listed in ascending order. In some examples, paging IDs may be allocated such that the STAs 115 that are frequently woken up are allocated a value that is numerically higher than the values allocated to devices that wake up infrequently. Thus, devices that are infrequently paged may quickly sleep upon reviewing the initial entries on the list.

In some examples, an AP 105 may extend the paging ID space and limit the paging ID to only one octet. An AP may place STAs into multiple groups. Each STA 115 may be assigned a Group ID and a Paging ID. In some examples, a group ID field may be included in the frame. The wakeup frame length may thus be extended by one octet. In some examples, a different outer hash key may be applied for each group. In such cases, identifier addresses may be generated to include in a wakeup frame.

In some cases, paged devices may be indicated in a bit map. Using a bit map to identify paged devices may be ideal for small paging ID spaces. In still other examples, paged devices may be indicated using a bloom filter. Using a bloom filter to identify paged device as may be a possible approach that allows for a large paging ID space.

A wakeup radio frame may be applied to other functions. In some cases, a wakeup radio devices is used for paging devices. In some examples, other control functionality may be provided by a wakeup radio. For example, control fields may provide sufficient flexibility to introduce indications pertaining to other functions. In some examples, a wakeup radio may serve as its own entity, as opposed to serving as a wakeup radio to a primary radio. In such cases, the wakeup radio may use the type bit to indicate a different type of signaling. In some examples, the wakeup radio may use another reserved bit for signaling. In some examples, for 80% of scenarios, a bitmap may be advantageous where the paged device IDs field is larger than twenty (20) octets.

An AP 105 may use a bloom filter as part of generating the paged device IDs field 525. A bloom filter may allow for a large paged ID space. In one example, if the most likely number of devices to be indicated for a wakeup is approximately 10, then with sixteen octets the false positive probability may be maintained at approximately $1 \times 10^{-3}$ for a given width of the paged device IDs field 525.

Where a large number of devices may be paged, the bloom filter indication may be split into two steps. A wakeup message for a certain number of devices may be sent, followed by a second wakeup message. The first wakeup message may include a paged device IDs field 525, TSF and SSID hand with a certain number of octets, for example 8 octets. In some examples, the false positive calculations may indicate that a large number of STAs 115 may be able to return to sleep after receiving the first wakeup message. A second wakeup message may include a certain number of addition octets for paged device IDs field 525, for example, sixteen additional octets of paging. The use of sixteen (16) octets may decrease to a small percentage the probability of false positives.

In further examples, a wakeup radio frame may be applied to various functions. In some cases, a wakeup radio devices is used for paging devices. In some examples, other control functionality may be provided by a wakeup radio. For example, control fields may provide sufficient flexibility to introduce indications pertaining to other functions. In some examples, a wakeup radio may serve as its own entity, as opposed to serving as a wakeup radio to a primary radio. In such cases, the wakeup radio may use the type bit to indicate a different type of signaling. In some examples, the wakeup radio may use another reserved bit for signaling.

In some cases, it may be beneficial to use a message integrity check (MIC). For example, a sender identifier included in a message may serve to verify the authenticity of the sender. However, a malicious or spurious device may inject false bits into the message immediately following the sender identifier portion of the message. In such cases, it may be beneficial to include a MIC at the end of a frame. For example, a CRC may be modified to serve as a MIC. In some cases, MIC processing may result in some complexity at the receiver.

Figure 6:
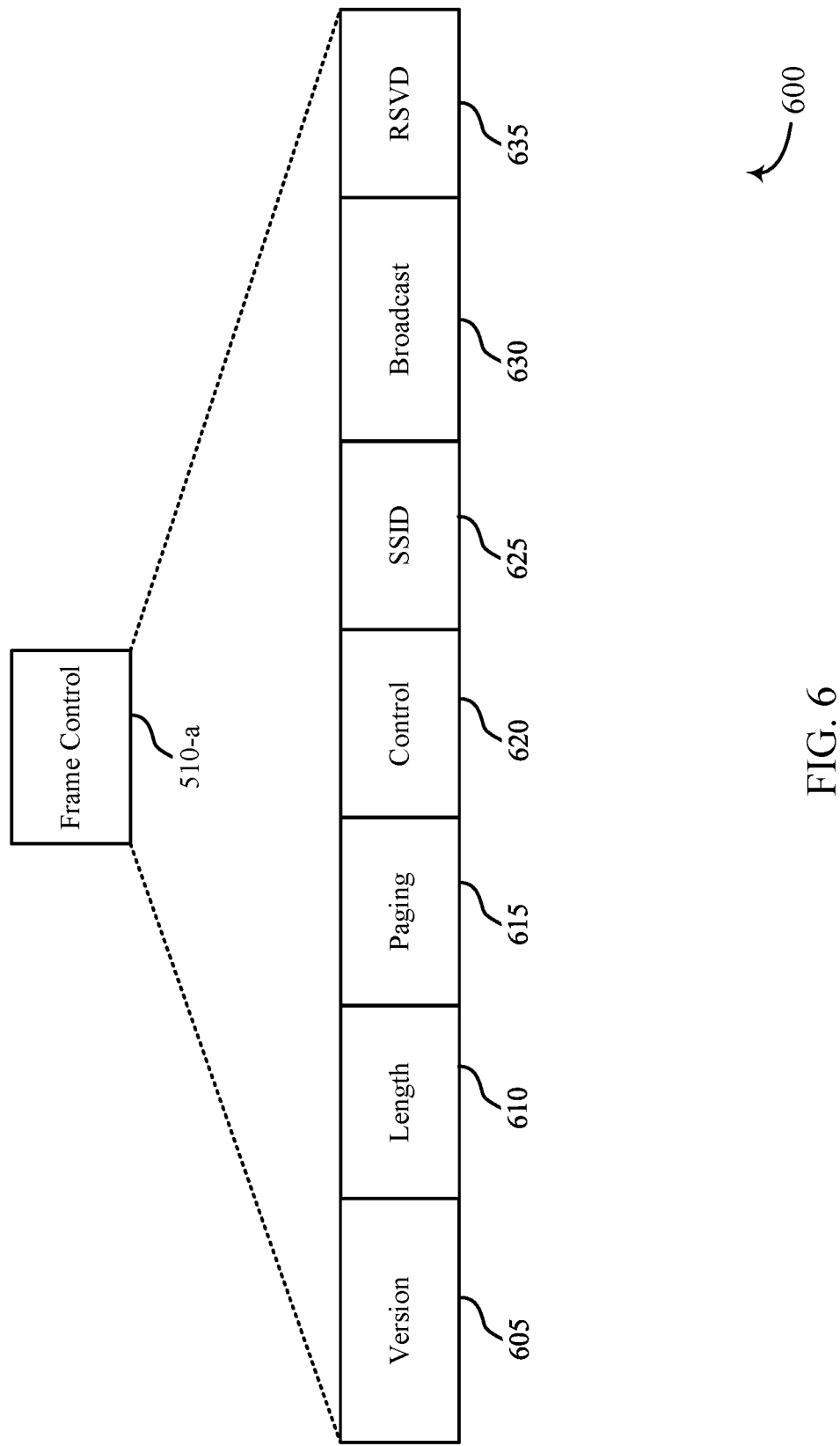
FIG. 6 illustrates an example of a control field structure that supports media access control for wakeup radios in accordance with aspects of the present disclosure.

FIG. 6 illustrates an example of a control field structure 600 in accordance with one or more aspects of the present disclosure. In some cases, control field structure 600 may represent aspects of techniques performed by a STA 115 or AP 105 as described with reference to FIGS. 1-5. Frame control field 510-a may be an example of frame control field 510 as described with reference to FIG. 5.

The wakeup radio frame may include a frame control field 510-a, which may include information sufficient to indicate the information present in the rest of the wakeup signal frame. In some examples, control field structure 600 may include a version field 605. In some examples, version field 605 may include a one-bit version indicator. In some examples, the indicator may be set to zero for a first version. Control field structure 600 may also include a length field 610, which may indicate one of four possible lengths of paging field 615. Control field structure 600 may also include a paging field 615, which may indicate the presence of a paging indicator, and a control field 620 that may indicate if the wakeup radio frame that includes the control field structure 600 includes a control message portion, for example control message 535 described above with reference to FIG. 5. Frame control subframe may also include an SSID field 625, which may indicate if a Hash of the SSID is present. Within control field structure 600, a control field may indicate if the wakeup radio frame includes a control message portion. In some examples, a broadcast field 630 within a frame control structure may indicate if all devices are to wake up, as opposed to specific paged devices. RSVD portion 635 may reserve a bit for later use within frame control field 510-a.

Figure 7:
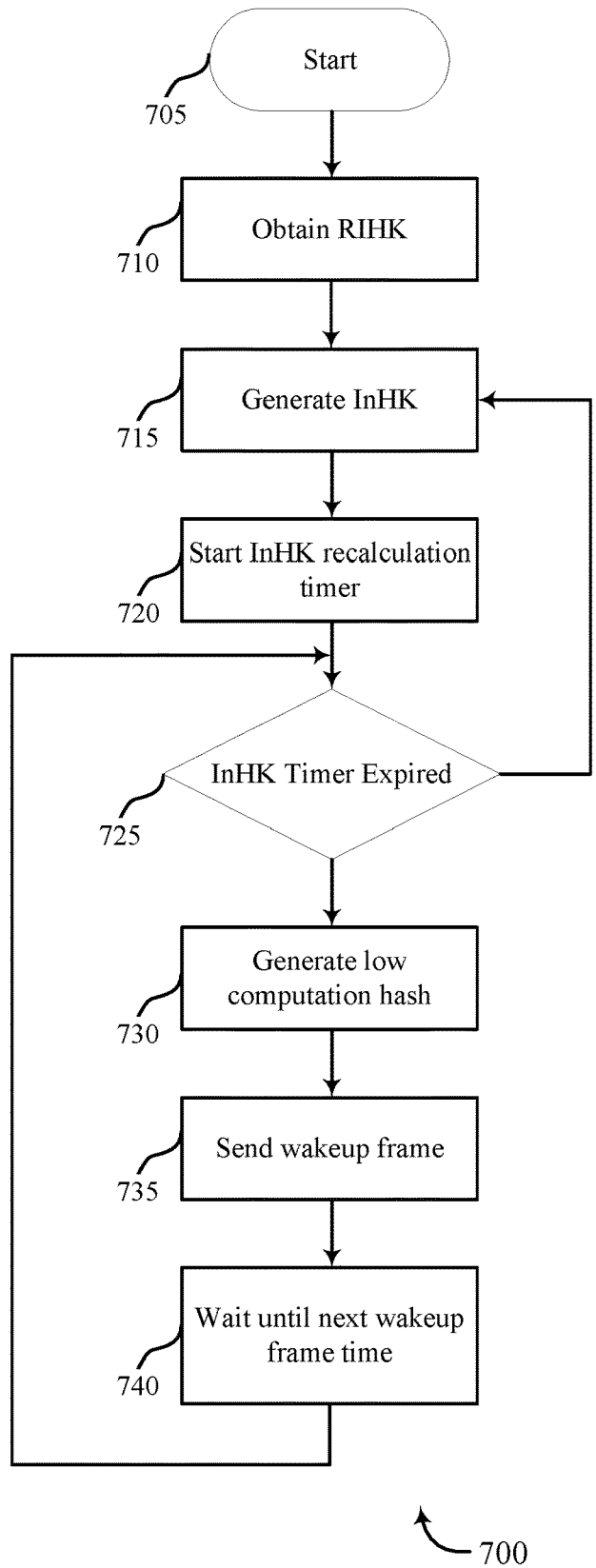
FIG. 7 illustrates an example of a process flow that supports media access control for wakeup radios in accordance with aspects of the present disclosure.

FIG. 7 illustrates a process flow 700 for generating a sender identification in accordance with one or more aspects of the present disclosure. Process flow 700 may represent aspects of techniques performed by a STA 115 or AP 105 as described with reference to FIGS. 1-6. Process flow 700 may include generating a rotating identifier hash key (RIHK), generating an RI by truncating the TSF field, or generating inner and outer hashes.

In some examples, sizing of a sender identifier may be varied in time. Short identifiers may be used to reduce air time of the wakeup signal. In some cases, using a fixed identifier may lead to simple design. However, simple design may allow for a malicious device to replay a wakeup signal. Instead of a fixed identifier, sender identifiers may be configured to appear like a random sequence to a malicious observer. For example, an AP may generate pseudo random identifiers, and an AP may ensure that the identifiers are short.

In some examples, an AP may generate a sender identifier by use of a hash key. During association, an AP may provide an RIHK. An AP may provide the RIHK to a STA during association. For example, the RIHK may be provided by the AP using similar messaging as is used to provide a group temporal key (GTK).

In some examples, it may be beneficial for an AP to generate a sender identifier in a way that does not require frequent computation. Frequent computation for a computationally complex hash may be detrimental for the low power wakeup radio circuitry. An AP may generate an inner hash and an outer hash. The inner hash may be a low computing power hash and may be run more frequently by the wakeup radio. The outer hash may be used to change a temporal key that is used by the inner hash, and may be run less frequently by the wakeup radio.

In some examples, an AP may run an inner hash and an outer hash to generate sender identifiers. At 710, the AP may first obtain an RIHK. At 715, the AP may compute an inner hash key (InHK). At 720, the AP may initiate an InHK recalculation timer. Until the InHK timer expires, the AP may continue to generate new InHKs. When the InHK timer expires at 725, the AP may compute a low computational outer hash at 730. The AP may send a wakeup frame at 735, and at 740, the AP may wait until the next wakeup frame time, when the InHK timer expires at the next occurrence of 725. Thus, the inner hash repeats itself during the duration of the InHK timer, and the outer hash is generated at each expiration of the InHK timer.

Figure 8:
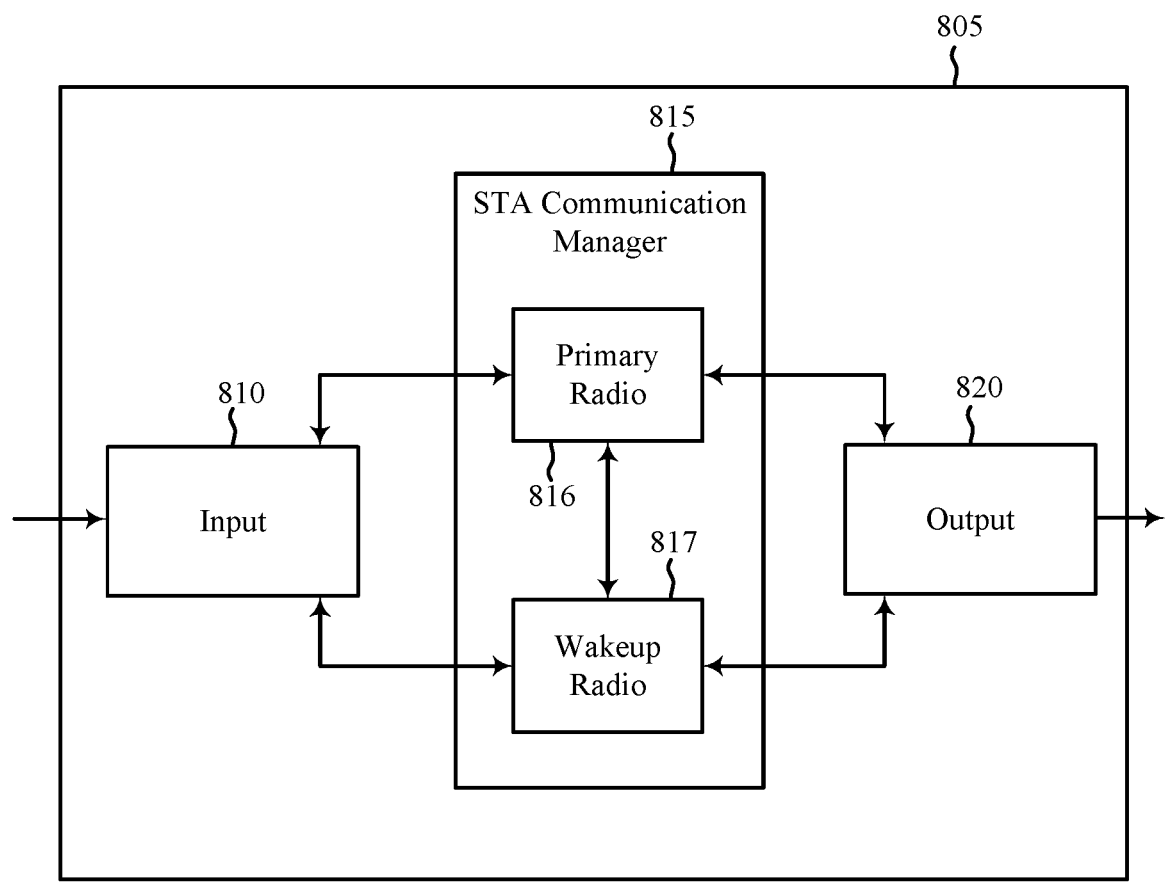
FIGS. 8 through 10 show block diagrams of a device that supports media access control for wakeup radios in accordance with aspects of the present disclosure.

FIG. 8 shows a block diagram 800 of a wireless device 805 that supports media access control for wakeup radios in accordance with various aspects of the present disclosure. Wireless device 805 may be an example of aspects of a station (STA) 115 as described with reference to FIG. 1. Wireless device 805 may include receiver 810, STA communication manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to media access control for wakeup radios, etc.). Information may be passed on to other components of the device. The receiver 810 may be an example of aspects of the transceiver 1135 described with reference to FIG. 11.

STA communication manager 815 may be an example of aspects of the STA communication manager 1115 described with reference to FIG. 11. The STA communication manager 815 may include a primary radio 816 and a wakeup radio 817 associated with the STA communication manager 815. The primary radio 816 may be an example of the primary radio 116 described with reference to FIGS. 1-2. The wakeup radio 817 may be an example of the wakeup radio 117 described with reference to FIGS. 1-2. In some examples, the wakeup radio 817 may be configured to wakeup periodically to receive transmissions, such as beacons from an associated AP. In some examples, to avoid unnecessarily expending power, primary radio 816 may be configured to remain in a sleep mode or low power mode for an extended period of time. During a sleep mode, STA communication manager 815 may be configured to periodically activate a wakeup radio 817 to listen for and decode a wakeup signal. STA communication manager 815 may be configured to receive a wakeup signal, which may indicate to wakeup radio 817 whether communications are waiting at an AP to be transmitted to be received by STA communication manager 815. In some examples, STA communication manager 815 may be configured to power on primary radio 816 in response to a wakeup signal received at wakeup radio 817.

STA communication manager 815 may identify a jitter pattern to be used by an AP to transmit a wakeup message, listen, using a wakeup radio, for the wakeup message during a set of wakeup listening periods based on the identified jitter pattern, and receive the wakeup message during at least one of the set of wakeup listening periods. The STA communication manager 815 may also receive, from an AP, a preamble having a first bandwidth, identify a wakeup message indicator in the received preamble, and receive, from the AP, a wakeup message at a wakeup radio of the station based on the identified wakeup message indicator, the wakeup message having a second bandwidth that is less than the first bandwidth. The STA communication manager 815 may also receive an identifier key from an AP, determine a rotating identifier associated with the AP based on the received identifier key, receive, at a wakeup radio of the station, a wakeup message from the AP, the wakeup message including a sender identifier, compare the sender identifier with the determined rotating identifier, and power on a second radio of the station based on the comparison. The STA communication manager 815 may also receive, at a wakeup radio of the station, a wakeup message from an AP, the wakeup message including an indication of a set of stations to be activated and power on a second radio of the station based on the received indication.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
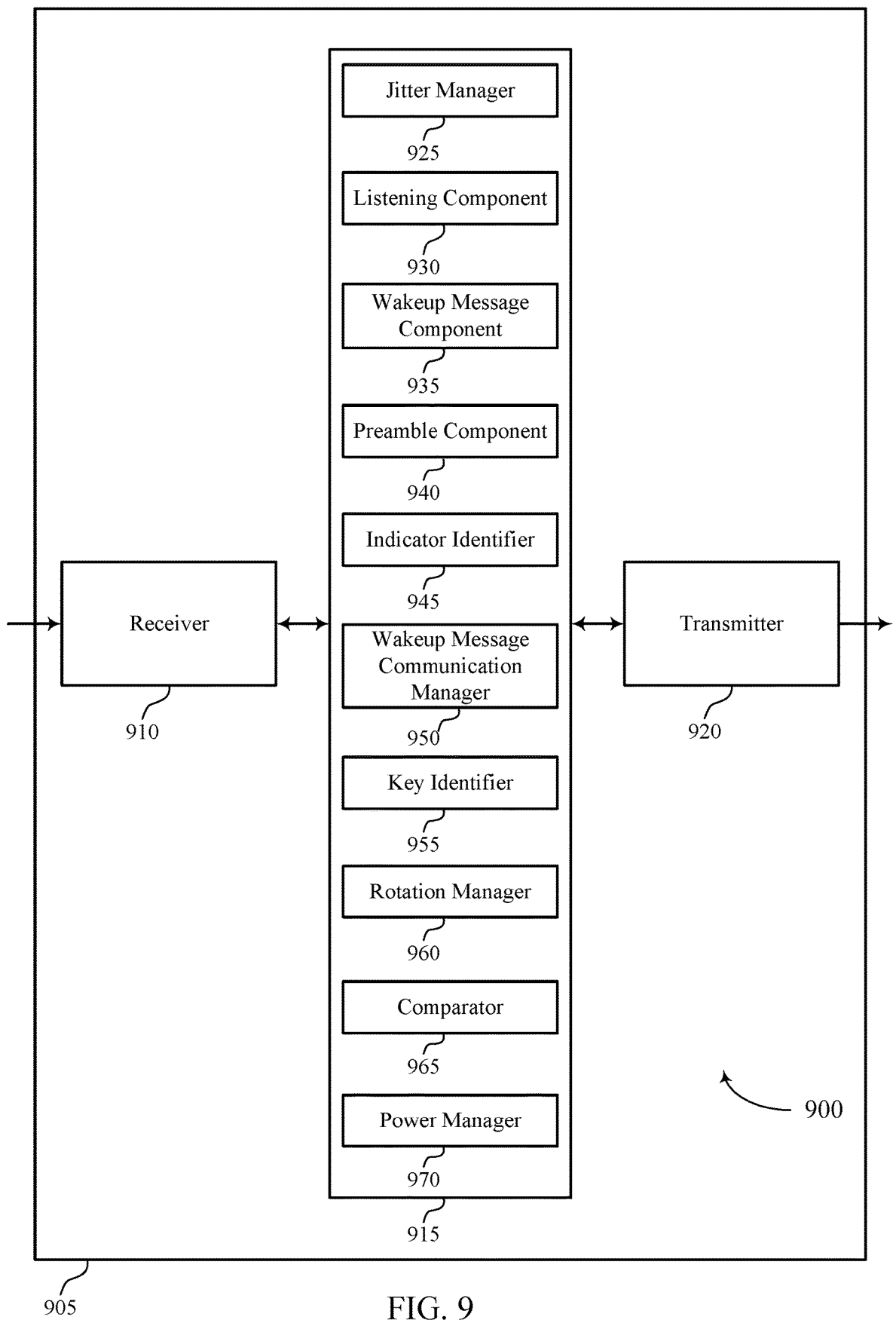

FIG. 9 shows a block diagram 900 of a wireless device 905 that supports media access control for wakeup radios in accordance with various aspects of the present disclosure. Wireless device 905 may be an example of aspects of a wireless device 805 or a STA 115 as described with reference to FIGS. 1 and 8. Wireless device 905 may include receiver 910, STA communication manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to media access control for wakeup radios, etc.). Information may be passed on to other components of the device. The receiver 910 may be an example of aspects of the transceiver 1135 described with reference to FIG. 11.

STA communication manager 915 may be an example of aspects of the STA communication manager 1115 described with reference to FIG. 11

STA communication manager 915 may also include jitter manager 925, listening component 930, wakeup message component 935, preamble component 940, indicator identifier 945, wakeup message communication manager 950, key identifier 955, rotation manager 960, comparator 965, and power manager 970.

Jitter manager 925 may identify a jitter pattern to be used by an AP to transmit a wakeup message. In some cases, identifying the jitter pattern includes receiving an indication of the jitter pattern from the AP during association.

Listening component 930 may listen, using a wakeup radio, for the wakeup message during a set of wakeup listening periods based on the identified jitter pattern.

Wakeup message component 935 may receive the wakeup message during at least one of the set of wakeup listening periods.

Preamble component 940 may receive, from an AP, a preamble having a first bandwidth.

Indicator identifier 945 may identify a wakeup message indicator in the received preamble.

Wakeup message communication manager 950 may receive, from the AP, a wakeup message at a wakeup radio of the station based on the identified wakeup message indicator, the wakeup message having a second bandwidth that is less than the first bandwidth, receive, at a wakeup radio of the station, a wakeup message from the AP, the wakeup message including a sender identifier, and receive, at a wakeup radio of the station, a wakeup message from an AP, the wakeup message including an indication of a set of stations to be activated. In some cases, receiving the wakeup message includes listening for the wakeup message after a predetermined interval following the received preamble. In some cases, the wakeup message includes a list of identifiers, an identifier bitmap, or a bloom filter indication associated with the set of stations to be activated. In some cases, the wakeup message may include a frame control field, or a sender address field, or a TSF field, or a paged device identifier field, or a SSID hash field, or a control message field, or a combination thereof.

Wakeup message communication manager 950 may further receive a frame control field in the wakeup message, and identify a presence of one or more fields of the wakeup message based at least in part on the received frame control field. In some cases, one or more fields of the frame control field comprise a version field, or a length field, or a paging field, or a control field, or a SSID field, or a broadcast field, or a combination thereof. Wakeup message communication manager 950 may also monitor for a SSID hash field in the wakeup message for an identifier of the station.

Key identifier 955 may receive an identifier key from an AP.

Rotation manager 960 may determine a rotating identifier associated with the AP based on the received identifier key. In some cases, determining the rotating identifier includes calculating the rotating identifier using an inner hash function, or an outer hash function, or a combination thereof. In some cases, determining the rotating identifier includes calculating the rotating identifier using a time value, or a sequence number value, or a combination of both.

Comparator 965 may compare the sender identifier with the determined rotating identifier.

Power manager 970 may power on a wakeup radio of the station in response to the received preamble, power on a second radio of the station based on the comparison, and power on a second radio of the station based on the received indication.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
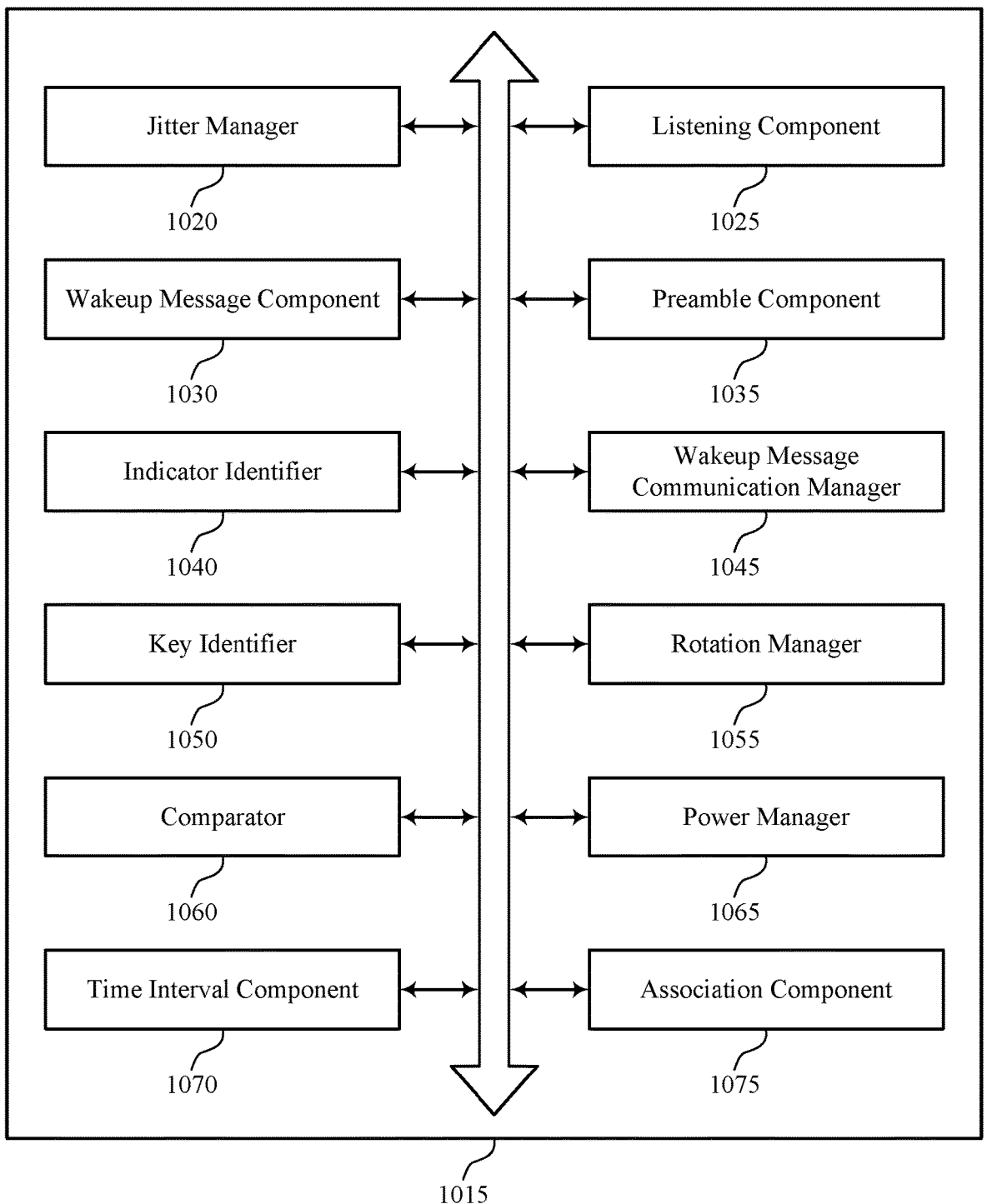

FIG. 10 shows a block diagram 1000 of a STA communication manager 1015 that supports media access control for wakeup radios in accordance with various aspects of the present disclosure. The STA communication manager 1015 may be an example of aspects of a STA communication manager 815, a STA communication manager 915, or a STA communication manager 1115 described with reference to FIGS. 8, 9, and 11. The STA communication manager 1015 may include jitter manager 1020, listening component 1025, wakeup message component 1030, preamble component 1035, indicator identifier 1040, wakeup message communication manager 1045, key identifier 1050, rotation manager 1055, comparator 1060, power manager 1065, time interval component 1070, and association component 1075. Each of these modules may communicate, directly or indirectly, with one another (e.g., via one or more buses).

Jitter manager 1020 may identify a jitter pattern to be used by an AP to transmit a wakeup message. In some cases, identifying the jitter pattern includes receiving an indication of the jitter pattern from the AP during association.

Listening component 1025 may listen, using a wakeup radio, for the wakeup message during a set of wakeup listening periods based on the identified jitter pattern.

Wakeup message component 1030 may receive the wakeup message during at least one of the set of wakeup listening periods.

Preamble component 1035 may receive, from an AP, a preamble having a first bandwidth.

Indicator identifier 1040 may identify a wakeup message indicator in the received preamble.

Wakeup message communication manager 1045 may receive, from the AP, a wakeup message at a wakeup radio of the station based on the identified wakeup message indicator, the wakeup message having a second bandwidth that is less than the first bandwidth, receive, at a wakeup radio of the station, a wakeup message from the AP, the wakeup message including a sender identifier, and receive, at a wakeup radio of the station, a wakeup message from an AP, the wakeup message including an indication of a set of stations to be activated. In some cases, receiving the wakeup message includes listening for the wakeup message after a predetermined interval following the received preamble. In some cases, the wakeup message includes a list of identifiers, an identifier bitmap, or a bloom filter indication associated with the set of stations to be activated. In some cases, the wakeup message may include a frame control field, or a sender address field, or a TSF field, or a paged device identifier field, or a SSID hash field, or a control message field, or a combination thereof.

Wakeup message communication manager 1045 may further receive a frame control field in the wakeup message, and identify a presence of one or more fields of the wakeup message based at least in part on the received frame control field. In some cases, one or more fields of the frame control field comprise a version field, or a length field, or a paging field, or a control field, or an SSID field, or a broadcast field, or a combination thereof. Wakeup message communication manager 1045 may also monitor for a service set identifier SSID hash field in the wakeup message for an identifier of the station.

Key identifier 1050 may receive an identifier key from an AP.

Rotation manager 1055 may determine a rotating identifier associated with the AP based on the received identifier key. In some cases, determining the rotating identifier includes calculating the rotating identifier using an inner hash function, or an outer hash function, or a combination thereof. In some cases, determining the rotating identifier includes calculating the rotating identifier using a time value, or a sequence number value, or a combination of both.

Comparator 1060 may compare the sender identifier with the determined rotating identifier.

Power manager 1065 may power on a wakeup radio of the station in response to the received preamble, power on a second radio of the station based on the comparison, and power on a second radio of the station based on the received indication.

Time interval component 1070 may modify one or more time intervals between the set of listening periods.

Association component 1075 may associate with the AP, where the identifier key is received from the AP during association.

Figure 11:
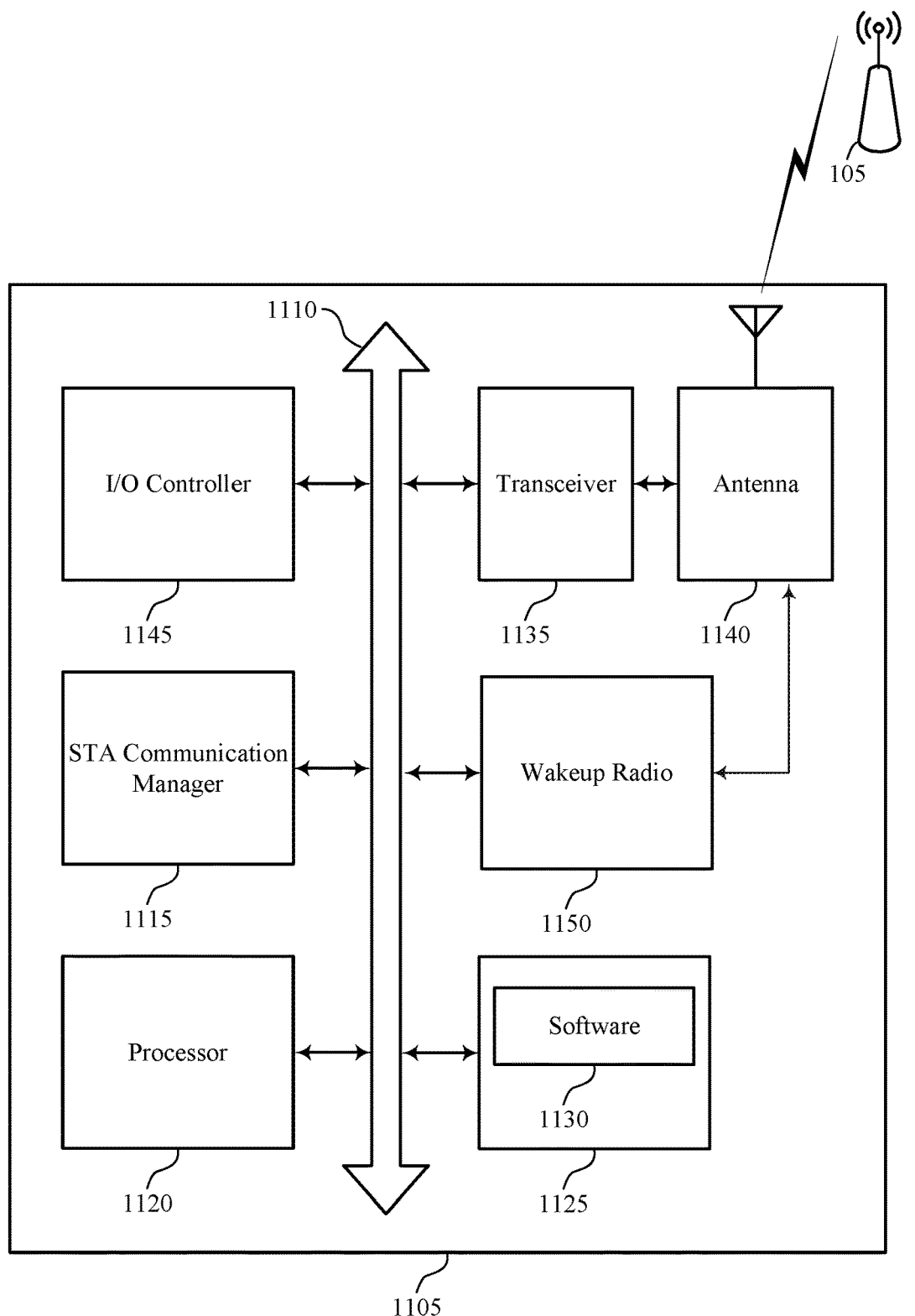
FIG. 11 illustrates a block diagram of a system including a STA that supports media access control for wakeup radios in accordance with aspects of the present disclosure.

FIG. 11 shows a diagram of a system 1100 including a device 1105 that supports media access control for wakeup radios in accordance with various aspects of the present disclosure. Device 1105 may be an example of or include the components of wireless device 805, wireless device 905, or a STA 115 as described above, e.g., with reference to FIGS. 1, 8 and 9. Device 1105 may include components for bi-directional voice and data communications including components for transmitting and receiving communications, including STA communication manager 1115, processor 1120, memory 1125, software 1130, transceiver 1135, antenna 1140, I/O controller 1145, and wakeup radio 1150. These components may be in electronic communication via one or more busses (e.g., bus 1110). Wakeup radio 1150 may be an example of wakeup radio 117 and 817 as described with reference to FIGS. 1, 2, and 8. In some cases, wakeup radio 1150 may be a part of a primary radio, such as primary radios 116 and 816, as described with reference to FIGS. 1, 2, and 8.

Processor 1120 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting media access control for wakeup radios).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support media access control for wakeup radios. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. Transceiver 1135 may be an example of a primary radio, such as primary radio 116 as described with reference to FIGS. 2 and 3. Transceiver 1135 (e.g., primary radio 1135) and wakeup radio 1150 may communicate with another transceiver via one or more antennas 1140.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system.

Figure 12:
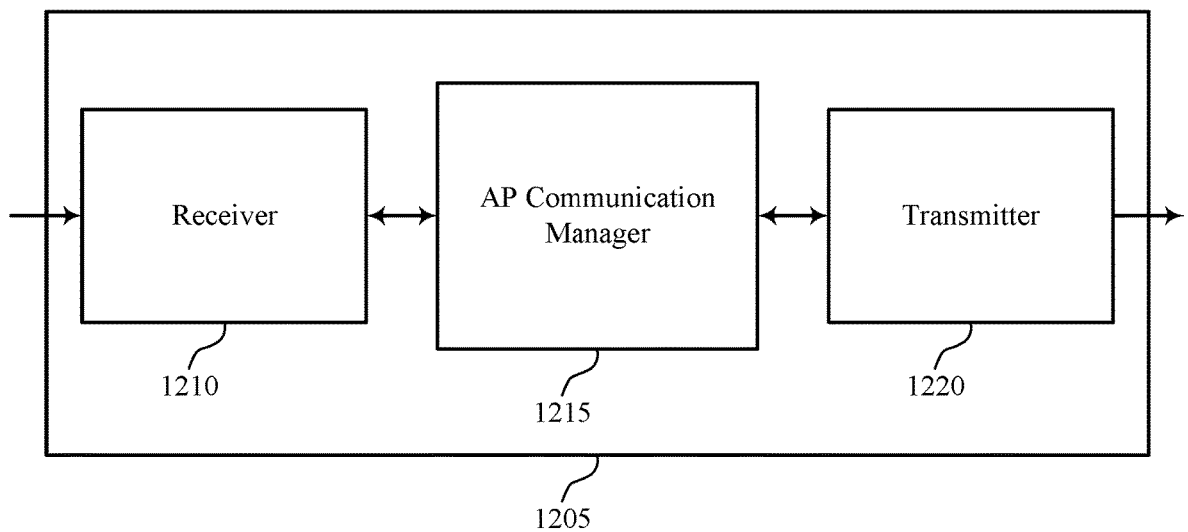
FIGS. 12 through 14 show block diagrams of a device that supports media access control for wakeup radios in accordance with aspects of the present disclosure.

FIG. 12 shows a block diagram 1200 of a wireless device 1205 that supports media access control for wakeup radios in accordance with various aspects of the present disclosure. Wireless device 1205 may be an example of aspects of an AP 105 as described with reference to FIG. 1. Wireless device 1205 may include receiver 1210, AP communication manager 1215, and transmitter 1220.

Wireless device 1205 may also include a processor. Each of these components may be in communication with one another (e.g., via one or more buses).

Receiver 1210 may receive information such as packets, user data, or control information associated with various information channels (e.g., control channels, data channels, and information related to media access control for wakeup radios, etc.). Information may be passed on to other components of the device. The receiver 1210 may be an example of aspects of the transceiver 1535 described with reference to FIG. 15.

AP communication manager 1215 may be an example of aspects of the AP communication manager 1515 described with reference to FIG. 15.

AP communication manager 1215 may identify a jitter pattern for a set of wakeup transmission periods and transmit, during at least one of a set of wakeup transmission periods, a wakeup message to a wakeup radio of the station based on the jitter pattern. The AP communication manager 1215 may also transmit, to a station, a preamble of a wakeup message for the station in a first bandwidth, the preamble including a wakeup message indicator indicating a transmission of the wakeup message and transmit the wakeup message to a wakeup radio of the station in a second bandwidth, the second bandwidth narrower than the first bandwidth. The AP communication manager 1215 may also transmit an identifier key to a station, determine a rotating identifier based on the identifier key, and transmit, to a wakeup radio of the station, a wakeup message including a sender identifier, the sender identifier corresponding to the determined rotating identifier. The AP communication manager 1215 may also identify a set of stations to be activated by the AP and transmit an indication of the identified set of stations in a wakeup message to the set of stations to be activated.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas.

Figure 13:
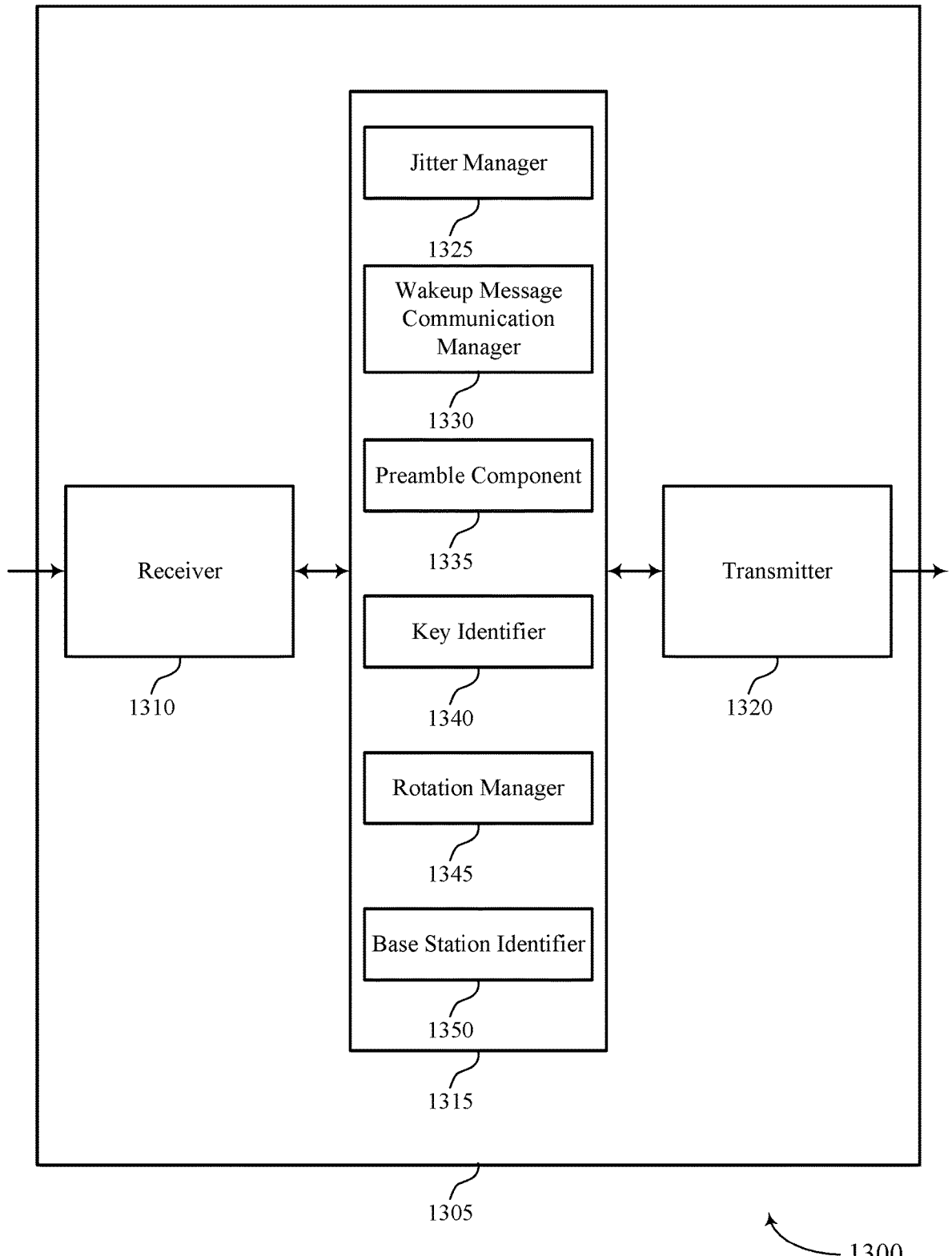

FIG. 13 shows a block diagram 1300 of a wireless device 1305 that supports media access control for wakeup radios in accordance with various aspects of the present disclosure. Wireless device 1305 may be an example of aspects of a wireless device 1205 or an AP 105 as described with reference to FIGS. 1 and 12. Wireless device 1305 may include receiver 1310, AP communication manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to media access control for wakeup radios, etc.). Information may be passed on to other components of the device. The receiver 1310 may be an example of aspects of the transceiver 1535 described with reference to FIG. 15.

AP communication manager 1315 may be an example of aspects of the AP communication manager 1515 described with reference to FIG. 15.

AP communication manager 1315 may also include jitter manager 1325, wakeup message communication manager 1330, preamble component 1335, key identifier 1340, rotation manager 1345, and base station identifier 1350.

Jitter manager 1325 may identify a jitter pattern for a set of wakeup transmission periods. In some cases, identifying the jitter pattern includes transmitting an indication of the jitter pattern to the station during association.

Wakeup message communication manager 1330 may transmit, during at least one of a set of wakeup transmission periods, a wakeup message to a wakeup radio of the station based on the jitter pattern, transmit the wakeup message to a wakeup radio of the station in a second bandwidth, the second bandwidth narrower than the first bandwidth, transmit, to a wakeup radio of the station, a wakeup message including a sender identifier, the sender identifier corresponding to the determined rotating identifier, and transmit an indication of the identified set of stations in a wakeup message to the set of stations to be activated. In some cases, the wakeup message includes a list of identifiers, an identifier bitmap, or a bloom filter indication for the set of stations to be activated. In some cases, the wakeup message may include a frame control field, or a sender address field, or a TSF field, or a paged device identifier field, or an SSID hash field, or a control message field, or a combination thereof.

Wakeup message communication manager 1330 may also transmit a frame control field in the wakeup message to indicate a presence of one or more fields of the wakeup message. In some cases, one or more fields of the frame control field comprise a version field, or a length field, or a paging field, or a control field, or an SSID field, or a broadcast field, or a combination thereof.

Preamble component 1335 may transmit, to a station, a preamble of a wakeup message for the station in a first bandwidth, the preamble including a wakeup message indicator indicating a transmission of the wakeup message.

Key identifier 1340 may transmit an identifier key to a station.

Rotation manager 1345 may determine a rotating identifier based on the identifier key. In some cases, determining the rotating identifier includes computing the rotating identifier using an inner hash function, an outer hash function, or a combination thereof. In some cases, determining the rotating identifier includes calculating the rotating identifier using a time value, or a sequence number value, or a combination of both.

Base station identifier 1350 may identify a set of stations to be activated by the AP.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
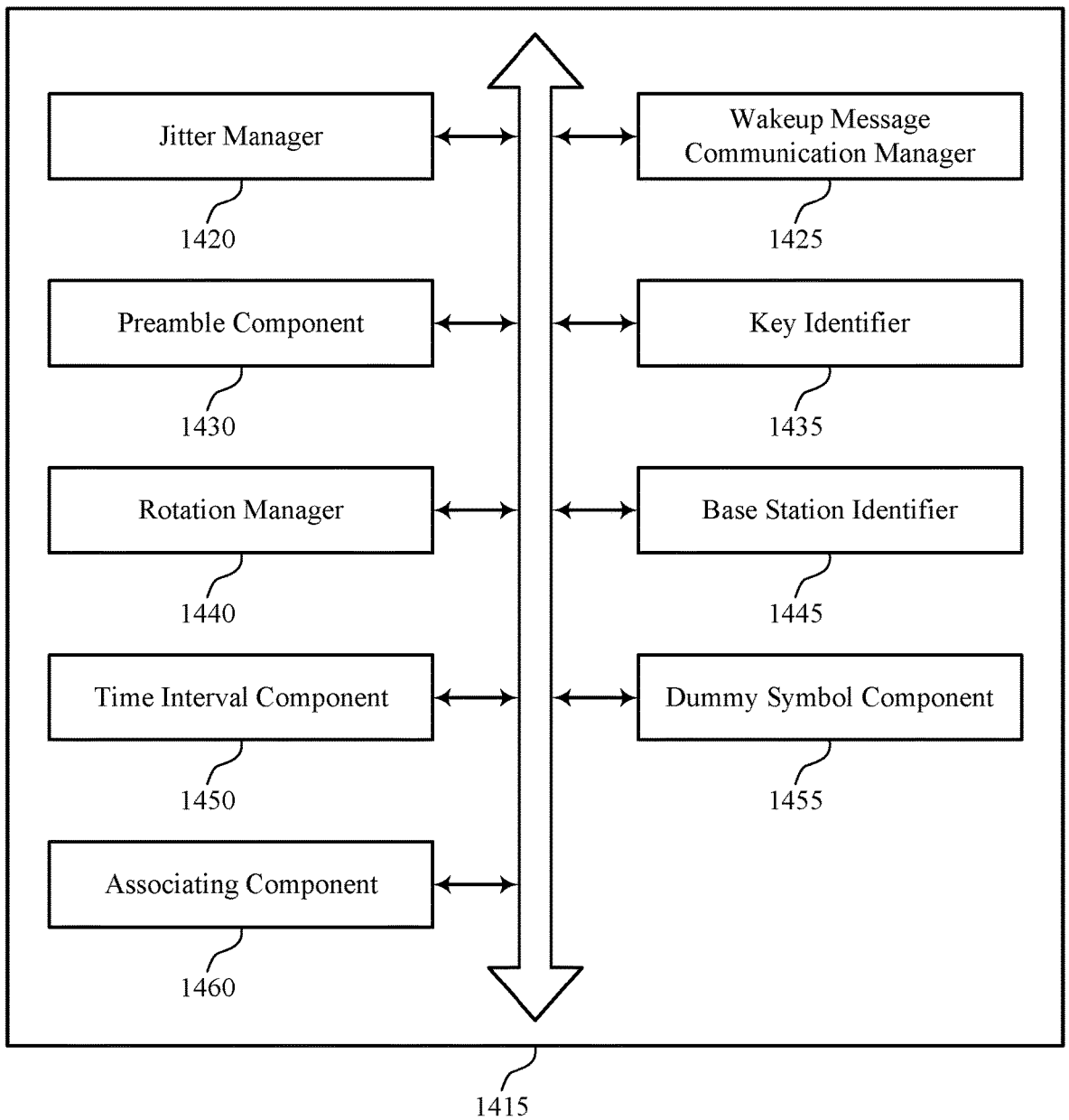

FIG. 14 shows a block diagram 1400 of an AP communication manager 1415 that supports media access control for wakeup radios in accordance with various aspects of the present disclosure. The AP communication manager 1415 may be an example of aspects of an AP communication manager 1515 described with reference to FIGS. 12, 13, and 15. The AP communication manager 1415 may include jitter manager 1420, wakeup message communication manager 1425, preamble component 1430, key identifier 1435, rotation manager 1440, base station identifier 1445, time interval component 1450, dummy symbol component 1455, and associating component 1460. Each of these modules may communicate, directly or indirectly, with one another (e.g., via one or more buses).

Jitter manager 1420 may identify a jitter pattern for a set of wakeup transmission periods. In some cases, identifying the jitter pattern includes transmitting an indication of the jitter pattern to the station during association.

Wakeup message communication manager 1425 may transmit, during at least one of a set of wakeup transmission periods, a wakeup message to a wakeup radio of the station based on the jitter pattern, transmit the wakeup message to a wakeup radio of the station in a second bandwidth, the second bandwidth narrower than the first bandwidth, transmit, to a wakeup radio of the station, a wakeup message including a sender identifier, the sender identifier corresponding to the determined rotating identifier, and transmit an indication of the identified set of stations in a wakeup message to the set of stations to be activated. In some cases, the wakeup message includes a list of identifiers, an identifier bitmap, or a bloom filter indication for the set of stations to be activated. In some cases, the wakeup message may include a frame control field, or a sender address field, or a TSF field, or a paged device identifier field, or a SSID hash field, or a control message field, or a combination thereof.

Wakeup message communication manager 1425 may also transmit a frame control field in the wakeup message to indicate a presence of one or more fields of the wakeup message. In some cases, one or more fields of the frame control field comprise a version field, or a length field, or a paging field, or a control field, or a SSID field, or a broadcast field, or a combination thereof.

Preamble component 1430 may transmit, to a station, a preamble of a wakeup message for the station in a first bandwidth, the preamble including a wakeup message indicator indicating a transmission of the wakeup message.

Key identifier 1435 may transmit an identifier key to a station.

Rotation manager 1440 may determine a rotating identifier based on the identifier key. In some cases, determining the rotating identifier includes computing the rotating identifier using an inner hash function, an outer hash function, or a combination thereof. In some cases, determining the rotating identifier includes calculating the rotating identifier using a time value, or a sequence number value, or a combination of both.

Base station identifier 1445 may identify a set of stations to be activated by the AP.

Time interval component 1450 may wait a predetermined interval after transmitting the preamble to transmit the wakeup message. In some cases, the jitter pattern modifies one or more time intervals between the set of wakeup transmission periods.

Dummy symbol component 1455 may transmit one or more dummy symbols between the preamble and the wakeup radio frame.

Associating component 1460 may associate with the station, where the identifier key is transmitted to the station during association.

Figure 15:
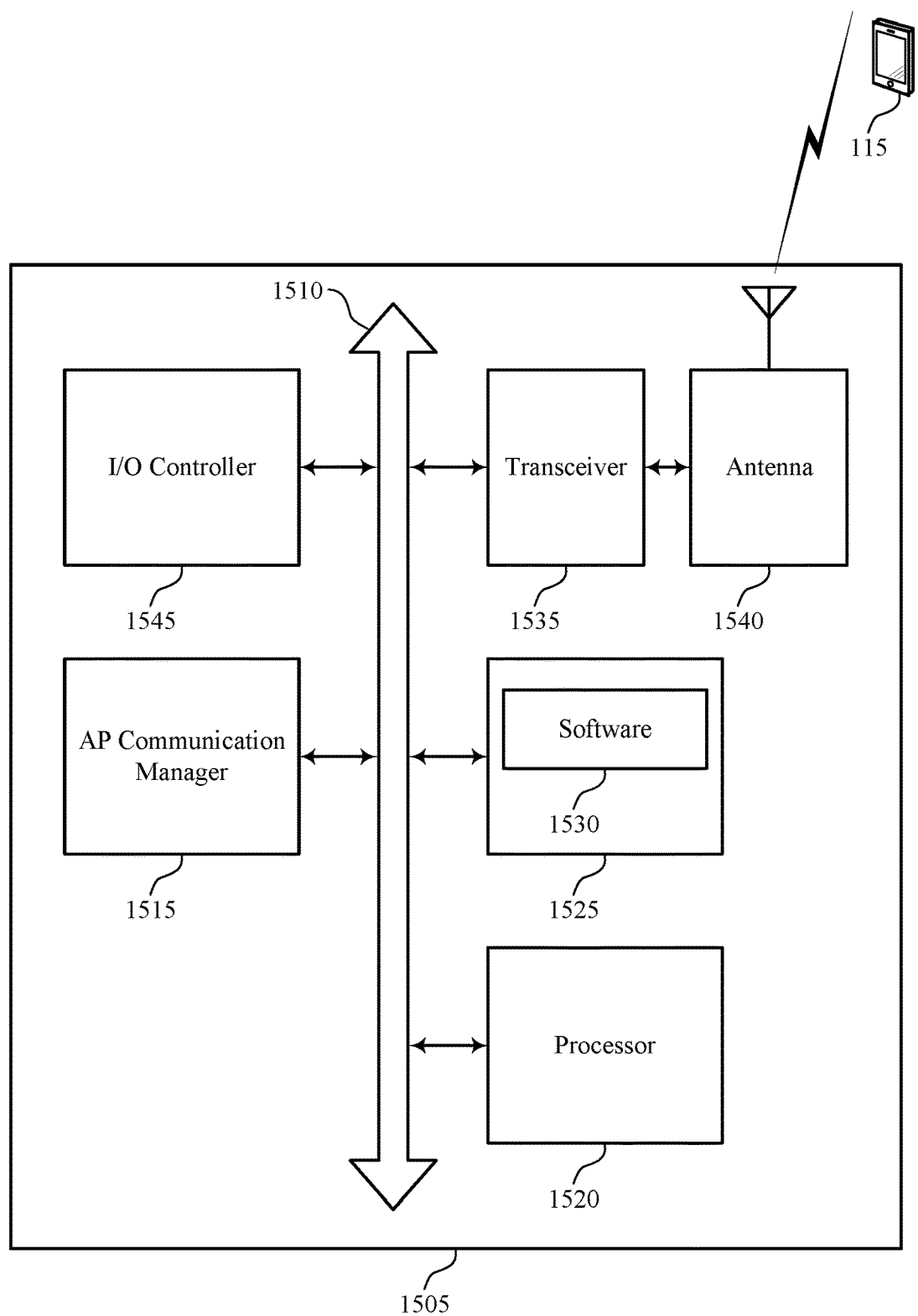
FIG. 15 illustrates a block diagram of a system including an AP that supports media access control for wakeup radios in accordance with aspects of the present disclosure.

FIG. 15 shows a diagram of a system 1500 including a device 1505 that supports media access control for wakeup radios in accordance with various aspects of the present disclosure. Device 1505 may be an example of or include the components of AP 105 as described above, e.g., with reference to FIG. 1. Device 1505 may include components for bi-directional voice and data communications including components for transmitting and receiving communications, including AP communication manager 1515, processor 1520, memory 1525, software 1530, transceiver 1535, antenna 1540, and I/O controller 1545. These components may be in electronic communication via one or more busses (e.g., bus 1510).

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting media access control for wakeup radios).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support media access control for wakeup radios. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system.

Figure 16:
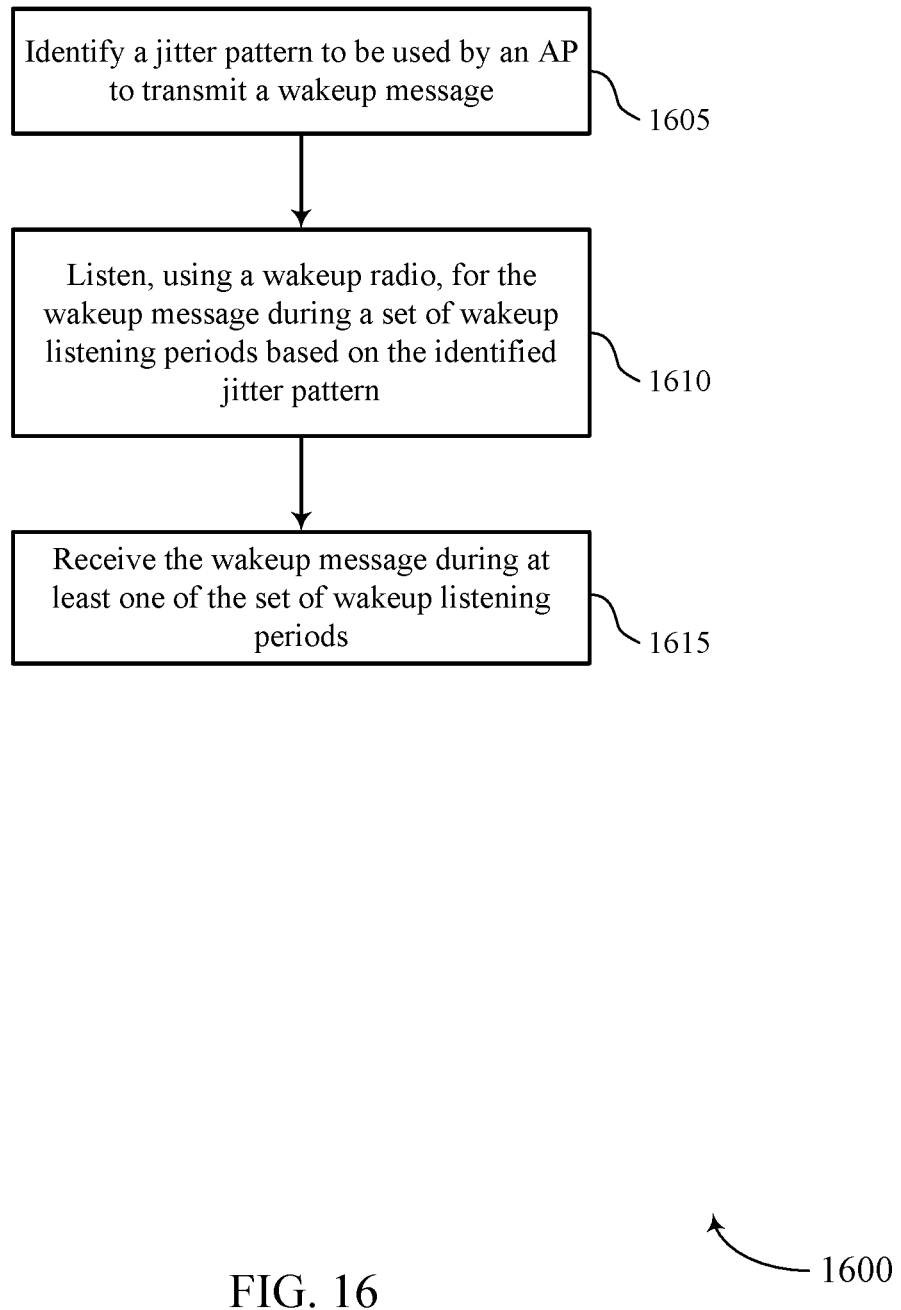
FIGS. 16 through 29 illustrate methods for media access control for wakeup radios in accordance with aspects of the present disclosure.

FIG. 16 shows a flowchart illustrating a method 1600 for media access control for wakeup radios in accordance with various aspects of the present disclosure. The operations of method 1600 may be implemented by a STA 115 or its components as described herein. For example, the operations of method 1600 may be performed by a STA communication manager as described with reference to FIGS. 8 through 11. In some examples, a STA 115 may execute a set of codes to control the functional elements of the device to perform the functions described below. Additionally or alternatively, the STA 115 may perform aspects the functions described below using special-purpose hardware.

At block 1605 the STA 115 may identify a jitter pattern to be used by an AP to transmit a wakeup message. The operations of block 1605 may be performed according to the methods described with reference to FIGS. 1 through 15. In certain examples, aspects of the operations of block 1605 may be performed by a jitter manager as described with reference to FIGS. 8 through 11.

At block 1610 the STA 115 may listen, using a wakeup radio, for the wakeup message during a plurality of wakeup listening periods based at least in part on the identified jitter pattern. The operations of block 1610 may be performed according to the methods described with reference to FIGS. 1 through 15. In certain examples, aspects of the operations of block 1610 may be performed by a listening component as described with reference to FIGS. 8 through 11.

At block 1615 the STA 115 may receive the wakeup message during at least one of the plurality of wakeup listening periods. The operations of block 1615 may be performed according to the methods described with reference to FIGS. 1 through 15. In certain examples, aspects of the operations of block 1615 may be performed by a wakeup message component as described with reference to FIGS. 8 through 11.

Figure 17:
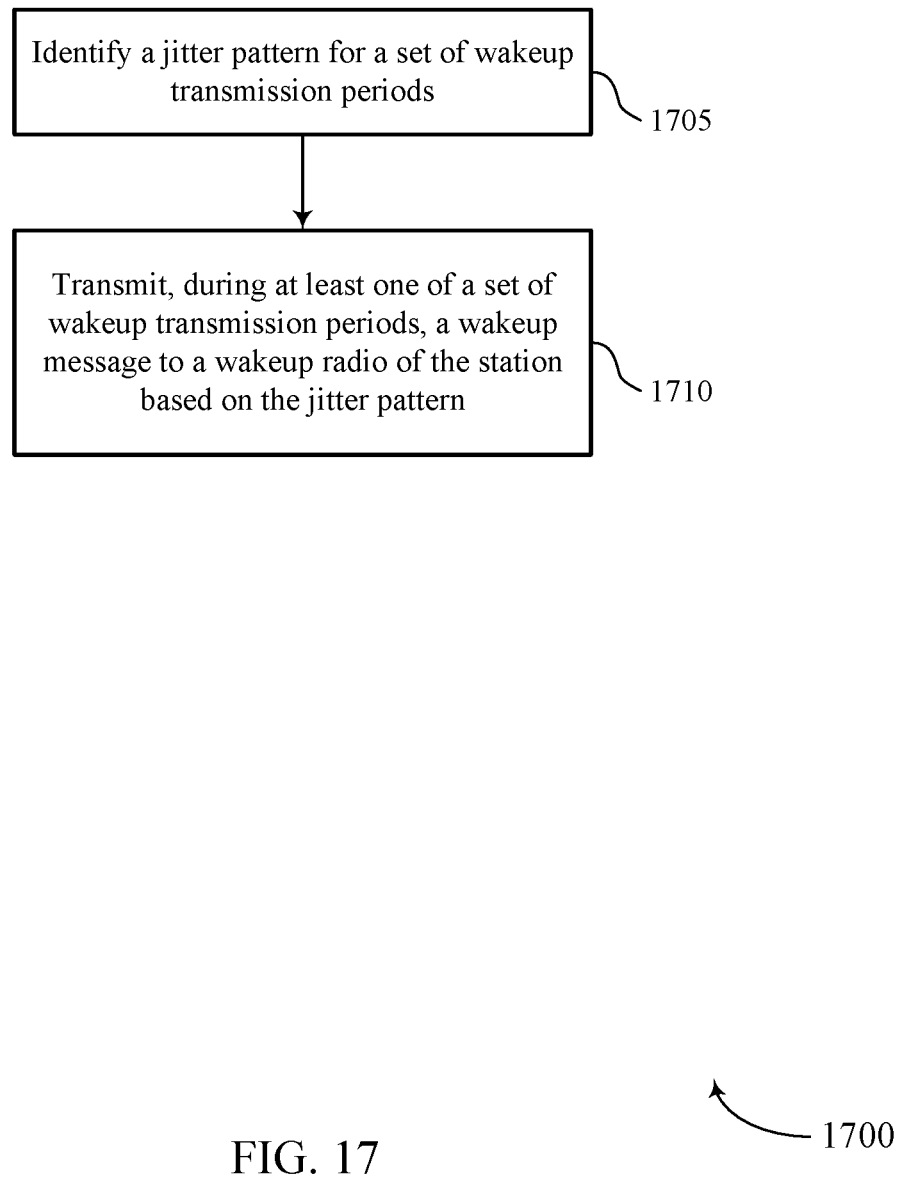

FIG. 17 shows a flowchart illustrating a method 1700 for media access control for wakeup radios in accordance with various aspects of the present disclosure. The operations of method 1700 may be implemented by an AP 105 or its components as described herein. For example, the operations of method 1700 may be performed by an AP communication manager as described with reference to FIGS. 12 through 15. In some examples, an AP 105 may execute a set of codes to control the functional elements of the device to perform the functions described below. Additionally or alternatively, the AP 105 may perform aspects the functions described below using special-purpose hardware.

At block 1705 the AP 105 may identify a jitter pattern for a plurality of wakeup transmission periods. The operations of block 1705 may be performed according to the methods described with reference to FIGS. 1 through 16. In certain examples, aspects of the operations of block 1705 may be performed by a jitter manager as described with reference to FIGS. 12 through 15.

At block 1710 the AP 105 may transmit, during at least one of a plurality of wakeup transmission periods, a wakeup message to a wakeup radio of the station based at least in part on the jitter pattern. The operations of block 1710 may be performed according to the methods described with reference to FIGS. 1 through 16. In certain examples, aspects of the operations of block 1710 may be performed by a wakeup message communication manager as described with reference to FIGS. 12 through 15.

Figure 18:
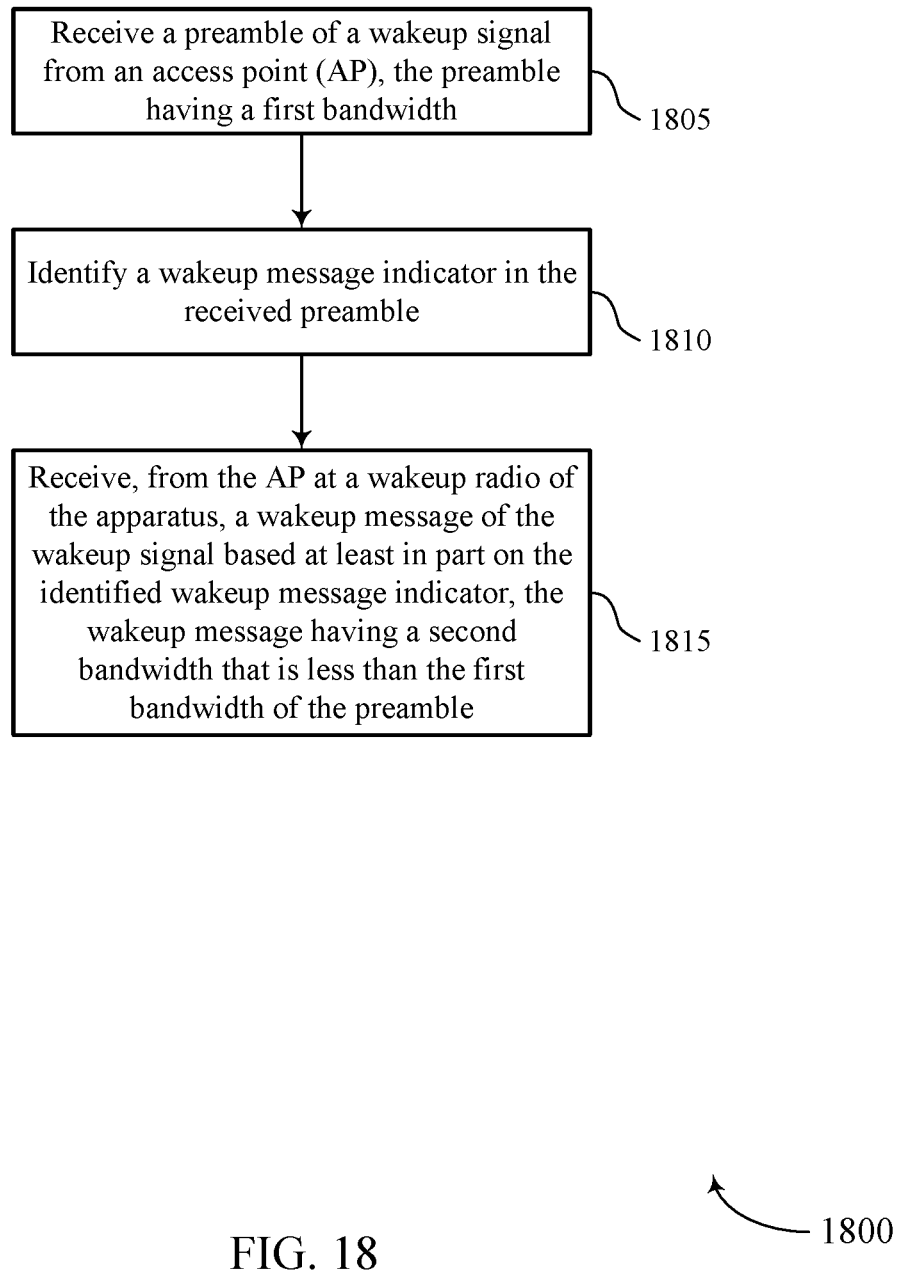

FIG. 18 shows a flowchart illustrating a method 1800 for media access control for wakeup radios in accordance with various aspects of the present disclosure. The operations of method 1800 may be implemented by a STA 115 or its components as described herein. For example, the operations of method 1800 may be performed by a STA communication manager as described with reference to FIGS. 8 through 11. In some examples, a STA 115 may execute a set of codes to control the functional elements of the device to perform the functions described below. Additionally or alternatively, the STA 115 may perform aspects the functions described below using special-purpose hardware.

At block 1805 the STA 115 may receive a preamble of a wakeup signal from an access point (AP), the preamble having a first bandwidth. The operations of block 1805 may be performed according to the methods described with reference to FIGS. 1 through 17. In certain examples, aspects of the operations of block 1805 may be performed by a preamble component as described with reference to FIGS. 8 through 11.

At block 1810 the STA 115 may identify a wakeup message indicator in the received preamble. The operations of block 1810 may be performed according to the methods described with reference to FIGS. 1 through 17. In certain examples, aspects of the operations of block 1810 may be performed by an indicator identifier as described with reference to FIGS. 8 through 11.

At block 1815 the STA 115 may receive, from the AP at a wakeup radio of the apparatus, a wakeup message of the wakeup signal based at least in part on the identified wakeup message indicator, the wakeup message having a second bandwidth that is less than the first bandwidth of the preamble. The operations of block 1815 may be performed according to the methods described with reference to FIGS. 1 through 17. In certain examples, aspects of the operations of block 1815 may be performed by a wakeup message communication manager as described with reference to FIGS. 8 through 11.

Figure 19:
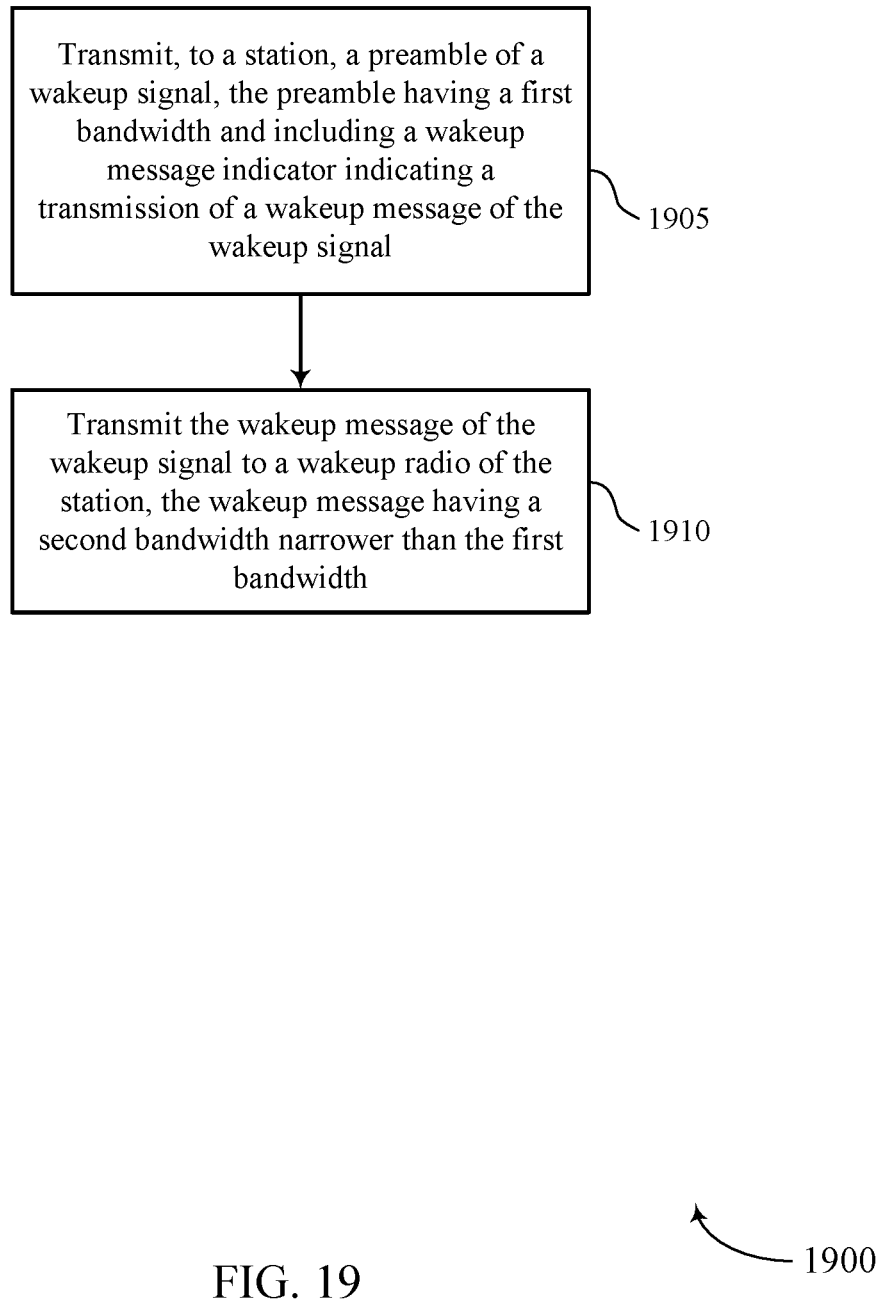

FIG. 19 shows a flowchart illustrating a method 1900 for media access control for wakeup radios in accordance with various aspects of the present disclosure. The operations of method 1900 may be implemented by an AP 105 or its components as described herein. For example, the operations of method 1900 may be performed by an AP communication manager as described with reference to FIGS. 12 through 15. In some examples, an AP 105 may execute a set of codes to control the functional elements of the device to perform the functions described below. Additionally or alternatively, the AP 105 may perform aspects the functions described below using special-purpose hardware.

At block 1905 the AP 105 may transmit, to a station, a preamble of a wakeup signal, the preamble having a first bandwidth and including a wakeup message indicator indicating a transmission of a wakeup message of the wakeup signal. The operations of block 1905 may be performed according to the methods described with reference to FIGS. 1 through 18. In certain examples, aspects of the operations of block 1905 may be performed by a preamble component as described with reference to FIGS. 12 through 15.

At block 1910 the AP 105 may transmit the wakeup message of the wakeup signal to a wakeup radio of the station, the wakeup message having a second bandwidth narrower than the first bandwidth. The operations of block 1910 may be performed according to the methods described with reference to FIGS. 1 through 18. In certain examples, aspects of the operations of block 1910 may be performed by a wakeup message communication manager as described with reference to FIGS. 12 through 15.

Figure 20:
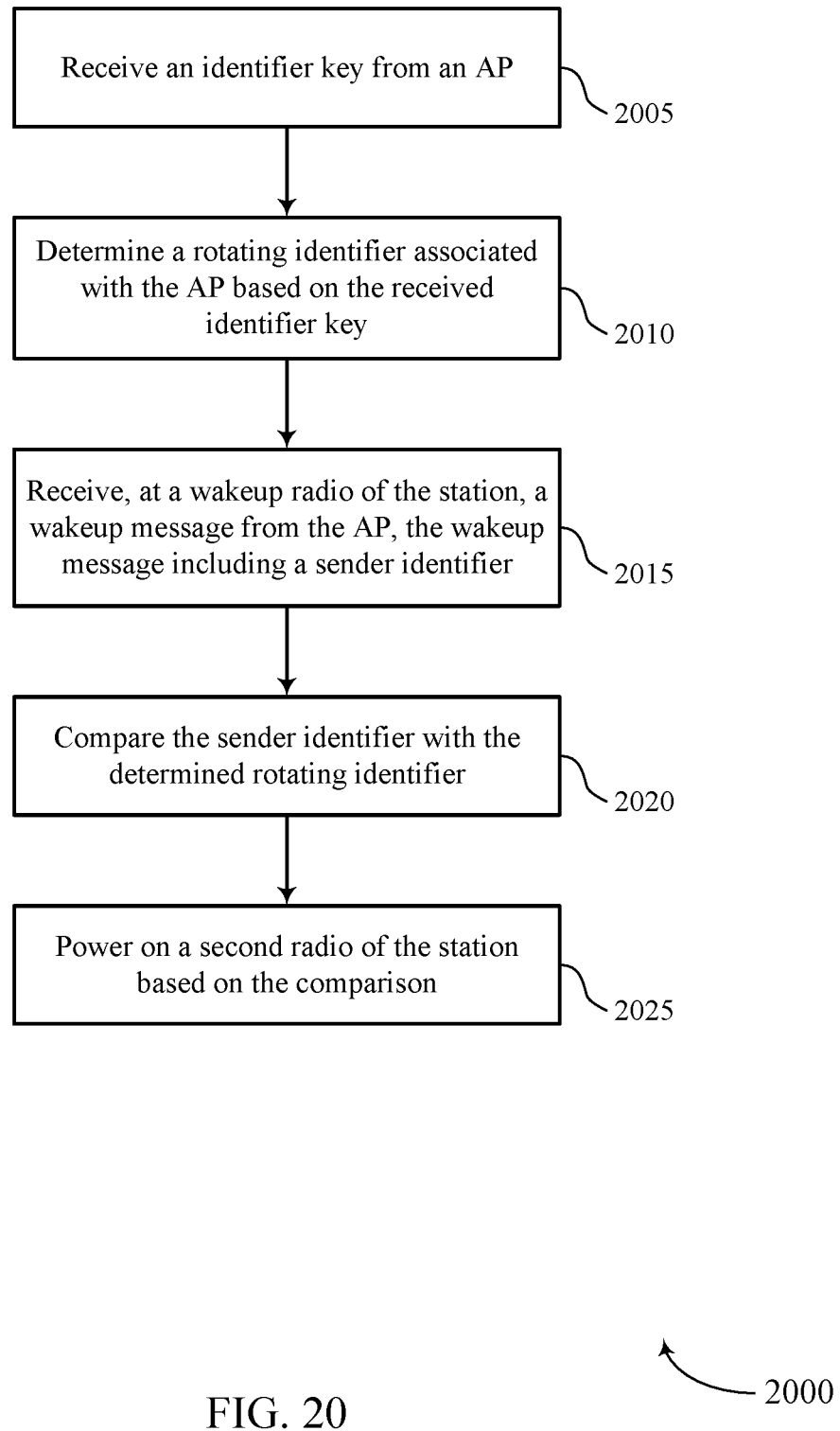

FIG. 20 shows a flowchart illustrating a method 2000 for media access control for wakeup radios in accordance with various aspects of the present disclosure. The operations of method 2000 may be implemented by a STA 115 or its components as described herein. For example, the operations of method 2000 may be performed by a STA communication manager as described with reference to FIGS. 8 through 11. In some examples, a STA 115 may execute a set of codes to control the functional elements of the device to perform the functions described below. Additionally or alternatively, the STA 115 may perform aspects the functions described below using special-purpose hardware.

At block 2005 the STA 115 may receive an identifier key from an AP. The operations of block 2005 may be performed according to the methods described with reference to FIGS. 1 through 19. In certain examples, aspects of the operations of block 2005 may be performed by a key identifier as described with reference to FIGS. 8 through 11.

At block 2010 the STA 115 may determine a rotating identifier associated with the AP based at least in part on the received identifier key. The operations of block 2010 may be performed according to the methods described with reference to FIGS. 1 through 19. In certain examples, aspects of the operations of block 2010 may be performed by a rotation manager as described with reference to FIGS. 8 through 11.

At block 2015 the STA 115 may receive, at a wakeup radio of the station, a wakeup message from the AP, the wakeup message comprising a sender identifier. The operations of block 2015 may be performed according to the methods described with reference to FIGS. 1 through 19. In certain examples, aspects of the operations of block 2015 may be performed by a wakeup message communication manager as described with reference to FIGS. 8 through 11.

At block 2020 the STA 115 may compare the sender identifier with the determined rotating identifier. The operations of block 2020 may be performed according to the methods described with reference to FIGS. 1 through 19. In certain examples, aspects of the operations of block 2020 may be performed by a comparator as described with reference to FIGS. 8 through 11.

At block 2025 the STA 115 may power on a second radio of the station based at least in part on the comparison. The operations of block 2025 may be performed according to the methods described with reference to FIGS. 1 through 19. In certain examples, aspects of the operations of block 2025 may be performed by a power manager as described with reference to FIGS. 8 through 11.

Figure 21:
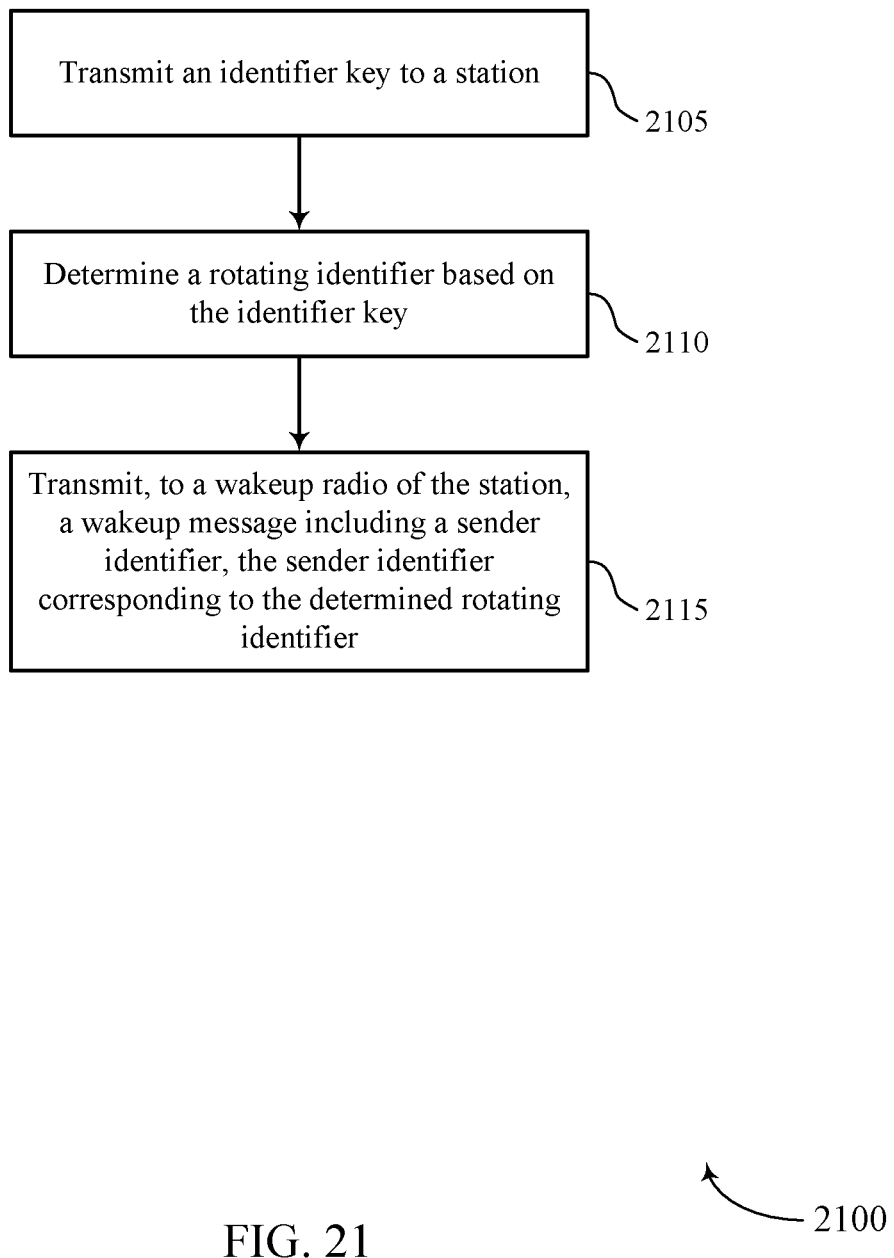

FIG. 21 shows a flowchart illustrating a method 2100 for media access control for wakeup radios in accordance with various aspects of the present disclosure. The operations of method 2100 may be implemented by an AP 105 or its components as described herein. For example, the operations of method 2100 may be performed by an AP communication manager as described with reference to FIGS. 12 through 15. In some examples, an AP 105 may execute a set of codes to control the functional elements of the device to perform the functions described below. Additionally or alternatively, the AP 105 may perform aspects the functions described below using special-purpose hardware.

At block 2105 the AP 105 may transmit an identifier key to a station. The operations of block 2105 may be performed according to the methods described with reference to FIGS. 1 through 20. In certain examples, aspects of the operations of block 2105 may be performed by a key identifier as described with reference to FIGS. 12 through 15.

At block 2110 the AP 105 may determine a rotating identifier based at least in part on the identifier key. The operations of block 2110 may be performed according to the methods described with reference to FIGS. 1 through 20. In certain examples, aspects of the operations of block 2110 may be performed by a rotation manager as described with reference to FIGS. 12 through 15.

At block 2115 the AP 105 may transmit, to a wakeup radio of the station, a wakeup message comprising a sender identifier, the sender identifier corresponding to the determined rotating identifier. The operations of block 2115 may be performed according to the methods described with reference to FIGS. 1 through 20. In certain examples, aspects of the operations of block 2115 may be performed by a wakeup message communication manager as described with reference to FIGS. 12 through 15.

Figure 22:
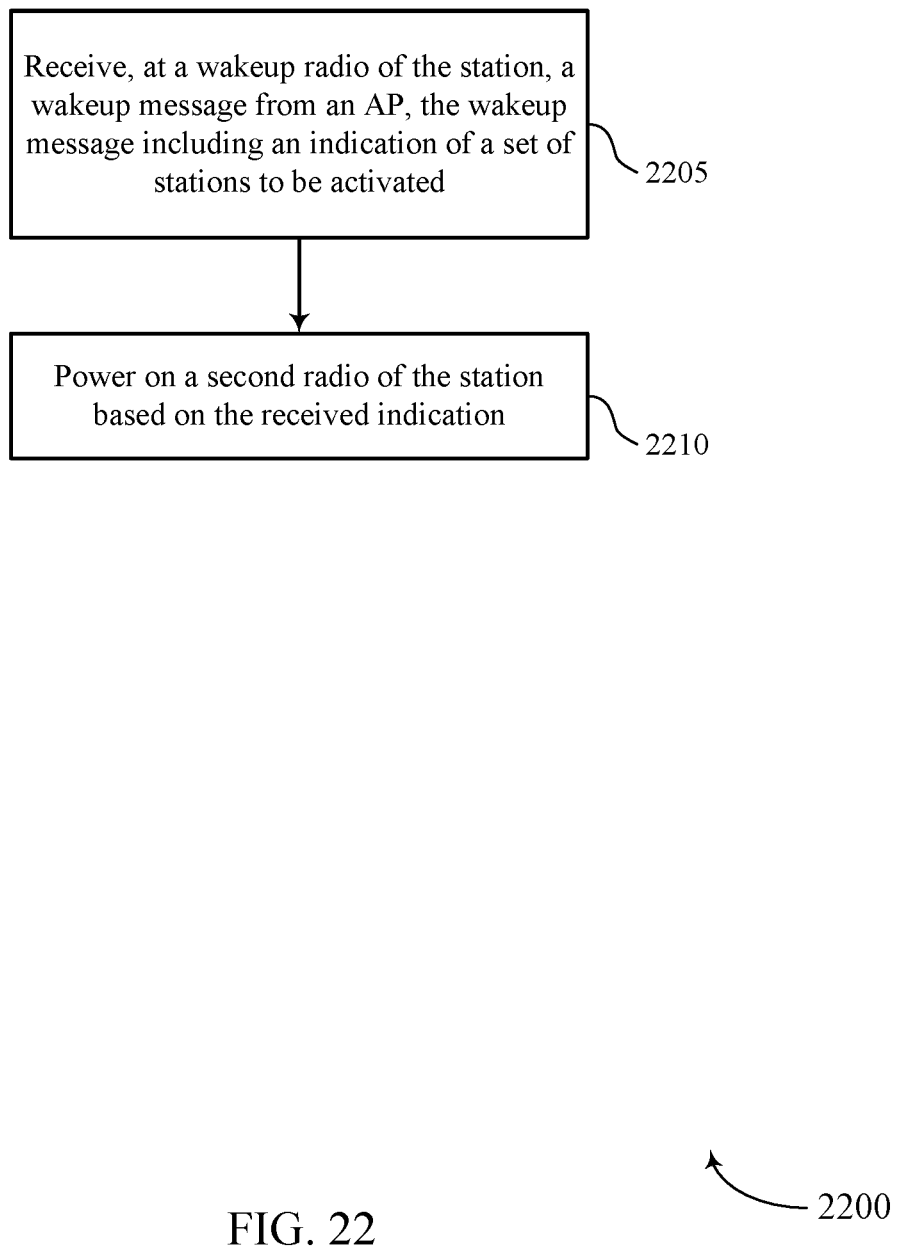

FIG. 22 shows a flowchart illustrating a method 2200 for media access control for wakeup radios in accordance with various aspects of the present disclosure. The operations of method 2200 may be implemented by a STA 115 or its components as described herein. For example, the operations of method 2200 may be performed by a STA communication manager as described with reference to FIGS. 8 through 11. In some examples, a STA 115 may execute a set of codes to control the functional elements of the device to perform the functions described below. Additionally or alternatively, the STA 115 may perform aspects the functions described below using special-purpose hardware.

At block 2205 the STA 115 may receive, at a wakeup radio of the station, a wakeup message from an AP, the wakeup message comprising an indication of a plurality of stations to be activated. The operations of block 2205 may be performed according to the methods described with reference to FIGS. 1 through 21. In certain examples, aspects of the operations of block 2205 may be performed by a wakeup message communication manager as described with reference to FIGS. 8 through 11.

At block 2210 the STA 115 may power on a second radio of the station based at least in part on the received indication. The operations of block 2210 may be performed according to the methods described with reference to FIGS. 1 through 21. In certain examples, aspects of the operations of block 2210 may be performed by a power manager as described with reference to FIGS. 8 through 11.

Figure 23:
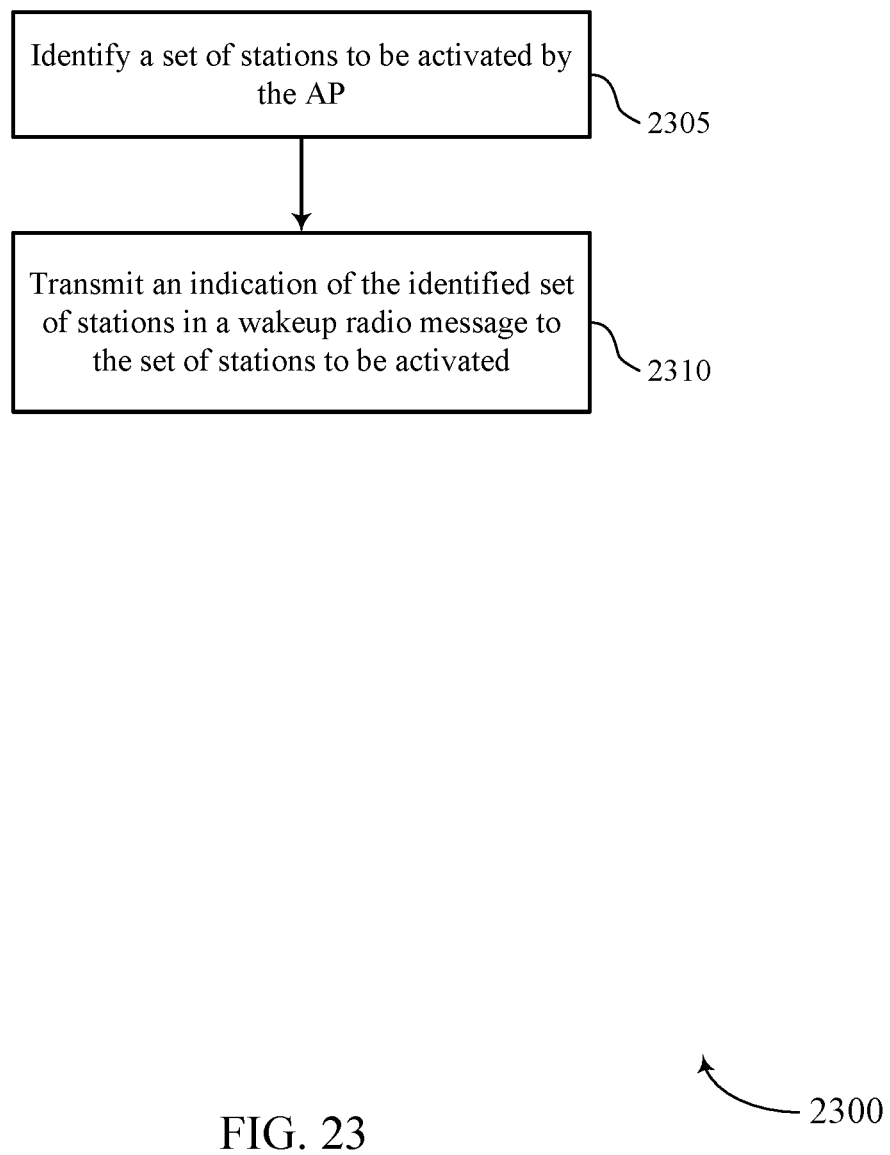

FIG. 23 shows a flowchart illustrating a method 2300 for media access control for wakeup radios in accordance with various aspects of the present disclosure. The operations of method 2300 may be implemented by an AP 105 or its components as described herein. For example, the operations of method 2300 may be performed by an AP communication manager as described with reference to FIGS. 12 through 15. In some examples, an AP 105 may execute a set of codes to control the functional elements of the device to perform the functions described below. Additionally or alternatively, the AP 105 may perform aspects the functions described below using special-purpose hardware.

At block 2305 the AP 105 may identify a plurality of stations to be activated by the AP. The operations of block 2305 may be performed according to the methods described with reference to FIGS. 1 through 22. In certain examples, aspects of the operations of block 2305 may be performed by a base station identifier as described with reference to FIGS. 12 through 15.

At block 2310 the AP 105 may transmit an indication of the identified plurality of stations in a wakeup message to the plurality of stations to be activated. The operations of block 2310 may be performed according to the methods described with reference to FIGS. 1 through 22. In certain examples, aspects of the operations of block 2310 may be performed by a wakeup message communication manager as described with reference to FIGS. 12 through 15.

Figure 24:
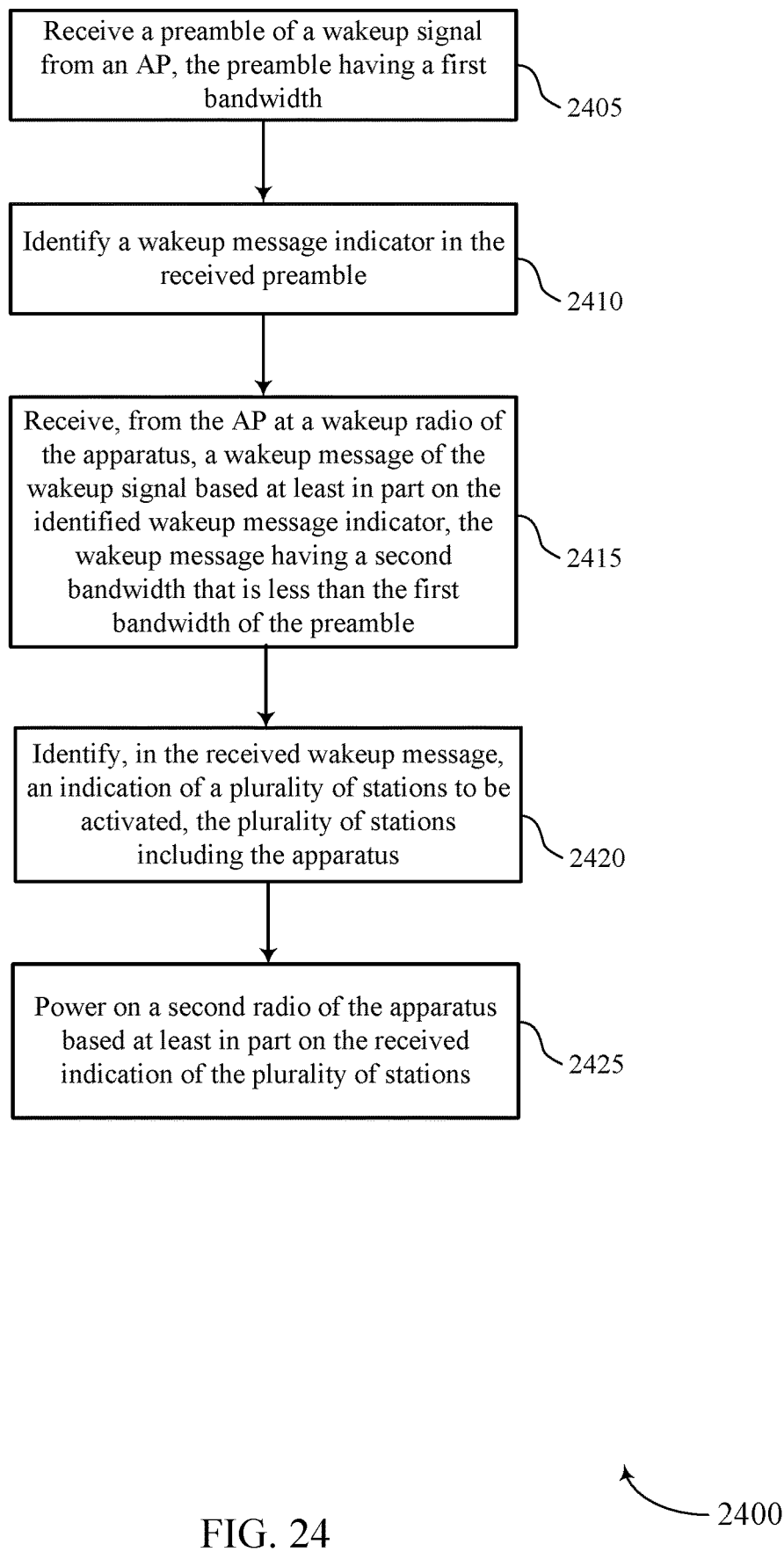

FIG. 24 shows a flowchart illustrating a method 2400 for media access control for wakeup radios in accordance with various aspects of the present disclosure. The operations of method 2400 may be implemented by a STA 115 or its components as described herein. For example, the operations of method 2400 may be performed by a STA communication manager as described with reference to FIGS. 8 through 11. In some examples, a STA 115 may execute a set of codes to control the functional elements of the device to perform the functions described below. Additionally or alternatively, the STA 115 may perform aspects the functions described below using special-purpose hardware.

At block 2405 the STA 115 may receive a preamble of a wakeup signal from an AP, the preamble having a first bandwidth. The operations of block 2405 may be performed according to the methods described with reference to FIGS. 1 through 23. In certain examples, aspects of the operations of block 2505 may be performed by a preamble component as described with reference to FIGS. 8 through 11.

At block 2410 the STA 115 may identify a wakeup message indicator in the received preamble. The operations of block 2410 may be performed according to the methods described with reference to FIGS. 1 through 23. In certain examples, aspects of the operations of block 2410 may be performed by an indicator identifier as described with reference to FIGS. 8 through 11.

At block 2415 the STA 115 may receive, from the AP at a wakeup radio of the apparatus, a wakeup message of the wakeup signal based at least in part on the identified wakeup message indicator, the wakeup message having a second bandwidth that is less than the first bandwidth of the preamble. The operations of block 2415 may be performed according to the methods described with reference to FIGS. 1 through 23. In certain examples, aspects of the operations of block 2415 may be performed by a wakeup message communication manager as described with reference to FIGS. 8 through 11.

At block 2420 the STA 115 may identify, in the received wakeup message, an indication of a plurality of stations to be activated, the plurality of stations including the apparatus. The operations of block 2420 may be performed according to the methods described with reference to FIGS. 1 through 23. In certain examples, aspects of the operations of block 2420 may be performed by a wakeup message communication manager as described with reference to FIGS. 8 through 11.

At block 2425 the STA 115 may power on a second radio of the apparatus based at least in part on the received indication of the plurality of stations. The operations of block 2425 may be performed according to the methods described with reference to FIGS. 1 through 23. In certain examples, aspects of the operations of block 2420 may be performed by a power manager as described with reference to FIGS. 8 through 11.

Figure 25:
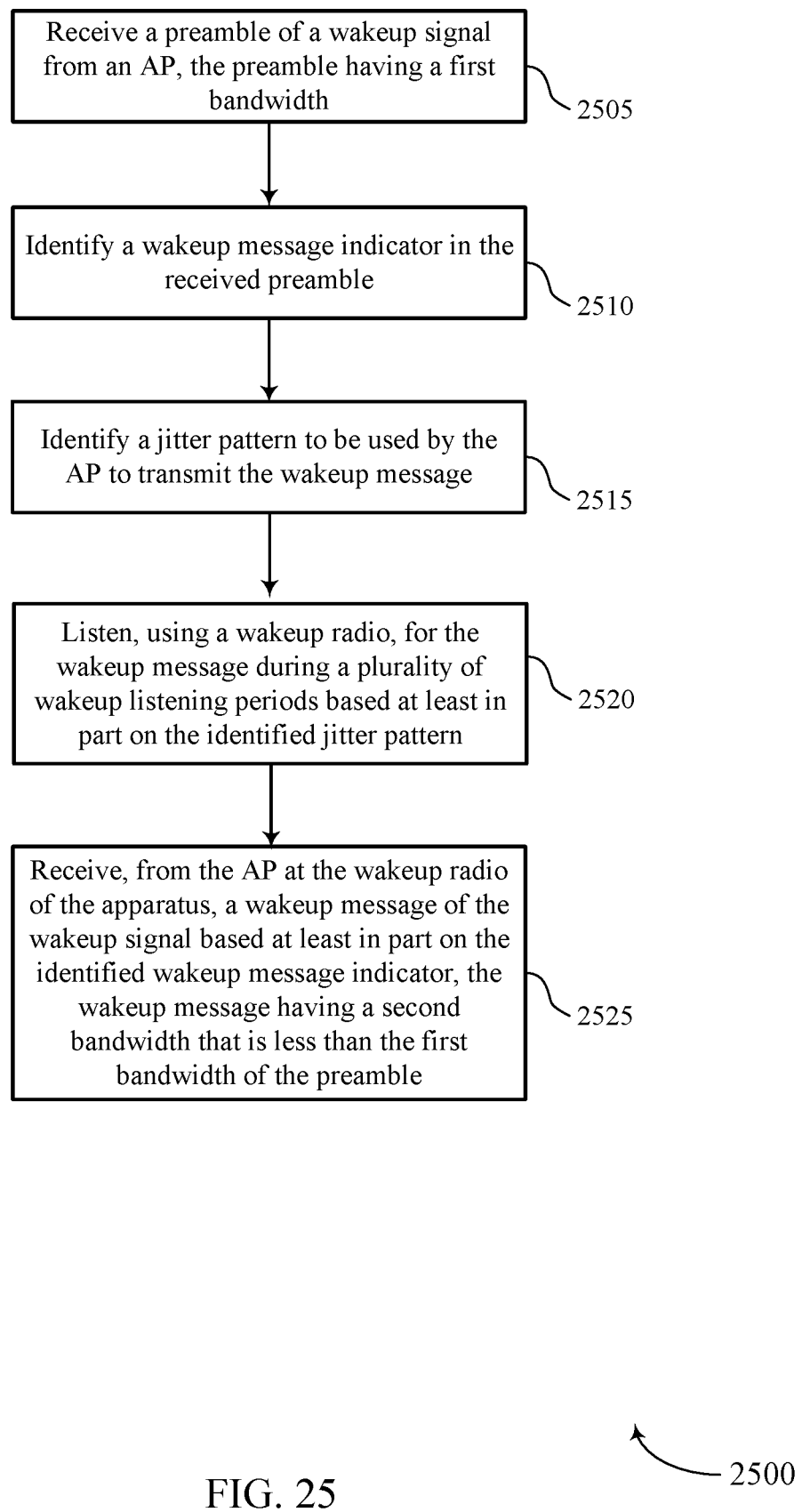

FIG. 25 shows a flowchart illustrating a method 2500 for media access control for wakeup radios in accordance with various aspects of the present disclosure. The operations of method 2500 may be implemented by a STA 115 or its components as described herein. For example, the operations of method 2500 may be performed by a STA communication manager as described with reference to FIGS. 8 through 11. In some examples, a STA 115 may execute a set of codes to control the functional elements of the device to perform the functions described below. Additionally or alternatively, the STA 115 may perform aspects the functions described below using special-purpose hardware.

At block 2505 the STA 115 may receive a preamble of a wakeup signal from an AP, the preamble having a first bandwidth. The operations of block 2505 may be performed according to the methods described with reference to FIGS. 1 through 24. In certain examples, aspects of the operations of block 2505 may be performed by a preamble component as described with reference to FIGS. 8 through 11.

At block 2510 the STA 115 may identify a wakeup message indicator in the received preamble. The operations of block 2510 may be performed according to the methods described with reference to FIGS. 1 through 23. In certain examples, aspects of the operations of block 2510 may be performed by an indicator identifier as described with reference to FIGS. 8 through 11.

At block 2515 the STA 115 may identify a jitter pattern to be used by the AP to transmit the wakeup message. The operations of block 2515 may be performed according to the methods described with reference to FIGS. 1 through 24. In certain examples, aspects of the operations of block 2515 may be performed by a jitter manager as described with reference to FIGS. 8 through 11.

At block 2520 the STA 115 may listen, using a wakeup radio, for the wakeup message during a plurality of wakeup listening periods based at least in part on the identified jitter pattern. The operations of block 2520 may be performed according to the methods described with reference to FIGS. 1 through 24. In certain examples, aspects of the operations of block 2520 may be performed by a listening component as described with reference to FIGS. 8 through 11.

At block 2525 the STA 115 may receive, from the AP at the wakeup radio of the apparatus, a wakeup message of the wakeup signal based at least in part on the identified wakeup message indicator, the wakeup message having a second bandwidth that is less than the first bandwidth of the preamble. The operations of block 2525 may be performed according to the methods described with reference to FIGS. 1 through 24. In certain examples, aspects of the operations of block 2525 may be performed by a wakeup message communication manager as described with reference to FIGS. 8 through 11.

Figure 26:
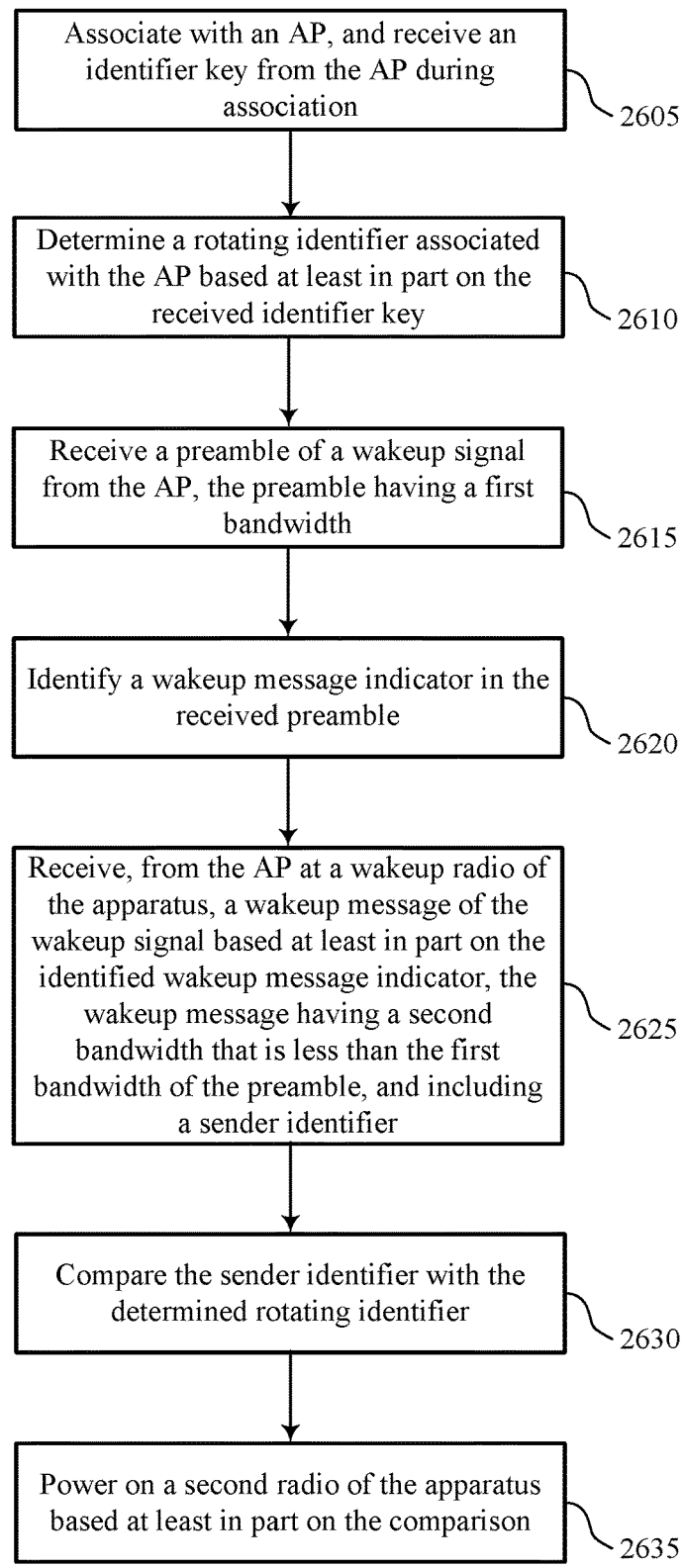

FIG. 26 shows a flowchart illustrating a method 2600 for media access control for wakeup radios in accordance with various aspects of the present disclosure. The operations of method 2600 may be implemented by a STA 115 or its components as described herein. For example, the operations of method 2600 may be performed by a STA communication manager as described with reference to FIGS. 8 through 11. In some examples, a STA 115 may execute a set of codes to control the functional elements of the device to perform the functions described below. Additionally or alternatively, the STA 115 may perform aspects the functions described below using special-purpose hardware.

At block 2605 the STA 115 may associate with an AP, and receive an identifier key from the AP during association. The operations of block 2605 may be performed according to the methods described with reference to FIGS. 1 through 25. In certain examples, aspects of the operations of block 2605 may be performed by an association component as described with reference to FIGS. 8 through 11.

At block 2610 the STA 115 may determine a rotating identifier associated with the AP based at least in part on the received identifier key. The operations of block 2610 may be performed according to the methods described with reference to FIGS. 1 through 25. In certain examples, aspects of the operations of block 2610 may be performed by a wakeup message communication manager as described with reference to FIGS. 8 through 11.

At block 2615 the STA 115 may receive a preamble of a wakeup signal from the AP, the preamble having a first bandwidth. The operations of block 2615 may be performed according to the methods described with reference to FIGS. 1 through 25. In certain examples, aspects of the operations of block 2515 may be performed by a preamble component as described with reference to FIGS. 8 through 11.

At block 2620 the STA 115 identify a wakeup message indicator in the received preamble. The operations of block 2620 may be performed according to the methods described with reference to FIGS. 1 through 25. In certain examples, aspects of the operations of block 2620 may be performed by an indicator identifier as described with reference to FIGS. 8 through 11.

At block 2625 the STA 115 may receive, from the AP at a wakeup radio of the apparatus, a wakeup message of the wakeup signal based at least in part on the identified wakeup message indicator, the wakeup message having a second bandwidth that is less than the first bandwidth of the preamble, and including a sender identifier. The operations of block 2625 may be performed according to the methods described with reference to FIGS. 1 through 25. In certain examples, aspects of the operations of block 2625 may be performed by a wakeup message communication manager as described with reference to FIGS. 8 through 11.

At block 2630 the STA 115 may compare the sender identifier with the determined rotating identifier. The operations of block 2630 may be performed according to the methods described with reference to FIGS. 1 through 25. In certain examples, aspects of the operations of block 2630 may be performed by a comparator as described with reference to FIGS. 8 through 11.

At block 2635 the STA 115 may power on a second radio of the apparatus based at least in part on the comparison. The operations of block 2635 may be performed according to the methods described with reference to FIGS. 1 through 25. In certain examples, aspects of the operations of block 2635 may be performed by a power manager as described with reference to FIGS. 8 through 11.

Figure 27:
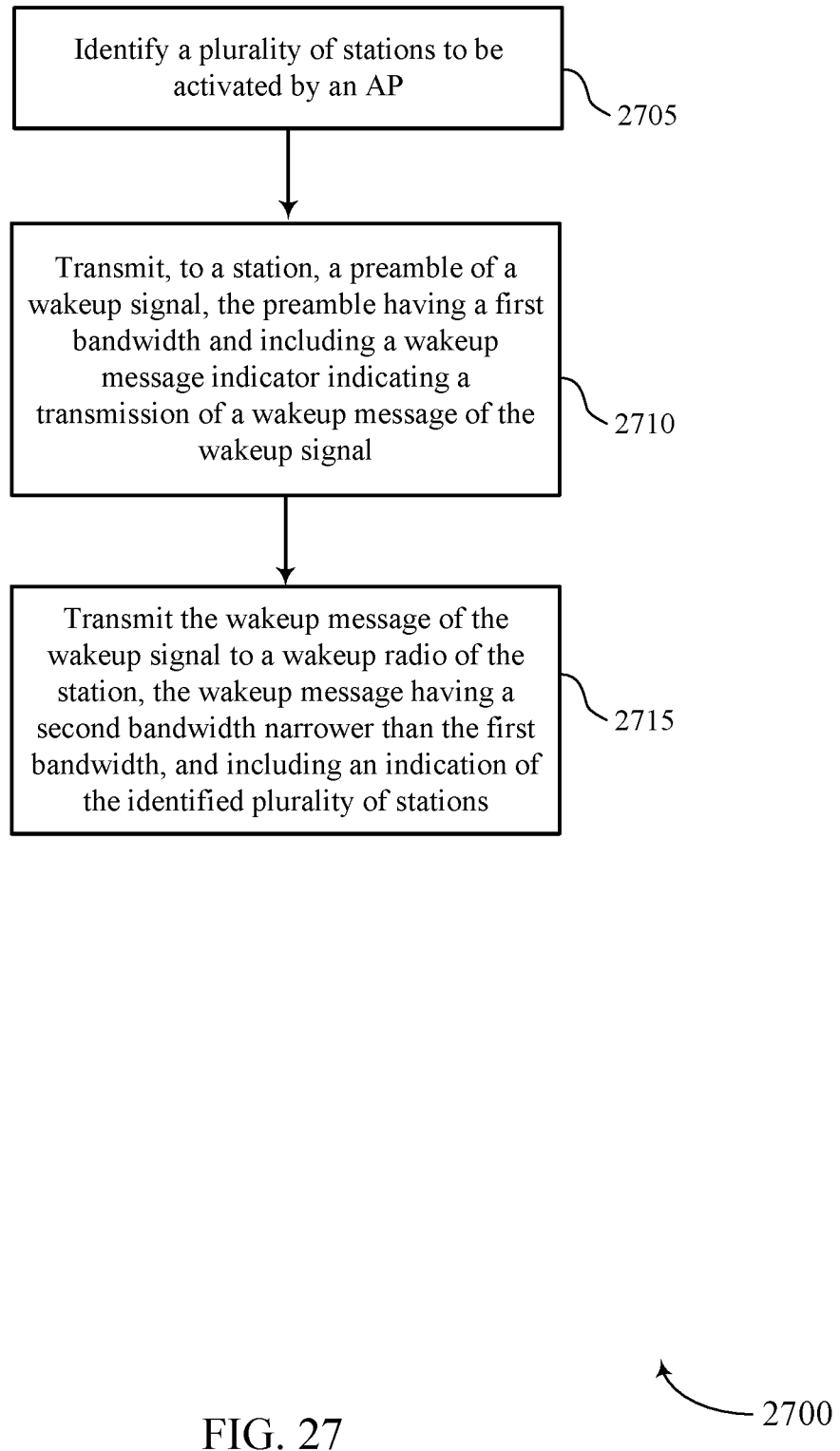

FIG. 27 shows a flowchart illustrating a method 2700 for media access control for wakeup radios in accordance with various aspects of the present disclosure. The operations of method 2700 may be implemented by a STA 115 or its components as described herein. For example, the operations of method 2700 may be performed by a STA communication manager as described with reference to FIGS. 8 through 11. In some examples, a STA 115 may execute a set of codes to control the functional elements of the device to perform the functions described below. Additionally or alternatively, the STA 115 may perform aspects the functions described below using special-purpose hardware.

At block 2705 the STA 115 may identify a plurality of stations to be activated by an AP. The operations of block 2705 may be performed according to the methods described with reference to FIGS. 1 through 26. In certain examples, aspects of the operations of block 2705 may be performed by a station identifier or base station identifier as described with reference to FIGS. 8 through 11.

At block 2710 the STA 115 may transmit, to a station, a preamble of a wakeup signal, the preamble having a first bandwidth and including a wakeup message indicator indicating a transmission of a wakeup message of the wakeup signal. The operations of block 2710 may be performed according to the methods described with reference to FIGS. 1 through 26. In certain examples, aspects of the operations of block 2710 may be performed by a preamble component as described with reference to FIGS. 8 through 11.

At block 2715 the STA 115 may transmit the wakeup message of the wakeup signal to a wakeup radio of the station, the wakeup message having a second bandwidth narrower than the first bandwidth, and including an indication of the identified plurality of stations. The operations of block 2715 may be performed according to the methods described with reference to FIGS. 1 through 26. In certain examples, aspects of the operations of block 2715 may be performed by a wakeup message communication manager as described with reference to FIGS. 8 through 11.

Figure 28:
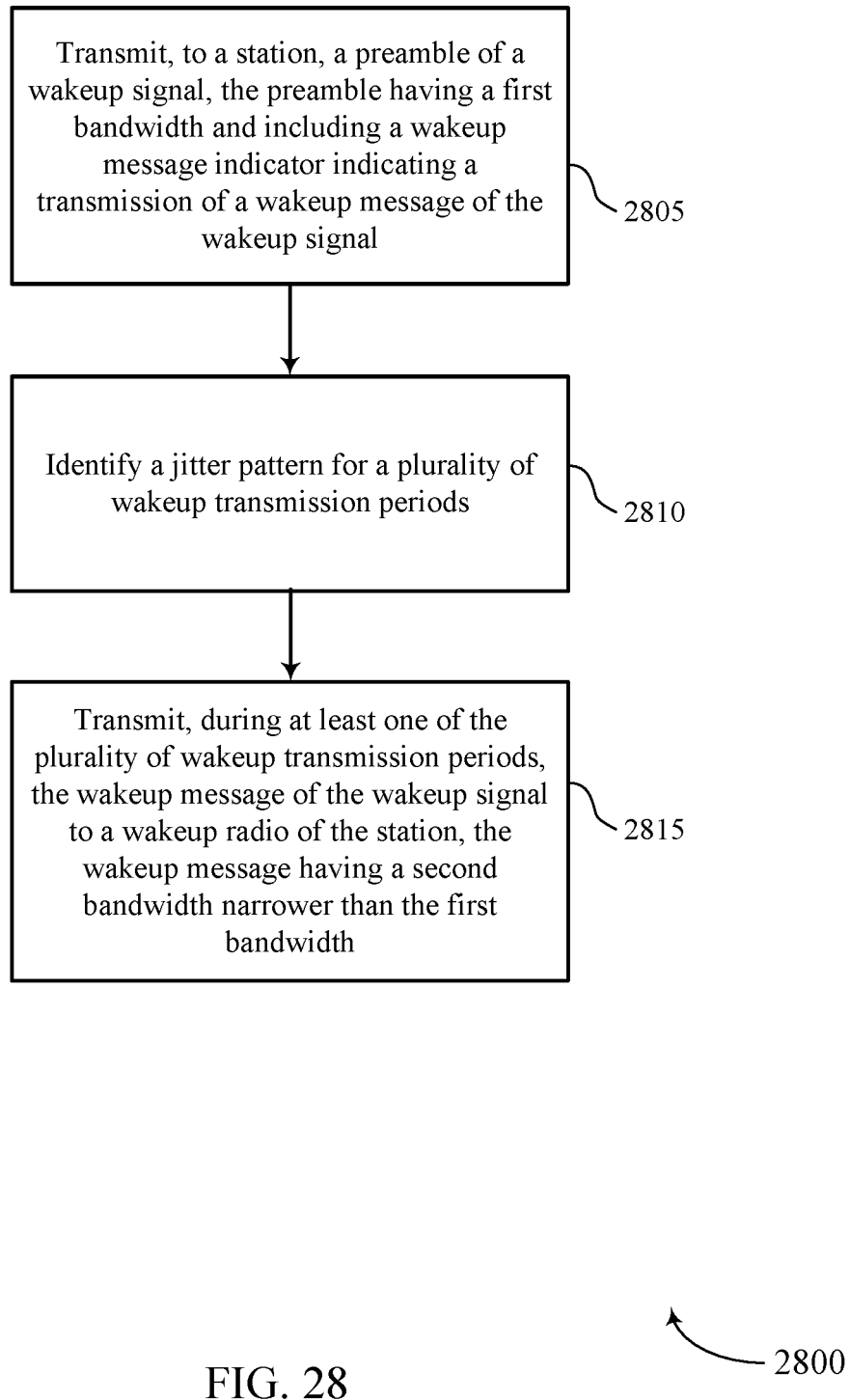

FIG. 28 shows a flowchart illustrating a method 2800 for media access control for wakeup radios in accordance with various aspects of the present disclosure. The operations of method 2800 may be implemented by a STA 115 or its components as described herein. For example, the operations of method 2800 may be performed by a STA communication manager as described with reference to FIGS. 8 through 11. In some examples, a STA 115 may execute a set of codes to control the functional elements of the device to perform the functions described below. Additionally or alternatively, the STA 115 may perform aspects the functions described below using special-purpose hardware.

At block 2805 the STA 115 may transmit, to a station, a preamble of a wakeup signal, the preamble having a first bandwidth and including a wakeup message indicator indicating a transmission of a wakeup message of the wakeup signal. The operations of block 2805 may be performed according to the methods described with reference to FIGS. 1 through 27. In certain examples, aspects of the operations of block 2805 may be performed by a preamble component as described with reference to FIGS. 8 through 11.

At block 2810 the STA 115 may identify a jitter pattern for a plurality of wakeup transmission periods. The operations of block 2810 may be performed according to the methods described with reference to FIGS. 1 through 27. In certain examples, aspects of the operations of block 2810 may be performed by a jitter component as described with reference to FIGS. 8 through 11.

At block 2815 the STA 115 may transmit, during at least one of the plurality of wakeup transmission periods, the wakeup message of the wakeup signal to a wakeup radio of the station, the wakeup message having a second bandwidth narrower than the first bandwidth. The operations of block 2815 may be performed according to the methods described with reference to FIGS. 1 through 27. In certain examples, aspects of the operations of block 2815 may be performed by a wakeup message communication manager as described with reference to FIGS. 8 through 11.

Figure 29:
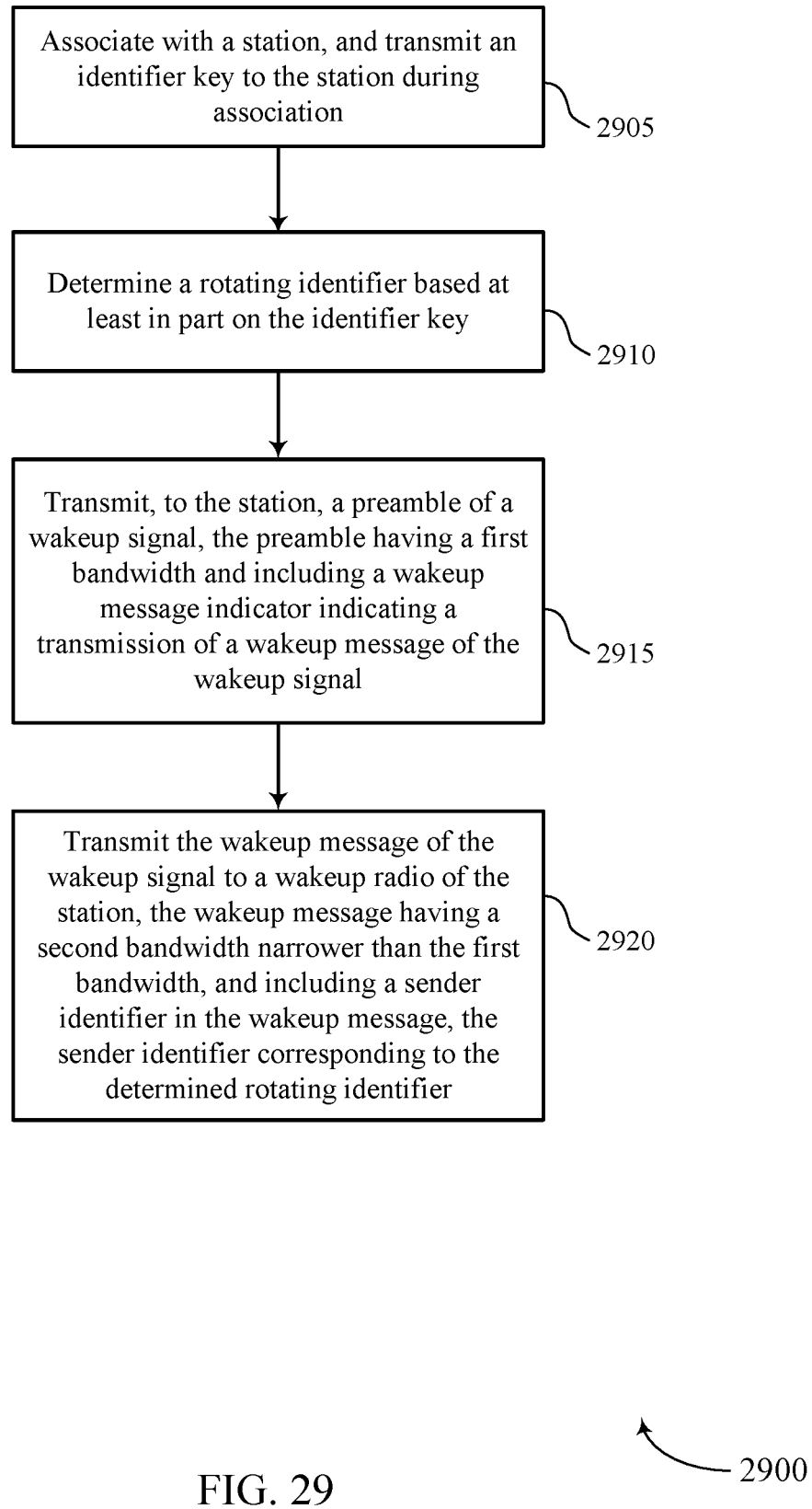

FIG. 29 shows a flowchart illustrating a method 2900 for media access control for wakeup radios in accordance with various aspects of the present disclosure. The operations of method 2900 may be implemented by a STA 115 or its components as described herein. For example, the operations of method 2900 may be performed by a STA communication manager as described with reference to FIGS. 8 through 11. In some examples, a STA 115 may execute a set of codes to control the functional elements of the device to perform the functions described below. Additionally or alternatively, the STA 115 may perform aspects the functions described below using special-purpose hardware.

At block 2905 the STA 115 may associate with a station, and transmit an identifier key to the station during association. The operations of block 2905 may be performed according to the methods described with reference to FIGS. 1 through 28. In certain examples, aspects of the operations of block 2905 may be performed by a association component as described with reference to FIGS. 8 through 11.

At block 2910 the STA 115 may determine a rotating identifier based at least in part on the identifier key. The operations of block 2910 may be performed according to the methods described with reference to FIGS. 1 through 28. In certain examples, aspects of the operations of block 2910 may be performed by a rotation manager as described with reference to FIGS. 8 through 11.

At block 2915 the STA 115 may transmit, to the station, a preamble of a wakeup signal, the preamble having a first bandwidth and including a wakeup message indicator indicating a transmission of a wakeup message of the wakeup signal. The operations of block 2915 may be performed according to the methods described with reference to FIGS. 1 through 28. In certain examples, aspects of the operations of block 2915 may be performed by a preamble component as described with reference to FIGS. 8 through 11.

At block 2920 the STA 115 may transmit the wakeup message of the wakeup signal to a wakeup radio of the station, the wakeup message having a second bandwidth narrower than the first bandwidth, and including a sender identifier in the wakeup message, the sender identifier corresponding to the determined rotating identifier. The operations of block 2920 may be performed according to the methods described with reference to FIGS. 1 through 28. In certain examples, aspects of the operations of block 2920 may be performed by a wakeup message communication manager as described with reference to FIGS. 8 through 11.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 of FIG. 1—and wireless communications system 200 of FIG. 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
   a processor;
   memory in electronic communication with the processor; and
   instructions stored in the memory and operable, when executed by the processor, to cause the apparatus to:
      power on, according to a duty cycle, a wakeup radio of the apparatus to receive a wakeup signal physical layer conversion protocol (PLCP) protocol data unit (PPDU), the duty cycle comprising periodic transmission times during which an access point (AP) transmits the wakeup signal PPDU, the wakeup signal PPDU comprising a preamble and a wakeup message, the preamble comprising a first portion and a second portion, the wakeup message comprising a plurality of station identifiers arranged in ascending order according to a wakeup frequency associated with each station identifier of the plurality of station identifiers;
      receive, at the powered-on wakeup radio of the apparatus, the first portion of the preamble of the wakeup signal PPDU and the second portion of the preamble of the wakeup signal PPDU from the AP, the first portion having a first bandwidth and the second portion having a second bandwidth narrower than the first bandwidth, the second portion of the preamble being a preamble to the wakeup message of the wakeup signal PPDU;
      receive, from the AP at the powered-on wakeup radio of the apparatus, the wakeup message of the wakeup signal PPDU, the wakeup message having the second bandwidth narrower than the first bandwidth and following the received second portion of the preamble;
      identify, in the received wakeup message, an indication of a station identifier from the plurality of station identifiers arranged in ascending order according to the wakeup frequency, the station identifier associated with the apparatus to be activated by the wakeup message; and
      power on a primary radio of the apparatus based at least in part on receiving the wakeup message at the powered-on wakeup radio and identifying the station identifier.

2. The apparatus of claim 1, wherein the instructions to receive the wakeup message are executable by the processor to cause the apparatus to:
   listen for the wakeup message after a predetermined interval following the received first portion of the preamble.

3. The apparatus of claim 2, wherein the predetermined interval comprises a gap, or a dummy block, or a combination thereof.

4. The apparatus of claim 1, wherein the second bandwidth of the wakeup signal PPDU is less than or equal to 5 MHz.

5. The apparatus of claim 1, wherein the wakeup message comprises an identifier bitmap, or a bloom filter indication, or a combination thereof, for one or more stations to be activated.

6. The apparatus of claim 1, wherein the wakeup message comprises a frame control field, or a sender address field, or a timing synchronization function (TSF) field, or a paged device identifier field, or a service set identifier (SSID) hash field, or a control message field, or a combination thereof.

7. The apparatus of claim 1, wherein the instructions are further executable by the processor to cause the apparatus to:
receive a frame control field in the wakeup message; and
identify a presence of one or more fields of the wakeup message based at least in part on the received frame control field.

8. The apparatus of claim 7, wherein the one or more fields of the frame control field comprise a version field, or a length field, or a paging field, or a control field, or a service set identifier (SSID) field, or a broadcast field, or a combination thereof.

9. The apparatus of claim 1, wherein the instructions are further executable by the processor to cause the apparatus to:
monitor for a service set identifier (SSID) hash field in the wakeup message for an identifier of a station.

10. The apparatus of claim 1, wherein the instructions are further executable by the processor to cause the apparatus to:
identify a jitter pattern to be used by the AP to transmit the wakeup message;
listen, using the powered-on wakeup radio, for the wakeup message during a plurality of wakeup listening periods based at least in part on the identified jitter pattern; and
receive the wakeup message during at least one of the plurality of wakeup listening periods.

11. The apparatus of claim 10, wherein the instructions are further executable by the processor to identify the jitter pattern by being executable by the processor to cause the apparatus to receive an indication of the jitter pattern from the AP during association.

12. The apparatus of claim 10, wherein the jitter pattern modifies time intervals between the plurality of wakeup listening periods.

13. The apparatus of claim 1, wherein the instructions are further executable by the processor to cause the apparatus to:
determine a rotating identifier associated with the AP based at least in part on a received identifier key;
receive a sender identifier in the received wakeup message;
compare the sender identifier with the determined rotating identifier; and
power on a second radio of the apparatus based at least in part on the comparison.

14. The apparatus of claim 13, wherein the instructions are further executable by the processor to determine the rotating identifier by being executable by the processor to cause the apparatus to calculate the rotating identifier using:
an inner hash function, or an outer hash function, or a combination thereof; and
a time value, or a sequence number value, or a combination thereof.

15. The apparatus of claim 13, wherein the instructions are further executable by the processor to cause the apparatus to:
associate with the AP, wherein the received identifier key is received from the AP during association.

16. The apparatus of claim 1, wherein the first portion of the preamble comprises a legacy short training (L-STF) field, a legacy long training (L-LTF) field, and a legacy signal (L-SIG) field.

17. An apparatus for wireless communication, in a system comprising:
a processor;
memory in electronic communication with the processor; and
instructions stored in the memory and operable, when executed by the processor, to cause the apparatus to:
identify a plurality of wakeup transmission periods corresponding to a duty cycle for a station to be powered on to receive wakeup signal physical layer conversion protocol (PLCP) protocol data unit (PPDUs), the duty cycle comprising periodic transmission times during which an access point (AP) transmits the wakeup signal PPDUs, each of the wakeup signal PPDUs comprising a preamble and a wakeup message, the preamble comprising a first portion and a second portion;
identify two or more stations to be activated by the AP;
transmit, to a wakeup radio of the station during a wakeup transmission period of the plurality of wakeup transmission periods, the first portion of the preamble of the wakeup signal PPDU and the second portion of the preamble of the wakeup signal PPDU, the first portion having a first bandwidth and the second portion having a second bandwidth narrower than the first bandwidth, the second portion of the preamble being a preamble to the wakeup message of the wakeup signal PPDU; and
transmit, during the wakeup transmission period, the wakeup message of the wakeup signal PPDU to the wakeup radio of the station, the wakeup message having a second bandwidth narrower than the first bandwidth and following the transmitted second portion of the preamble, the wakeup message comprising an indication of a plurality of station identifiers associated with the identified two or more stations to be activated by the wakeup message transmitted by the AP, the plurality of station identifiers arranged in ascending order according to a wakeup frequency associated with each station of the two or more stations.

18. The apparatus of claim 17, wherein the instructions are further executable by the processor to cause the apparatus to:
wait a predetermined interval after transmitting the first portion of the preamble to transmit the wakeup message.

19. The apparatus of claim 17, wherein the instructions are further executable by the processor to cause the apparatus to:
transmit one or more dummy symbols between the first portion of the preamble and the second portion of the preamble.

20. The apparatus of claim 17, wherein:
a predetermined interval comprises a gap, or a dummy block, or a combination thereof; and
the second bandwidth of the wakeup signal PPDU is less than or equal to 5 MHz.

21. The apparatus of claim 17, wherein the instructions are further executable by the processor to cause the apparatus to:
transmit a frame control field in the wakeup message to indicate a presence of one or more fields of the wakeup message.

22. The apparatus of claim 17, wherein the instructions are further executable by the processor to cause the apparatus to:
identify a jitter pattern for the plurality of wakeup transmission periods; and
transmit, during at least one of the plurality of wakeup transmission periods, the wakeup message to the wakeup radio of the station based at least in part on the jitter pattern.

23. The apparatus of claim 22, wherein the instructions are further executable by the processor to cause the apparatus to transmit an indication of the jitter pattern to the station during association.

24. The apparatus of claim 17, wherein the instructions are further executable by the processor to cause the apparatus to:
transmit an identifier key to the station;
determine a rotating identifier based at least in part on the identifier key; and
transmit a sender identifier in the wakeup message, the sender identifier corresponding to the determined rotating identifier.

25. The apparatus of claim 24, wherein the instructions are further executable by the processor to cause the apparatus to:
associate with the station, wherein the identifier key is transmitted to the station during association.

26. A method for wireless communication at a station, comprising:
powering on, according to a duty cycle, a wakeup radio of the station to receive a wakeup signal physical layer conversion protocol (PLCP) protocol data unit (PPDU), the duty cycle comprising periodic transmission times during which an access point (AP) transmits the wakeup signal PPDU, the wakeup signal PPDU comprising a preamble and a wakeup message, the preamble comprising a first portion and a second portion, the wakeup message comprising a plurality of station identifiers arranged in ascending order according to a wakeup frequency associated with each station identifier of the plurality of station identifiers;
receiving, at the powered-on wakeup radio of the station, the first portion of the preamble of the wakeup signal PPDU and the second portion of the preamble of the wakeup signal PPDU from the AP, the first portion having a first bandwidth and the second portion having a second bandwidth narrower than the first bandwidth, the second portion of the preamble being a preamble to the wakeup message of the wakeup signal PPDU;
receiving, from the AP at the powered-on wakeup radio of the station, the wakeup message of the wakeup signal PPDU, the wakeup message having the second bandwidth narrower than the first bandwidth and following the received second portion of the preamble;
identifying, in the received wakeup message, an indication of a station identifier from the plurality of station identifiers arranged in ascending order according to the wakeup frequency, the station identifier corresponding to the station to be activated by the wakeup message; and
powering on a primary radio of the station based at least in part on receiving the wakeup message at the powered-on wakeup radio and identifying the station identifier.

27. A method for wireless communication at an access point (AP), comprising:
identifying a plurality of wakeup transmission periods corresponding to a duty cycle for a station to be powered on to receive wakeup signal physical layer conversion protocol (PLCP) protocol data unit (PPDUs), the duty cycle comprising periodic transmission times during which the AP transmits the wakeup signal PPDUs, each of the wakeup signal PPDUs comprising a preamble and a wakeup message, the preamble comprising a first portion and a second portion
identifying two or more stations to be activated by the AP;
transmitting, to a wakeup radio of the station during a wakeup transmission period of the plurality of wakeup transmission periods, the first portion of the preamble of the wakeup signal PPDU and the second portion of the preamble of the wakeup signal PPDU, the first portion having a first bandwidth and the second portion having a second bandwidth narrower than the first bandwidth, the second portion of the preamble being a preamble to the wakeup message of the wakeup signal PPDU; and
transmitting, during the wakeup transmission period, the wakeup message of the wakeup signal PPDU to the wakeup radio of the station, the wakeup message having a second bandwidth narrower than the first bandwidth and following the transmitted second portion of the preamble, the wakeup message comprising an indication of a plurality of station identifiers, the plurality of station identifiers corresponding to the two or more stations to be activated by the wakeup message transmitted by the AP, the plurality of station identifiers arranged in ascending order according to a wakeup frequency associated with each station of the two or more stations.

* * * * *